United States Patent [19]
Yamaguchi et al.

[11] Patent Number: 5,630,032
[45] Date of Patent: May 13, 1997

[54] IMAGE GENERATING APPARATUS HAVING A MEMORY FOR STORING DATA AND METHOD OF USING SAME

[75] Inventors: Ikunori Yamaguchi; Yoshikazu Ikenoue; Nobuo Kamei, all of Toyokawa, Japan

[73] Assignee: Minolta Camera Kabushiki Kaisha, Osaka, Japan

[21] Appl. No.: 478,757

[22] Filed: Jun. 7, 1995

Related U.S. Application Data

[63] Continuation of Ser. No. 4,588, Jan. 14, 1993, abandoned, which is a continuation-in-part of Ser. No. 959,532, Oct. 13, 1992, abandoned, and a continuation-in-part of Ser. No. 574,379, Aug. 28, 1990, abandoned, said Ser. No. 959,532, Oct. 13, 1992, is a continuation of Ser. No. 195,730, May 18, 1988, abandoned, said Ser. No. 574,379, Aug. 28, 1990, is a continuation of Ser. No. 177,594, Apr. 4, 1988, abandoned.

[30] Foreign Application Priority Data

| Apr. 7, 1987 | [JP] | Japan | 62-86289 |
|---|---|---|---|
| Apr. 7, 1987 | [JP] | Japan | 62-86290 |
| Apr. 7, 1987 | [JP] | Japan | 62-86291 |
| Apr. 7, 1987 | [JP] | Japan | 62-86292 |
| Apr. 7, 1987 | [JP] | Japan | 62-86293 |
| Apr. 7, 1987 | [JP] | Japan | 62-86294 |
| Apr. 7, 1987 | [JP] | Japan | 62-86295 |
| Apr. 7, 1987 | [JP] | Japan | 62-86296 |
| May 21, 1987 | [JP] | Japan | 62-124157 |
| May 21, 1987 | [JP] | Japan | 62-124158 |
| Jun. 8, 1987 | [JP] | Japan | 62-142972 |
| Jun. 8, 1987 | [JP] | Japan | 62-142973 |

[51] Int. Cl.$^6$ .................................................. G06F 3/12
[52] U.S. Cl. .......................... 395/115; 395/116; 395/250
[58] Field of Search ........................ 395/113–116, 107, 395/108, 250; 358/404, 444, 296, 300

[56] References Cited

U.S. PATENT DOCUMENTS

| 4,031,519 | 6/1977 | Findley | 395/110 |
|---|---|---|---|
| 4,048,625 | 9/1977 | Harris, Jr. et al. | 395/115 |
| 4,258,418 | 3/1981 | Heath | 395/250 |
| 4,310,840 | 1/1982 | Williams et al. | 364/DIG. 2 X |
| 4,520,455 | 5/1985 | Crean et al. | 395/110 |
| 4,541,061 | 9/1985 | Schoon | 395/107 |
| 4,616,327 | 10/1986 | Rosewarne et al. | 395/103 X |
| 4,648,047 | 3/1987 | Berkland et al. | 395/112 |
| 4,661,812 | 4/1987 | Ikeda | 345/200 |
| 4,675,833 | 6/1987 | Cheek et al. | 395/150 |
| 4,686,525 | 8/1987 | Nagata | 345/195 |
| 4,694,405 | 9/1987 | Bradbury et al. | 395/115 X |
| 4,698,755 | 10/1987 | Okazaki et al. | 395/112 |
| 4,703,438 | 10/1987 | Nishiyama et al. | 395/150 |
| 4,707,159 | 11/1987 | Hirano et al. | 400/639.1 |
| 4,737,923 | 4/1988 | Matsuzaki | 395/111 |
| 4,745,576 | 5/1988 | Hasegawa et al. | 395/400 |
| 4,769,648 | 9/1988 | Kishino et al. | 395/115 X |
| 4,796,203 | 1/1989 | Roberts | 345/200 |
| 4,805,135 | 2/1989 | Ochi et al. | 395/114 |
| 4,811,242 | 3/1989 | Adachi | 395/116 |
| 4,841,453 | 6/1989 | Finlay et al. | 395/110 |

FOREIGN PATENT DOCUMENTS

| 58-89373 | 5/1983 | Japan. |
|---|---|---|
| 60-178750 | 9/1985 | Japan. |

OTHER PUBLICATIONS

D. Moseley, "Intelligent Page Printing Systems", *Data Processing* vol. 28, No. 1. pp. 18–20 (1986).

H. J. Tafel et al., "Ein–und Ausgabegerate Der Datentechnik", p. 287 (1982).

*Primary Examiner*—Raymond J. Bayerl
*Attorney, Agent, or Firm*—Burns, Doane, Swecker & Mathis, LLP

[57] ABSTRACT

A printer of bit map type provides a first information processor for analyzing data received from an external data processor to transform them into intermediate codes and a second information processor for imaging bit images on a bit map memory according to intermediate codes. The first and second information processors are interconnected by a memory means so as to be able to work asynchronously with each other.

61 Claims, 65 Drawing Sheets

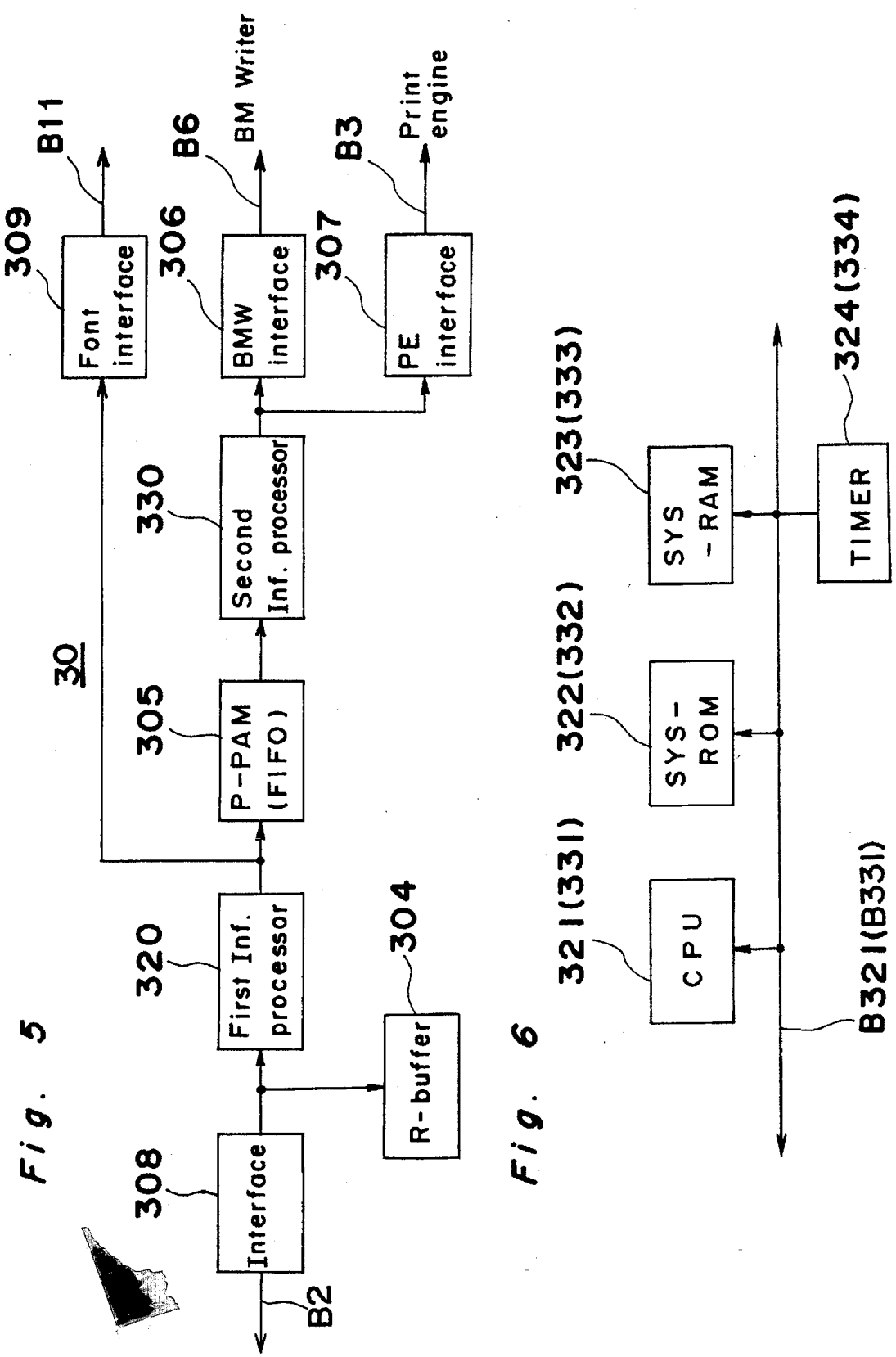

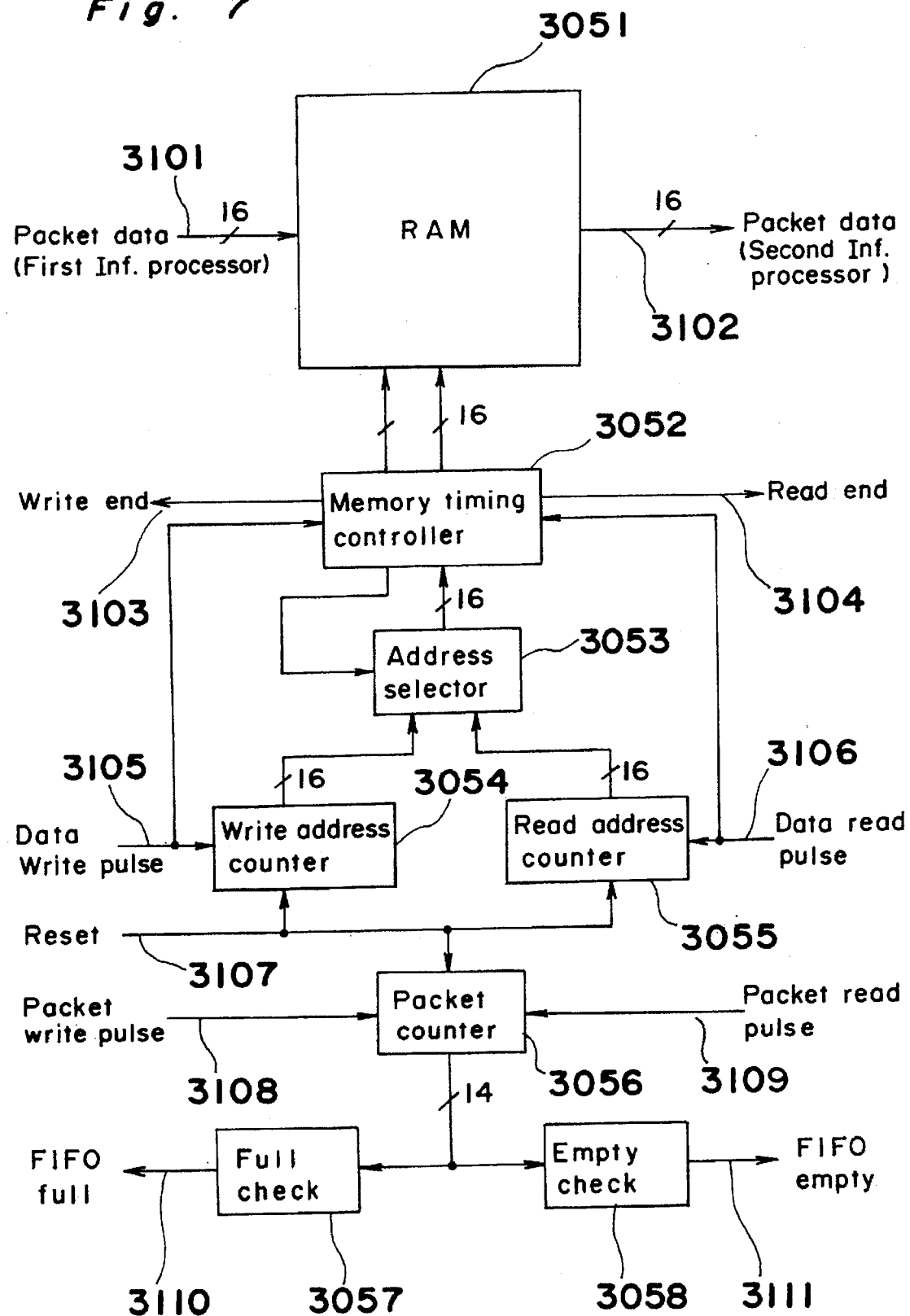

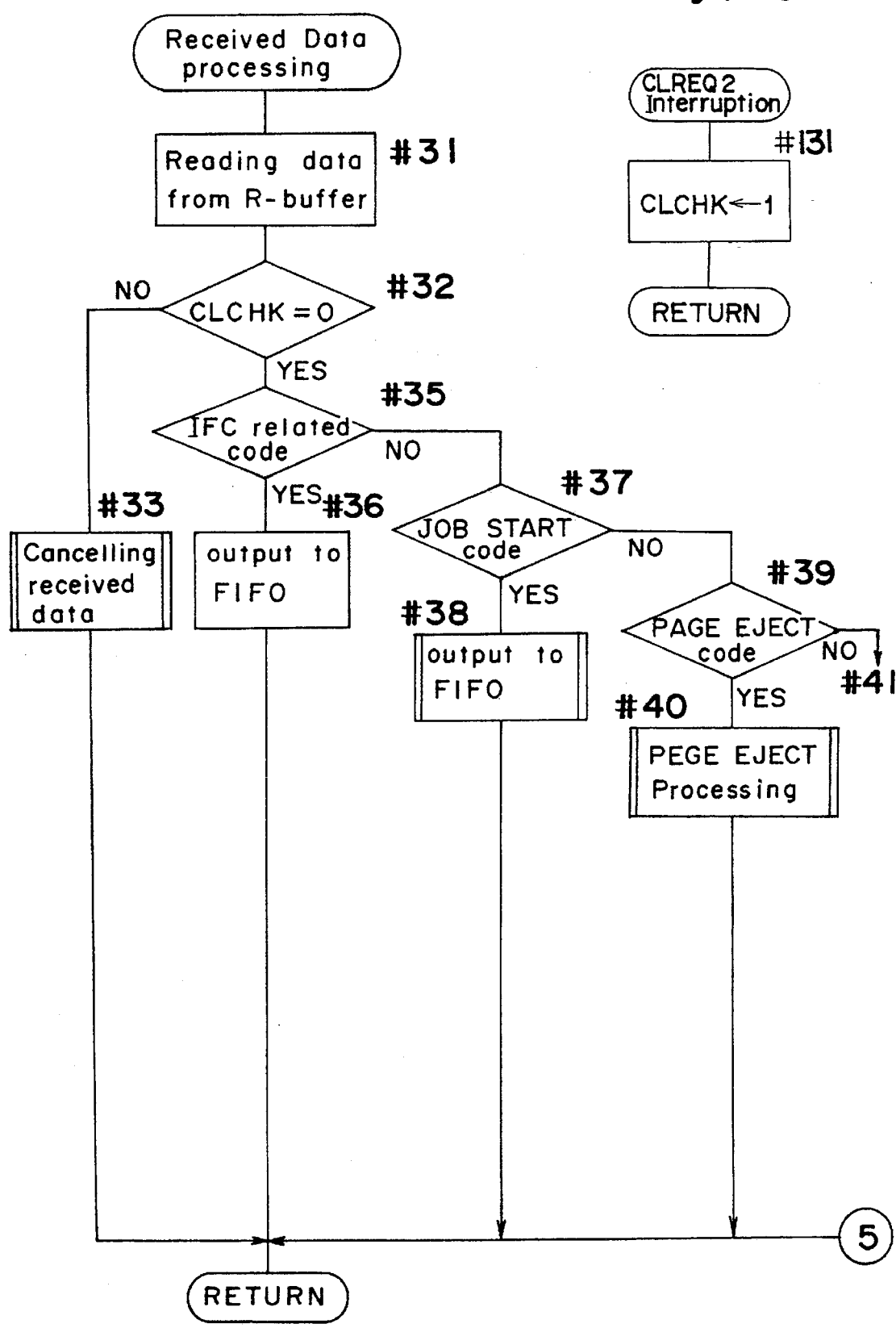

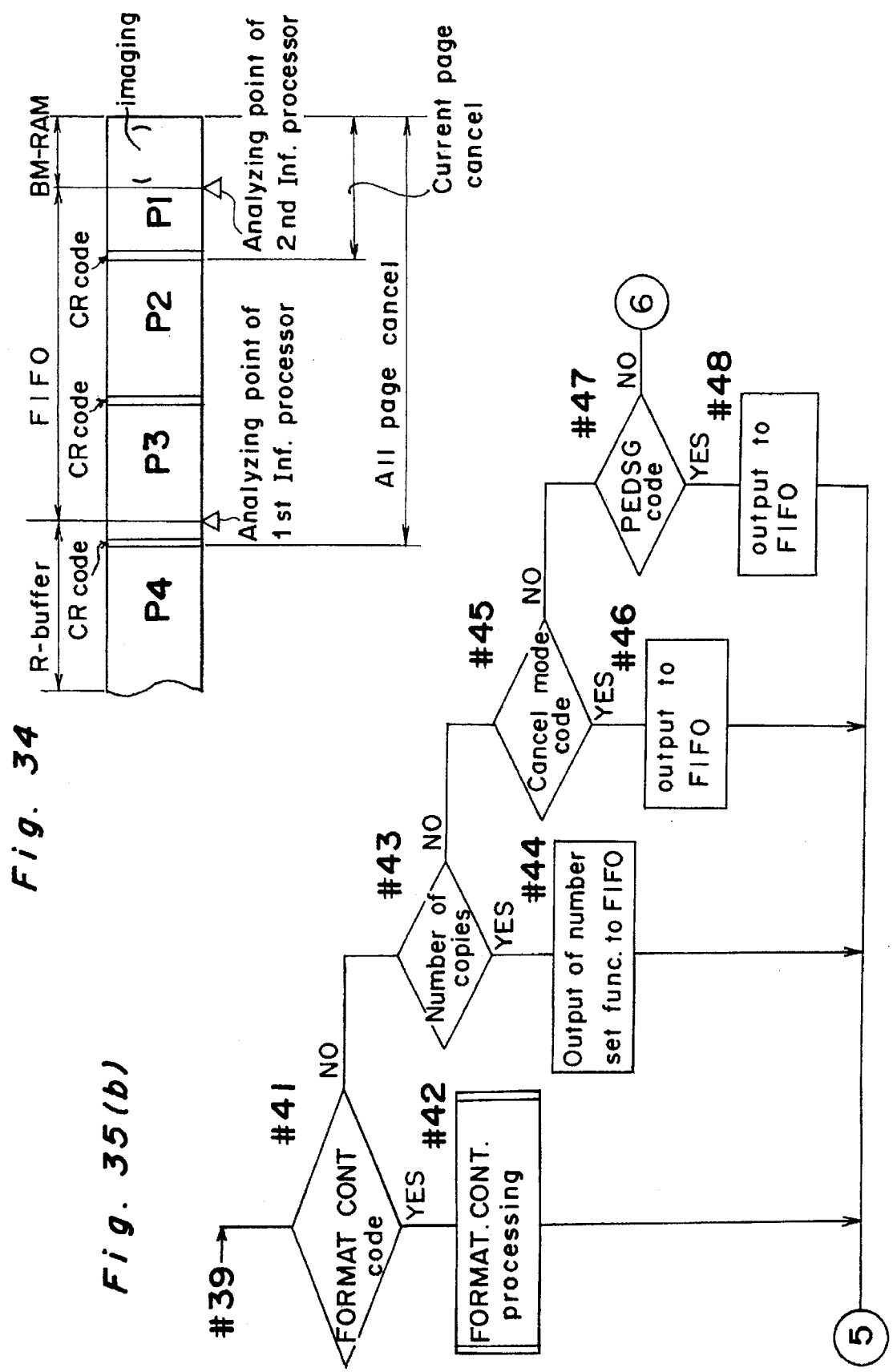

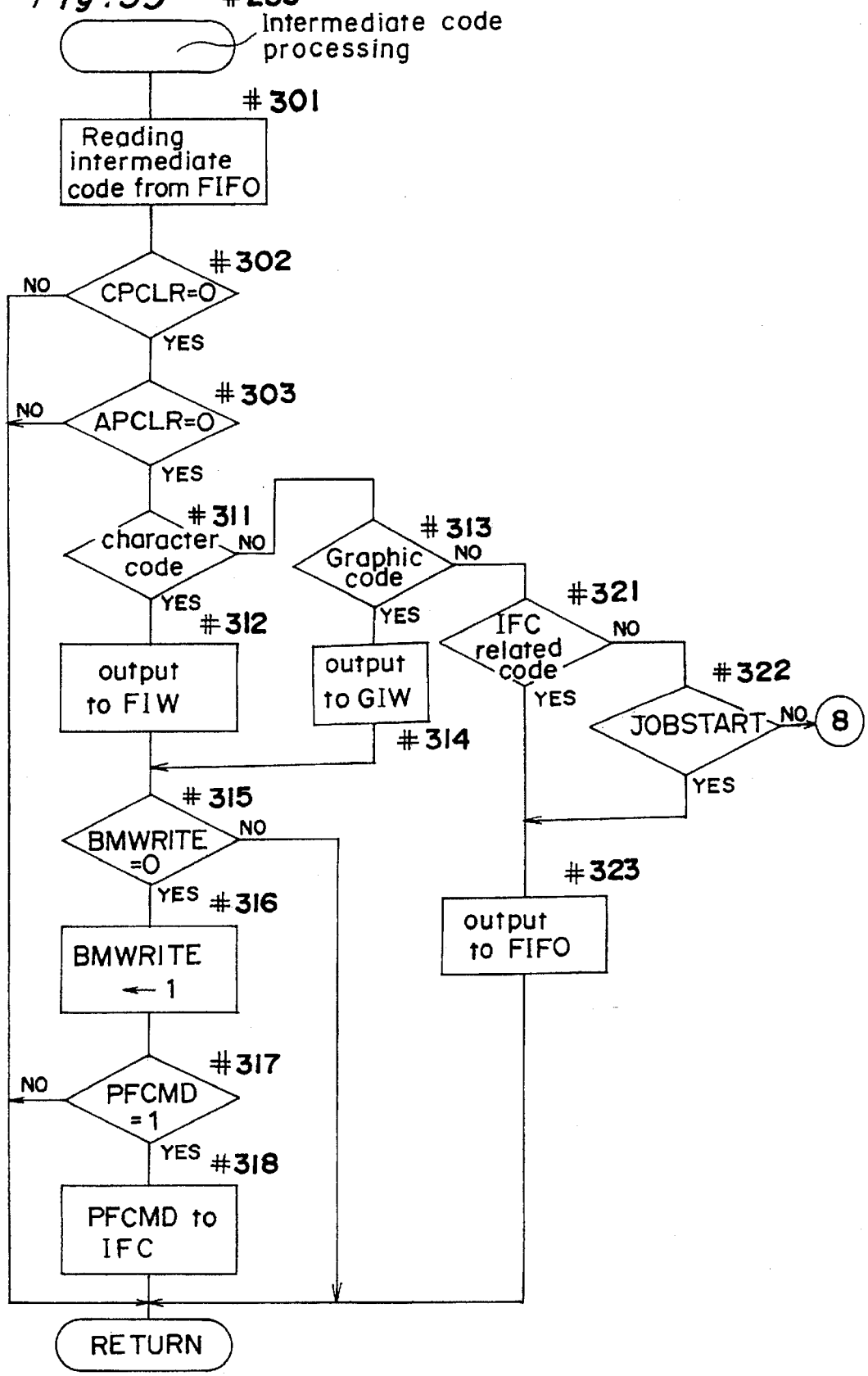

IMAGE GENERATING APPARATUS HAVING A MEMORY FOR STORING DATA AND METHOD OF USING SAME

This application is a continuation of application Ser. No. 08/004,588, filed Jan. 14, 1993, now abandoned, which is a continuation-in-part of U.S. patent application Ser. No. 07/959,532, filed Oct. 13, 1992, now abandoned and U.S. patent application Ser. No. 07/574,379, filed Aug. 28, 1990, now abandoned. U.S. patent application Ser. No. 07/959,532 is a continuation of U.S. patent application Ser. No. 07/195,730, filed May 18, 1988, now abandoned. U.S. patent application Ser. No. 07/574,379 is a continuation of U.S. patent application Ser. No. 07/177,594, filed Apr. 4, 1988, now abandoned.

BACKGROUND OF THE INVENTION

1. Field of the Invention

The present invention relates to an image generating method and apparatus for printing bit images according to data input from a data processor such as a host computer.

2. Description of the Related Art

As is well known, data sent from a data processor to a printer is comprised of image data for bit map images to be printed out and control data for controlling the print method and mode of a print engine of the printer. In conventional systems, a single processor or controller is used to transform image data into bit map images to be printed out and to send the bit map images to the print engine. In a conventional controller, a memory buffer which is controlled so as to form a First-in First-out (FIFO) memory by software is used for internal data flow in order to synchronize data input from the data processor with data to be outputted to the print engine.

Data input from an external data processor is stored in a register buffer temporarily and the stored data is read out by the controller. The controller executes so called packet processing asynchronously from the input of data in order to memorize packet data into the FIFO memory.

In the packet processing, protocol analysis, pre-editing of image data, transformation of data into packets (intermediate codes) according to the result of pre-editing which makes imaging of bit images onto a bit map memory easier and memorizing intermediate codes into a memory are carried out sequentially. During the pre-editing of image data, respective print positions of individual image data are determined according to the result of the protocol analysis. Accordingly, intermediate codes representing image data include pattern codes of image data and addresses for imaging individual bit images on the bit map memory. Upon output by the controller, the controller transforms intermediate codes into bit images and writes them on the bit map memory.

In a system wherein data processing in the FIFO memory is controlled according to software programmed in a CPU, the efficiency of data processing is increased as a whole, but the data processing is still too time consuming to apply it to a faster printer.

As a conventional controller, there has been known a controller comprised of one CPU or comprised of multiple CPUs which are connected to a common RAM.

In those systems, packet processing of received data and imaging of the received data are executed by one CPU. Since these procedures are executed in a time-division mode by the one CPU, they are executed intermittently. This slows down the data processing.

In a conventional controller having one CPU, a ring buffer is used as an internal memory and a FIFO memory is formed as software by controlling the ring buffer with use of control programs provided therefor. However, in the controller of this type, it is difficult to speed up the data processing since it takes a relatively long time to control the ring buffer.

Furthermore, even in a conventional controller comprised of multiple CPUs which possesses the common RAM used commonly in the time-division system, fast transmission of data of a large volume is impossible since data access has to be done synchronously with time-division clocks.

SUMMARY OF THE INVENTION

One object of the present invention is to provide an image generating apparatus, such as a printer, which is able to speed up data processing while maintaining a high degree of efficiency.

Another object of the present invention is to provide a method for generating an image which is able to speed up data processing while maintaining a high degree of efficiency.

Another object of the present invention is to provide an image generating apparatus wherein data access and writing hit images can be performed independently.

A further object of the present invention is to provide an image generating apparatus having a first information processor for analyzing data input from an external data processor such as a host computer and a second information processor for forming bit images to be printed by a print engine wherein said first and second information processors are driven independently from each other.

Another object of the present invention is to provide an image generating apparatus having two information processors, which operate independently from each other, wherein individual processing by various commands can be done quickly.

Another object of the present invention is to provide an image generating apparatus including a FIFO memory constructed as hardware.

Another object of the present invention is to provide a data storing device for efficiently storing data.

A further object of the present invention is to provide an image generating apparatus capable of processing data in units of a predetermined data length in which only the valid data in each unit can be processed.

A still further object of the present invention is to provide an image generating apparatus having memory control means of hardware construction for controlling to write only valid data into memory means and to read valid data therefrom.

In order to achieve these objects, according to the present invention there is provided an image generating apparatus which receives information including image data to be printed from an external device, transforms said received image data into dot images to be printed out and prints out said dot images on paper by a printing means, the apparatus comprising means for receiving said information including image data to be printed, first information processing means for analyzing contents of received information and transforming said image data included therein into intermediate codes, first memory means for temporarily storing said intermediate codes transformed by said first information processing means, said memory means outputting said intermediate codes in the order of receipt, memory control means for controlling the writing of said intermediate code data into the memory means and the reading of them therefrom, said memory control means including a first counter for renewing a write address of each intermediate code in synchronization with a sequence for writing said intermediate codes into said memory means, a second counter for renewing a read address of each intermediate code in synchronization with a sequence for reading said intermediate codes from the memory means and a third counter for counting an amount of data stored in the memory means in units of a predetermined data length which is incremented in synchronous with a sequence for writing data of an arbitrary length within said predetermined length and is decremented in synchronous with a sequence for reading data of an arbitrary length within said predetermined length, read control means for reading stored intermediate code from the memory means, second information processing means for transforming said intermediate codes into dot images, said second information processing means operating asynchronously from said first information processing means, second memory means for storing dot images transformed by said second information processing means, and a print control means for controlling said printing means according to said dot images stored in said second memory means.

According to the image generating apparatus of the present invention, the first information processor and the second information processor are connected through the first memory means and, therefore, every information processor performs its proper data processing independently from the other information processor.

The first memory means may be a first-in-first-out (FIFO) memory means provided as hardware.

The image generating apparatus according to the present invention may provide further means for entering a signal indicating data to be processed prior to other data, said means being connected to said second information processing means, and a signal transmission line for transmitting said signal from said second information processing means to said first information processing means.

According to this image generating apparatus, each command entered by the input means is transmitted from the second information processor to the first information processor and each information processor executes its own processing corresponding to each command.

The image generating apparatus according to the present invention may further provide a signal transmission line for sending a signal from said first information processing means to said second information processing means, said first information processing means sending a cancel command to said second information processing means via said signal transmission line if said cancel command is included in the received information.

According to this image generating apparatus, each command entered from the external data processor is transmitted from the first information processor to the second information processor and, in each information processor, processing corresponding to each command is executed independently.

BRIEF DESCRIPTION OF DRAWINGS

These and other objects and features of the present invention will become more apparent when the preferred embodiment of the present invention is described in detail with reference of accompanied drawings in that;

FIG. 5 is a block diagram showing a bit map controller shown in FIG. 4;

FIG. 6 is a block diagram showing a composition for first and second information processors shown in FIG. 5;

FIG. 7 is a block diagram of a first-in-first-out circuit;

FIG. 12, FIGS. 13(a) and 13(b), FIG. 14, FIG. 15, FIG. 16, and FIG. 17 show flow-charts of respective routines to be executed by the first information processor among which:

FIG. 12 is a flow chart of data receiving routine;

FIG. 13(a) and 13(b) are parts of a flow chart of a received data processing routine;

FIG. 14 a flow chart of a PAGE EJECT processing routine;

FIG. 15 a flow chart of a FORMAT CONTROL code processing routine;

FIG. 15 is a flow chart of processing routine for outputting packet data to FIFO;

FIG. 17 is a flow chart of an interruption routine to be executed upon reading data;

FIG. 18, FIGS. 19(a), and 19(b), and FIG. 20 show flow charts of respective routines to be executed by the second information processor among which:

FIG. 18 is a flow chart of the main routine;

FIG. 19(a) and 19(b) are parts of a flow chart of INTERMEDIATE CODE processing routine;

FIG. 20 is a flow chart of processing routine for entering data from FIFO;

FIG. 34 is an explanatory diagram for showing CURRENT PAGE cancel and ALL PAGE cancel according to the third preferred embodiment of the present invention;

FIG. 36 is a flow chart of CLREQ 2 interruption to be executed by the first information processor;

FIG. 39 is a flow chart of INTERMEDIATE CODE processing routine to be executed by the second information processor;

DETAILED DESCRIPTION OF THE PREFERRED EMBODIMENT

First Preferred Embodiment (a) Composition of Electro-Photographic Printer

Figure 1:
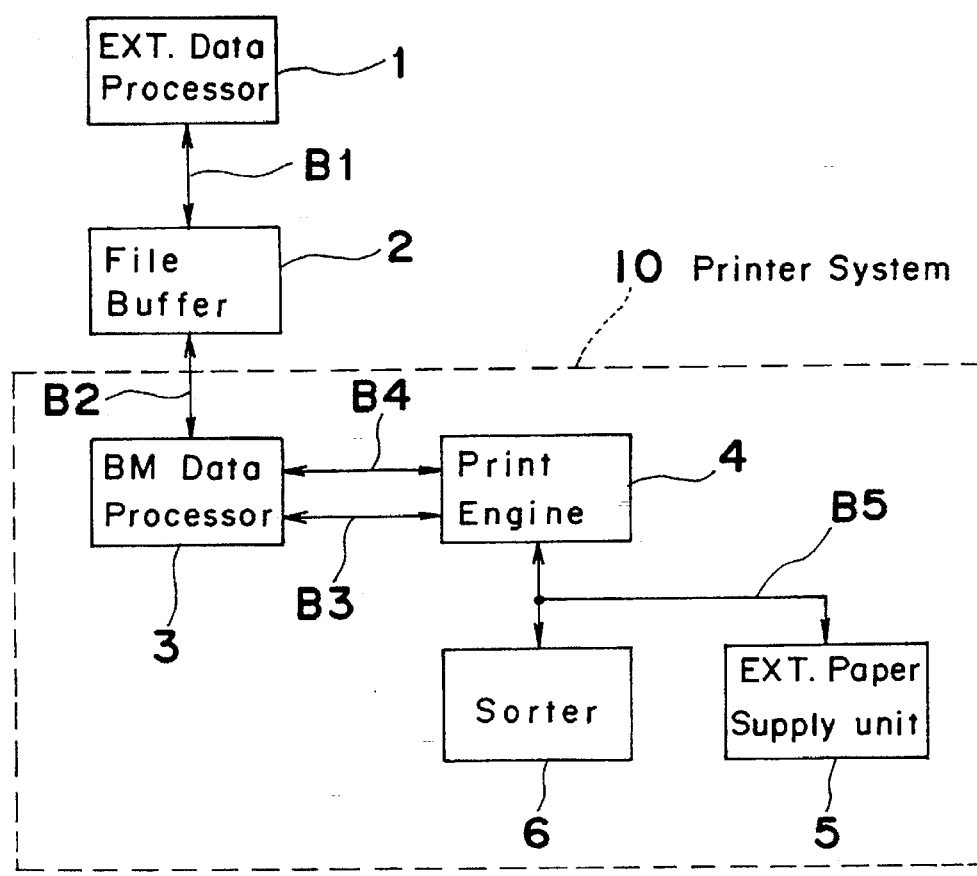
FIG. 1 shows a system composition of a printer system according to the preferred embodiment of the present invention.

FIG. 1 shows an image forming system including a printer system 10 according to the present invention.

Data from an external data processor 1 such as a host computer are first stored into an external file buffer 2 in order to improve throughput of the external data processor 1 and, thereafter, are outputted from the file buffer 2 to the printer system 10.

The printer system 10 is comprised of a data processor 3 for processing a bit map memory, a print engine 4 including a laser means and an electro-photographic print means, and accessory apparatuses such as an external paper supply unit 5, a sorter 6 and the like.

Figure 2:
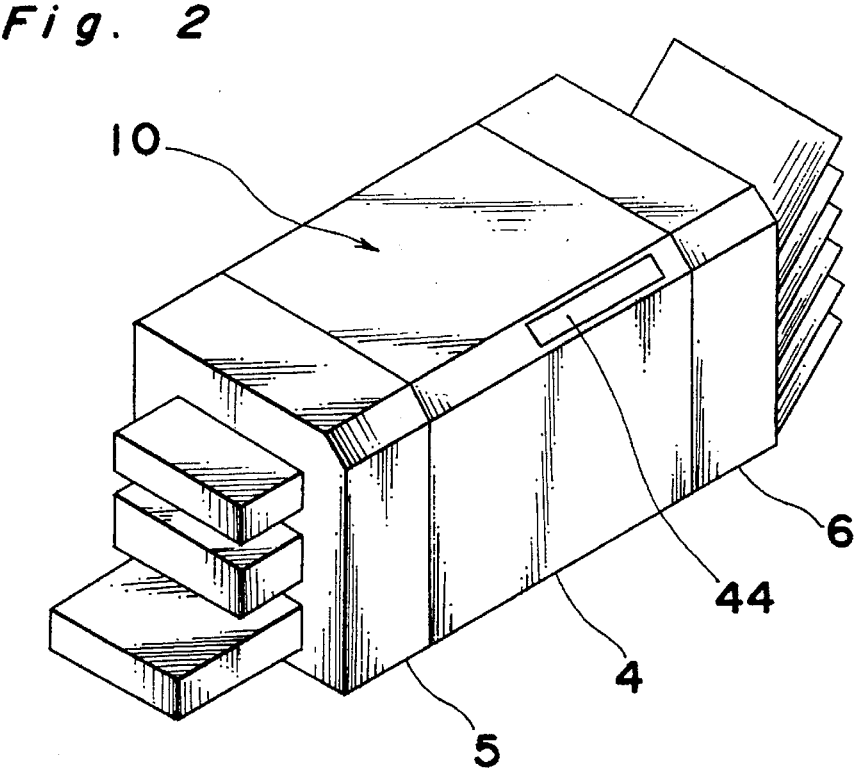
FIG. 2 is a perspective view of the printer according to the preferred embodiment of the present invention.

FIG. 2 illustrates a perspective view of the printer system 10.

The print engine 4 includes the bit map data processor 3 therein and the external paper supply unit 5 and the sorter 6 are assembled to the print engine 4. On a front edge portion of the upper surface of the body of the print engine 4, there is provided an operation panel 44 having display means for displaying various indications regarding the printer system and a key means for inputting data and/or commands.

Figure 3:
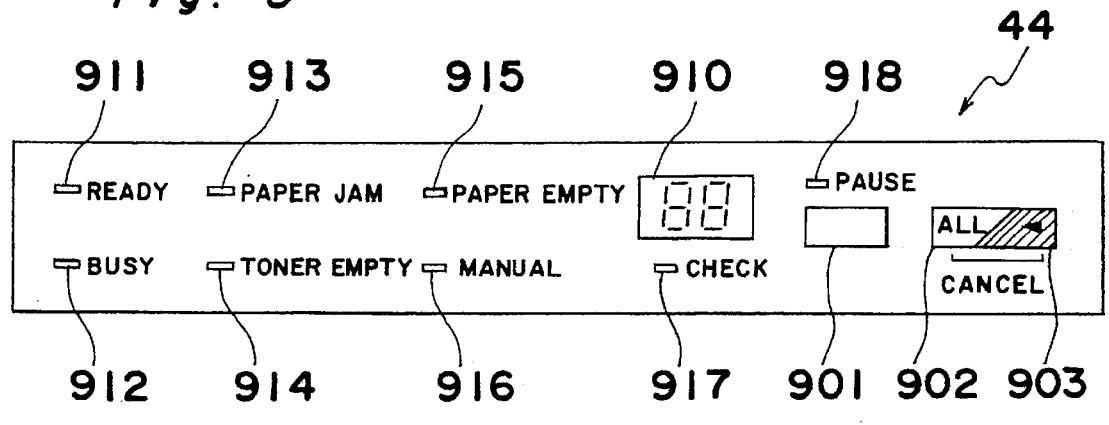
FIG. 3. is a plan view of an operation panel of the printer shown in FIG. 2.

FIG. 3 shows a plan view of the operation panel 44. On the operation panel 44, entry keys 901 to 903 and indicators 910 to 918 are arranged. The key 901 is a PAUSE key for stopping a printing operation temporarily. The key 902 is a TEST key for performing a test printing operation. The key 903 is a SHIFT key and becomes a CANCEL key for stopping a printing operation when it is pushed down together with the TEST key 902. The reason why CANCEL function becomes effective only when both of keys 902 and 903 are pushed down at the same time is to avoid an undesirable cancel by a careless operation.

Figure 4:
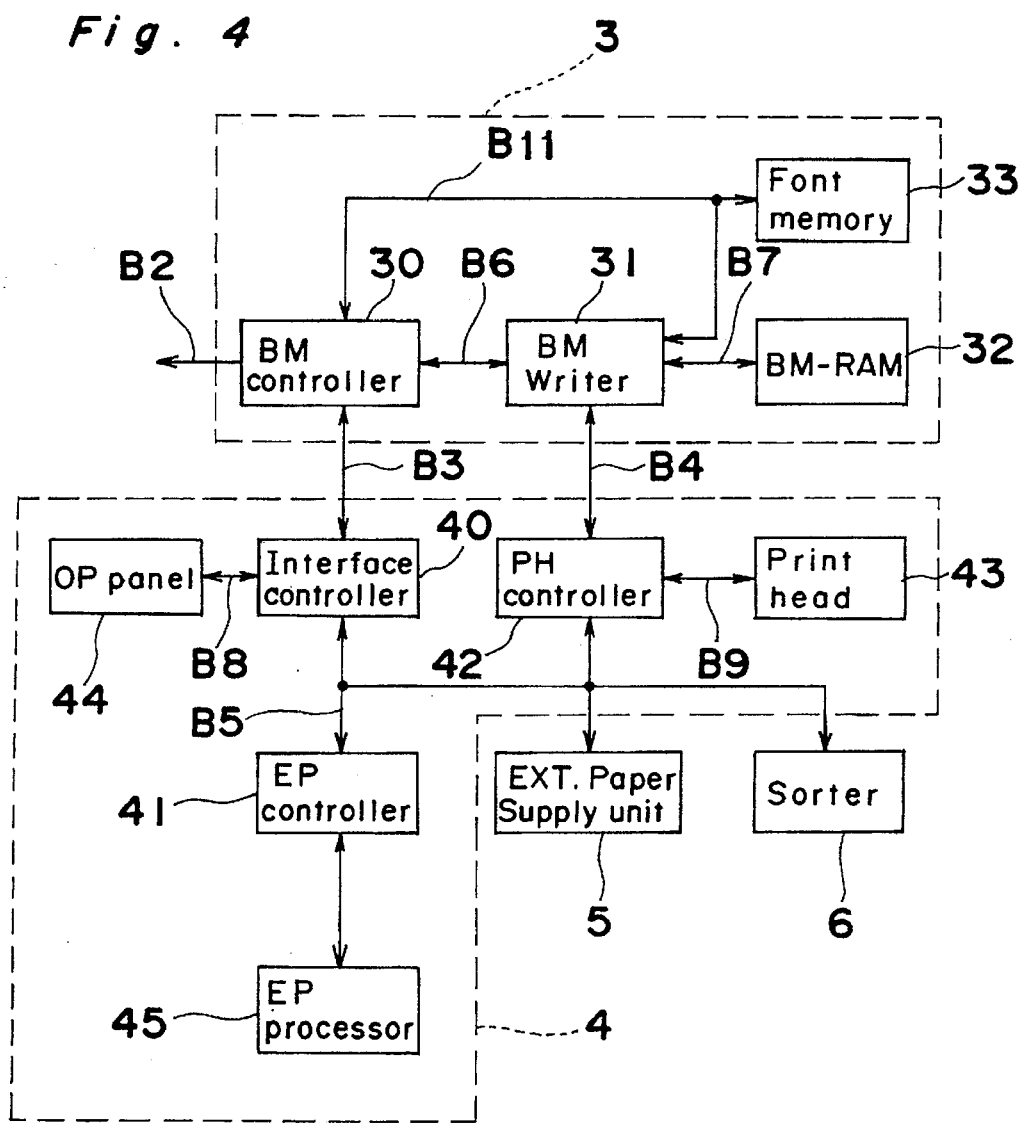
FIG. 4 is a block diagram showing a bit map type data processor and a print engine shown in FIG. 1.

FIG. 4 is a block diagram of the printer system 10.

The bit map data processor 3 is comprised of a bit map controller (BMC) 30, a bit map random access memory (BM-RAM) 32, a bit map writer (BMW) 31 for imaging bit images on BM-RAM 32 and a font memory means 33. Communication between the bit map data processor 3 and the print engine 4 is done through a bus means B3 for control data such as a number of prints, accessory control signals and the like and a bus means B4 for image data.

The print engine 4 is essentially comprised of an interface controller 40, an electro-photographic process controller 41 and a print head controller 42. The interface controller (IFC) 40 performs processing of control data from the bit map controller 30, control of the operation panel 44 and timing control of the print engine 4 through an internal bus B5. The electro-photographic process controller 41 controls an electro-photographic processor 45 according to data sent from the interface controller 40 through the internal bus B5. The print head controller (PHC) 42 controls a semiconductor laser and a polygon mirror provided in a print head 43 according to information sent from IFC 40 through the internal bus B5 in order to write image data sent from BMW 31 through the internal bus B4. Also, the external paper supply unit 5 and the sorter 6 are controlled, through the internal bus B5, by IFC 40.

The printer system 10 is preferably a kind of laser printer of a bit map type. Print data (being usually represented by codes) sent from the external data processor 1 is developed as dot images on BM-RAM 32 of the bit map data processor 3 and, then, outputted to the print engine 4. The print engine 4 writes dot images on a photoconductive drum by controlling the laser means according to data sent from the bit map data processor 3 and transfers written dot images on a blank paper according to the electro-photographic process as is well known to those skilled in the art.

Data sent from the external data processor 1 includes codes for control of print format and codes for setting respective modes of the print engine 4 other than image data. The bit map data processor 3 analyzes protocols of these codes other than character codes and outputs commands for print format control, for supplying a blank paper to the print engine 4, for alteration of mode of the accessory and the like according to the result of the protocol analysis. The print engine 4 performs various controls such as control of the print head 43, timing control of a paper, controls in synchronization with a paper feeding toward the sorter 6. These controls are similar to those of an electro-photographic copy machine except for control of scanning system which is needed for the latter.

(b) Bit Map Controller

FIG. 5 shows a block diagram of the bit map controller 30 according to a preferred embodiment of the present invention.

In order to write dot images by the bit map writer 31, it is necessary to calculate individual addresses in the font memory means and BM-RAM 32. This process takes a relatively long period of time.

According to the present invention, it is intended to speed up various processing to be executed in the bit map controller 30 by preprocessing data of the next page so as to transform the data into intermediate codes in the bit map controller 30 while printing dot images formed in BM-RAM 32.

In the preferred embodiment of the present invention, the first information processor 320 is provided for analyzing data and the second information processor 330 is provided for print control and these two processors 320 and 330 are connected via a P-RAM 305 for memorizing intermediate codes as shown in FIG. 5. Namely, the bit map controller 30 includes two CPUs sharing data processing functions which are normally done by one CPU in a conventional bit map controller. Further, P-RAM 305 connected between the first and second information processors 320 and 330 enables these two processors to work asynchronously from each other. Accordingly, this composition can reduce a possible stagnation in data flow which may be caused by delay in data processing by either one of them. Namely, the through-put of data is enhanced and, therefore, it becomes possible to increase the speed of the print engine 4.

The first information processor 320 executes PACKET processing for data stored temporarily in a R-buffer 304 asynchronously from data entry. In this packet processing, protocol analysis, pre-editing of image data into intermediate codes which are intended to make imaging into BM-RAM 32 easier and storing intermediate codes into P-RAM 305 are performed successively. In the pre-editing of image data, respective print positions of individual image data are determined according to the result of the protocol analysis. Therefore, every intermediate code includes a pattern code of the image data and an address on BM-RAM 32 at which a dot image corresponding to the intermediate code is to be formed.

The P-RAM 305 is preferably a first-in first-out memory (hereinafter referred to FIFO) in the present preferred embodiment. In the FIFO 305, transformed intermediate codes are sequentially written into an empty area thereof while they are read out in the order according to which they have been memorized therein. Thus, writing and reading of intermediate codes are executed without aid of software. Accordingly, each information processor 320 and 330 can operate irrespective of the other information processor.

The second information processor 330 reads the stored intermediate codes from FIFO 305 to process them. It outputs control commands for the print engine 4 corresponding to intermediate codes to the print engine interface 307, outputs intermediate codes other than control commands for the print engine to the bit map writer interface 306 and performs imaging of dot images into BM-RAM 32 and printing operation.

FIG. 6 shows an example of hardware structure for the first and the second information processors 320 and 330. Each of the information processors is comprised of a CPU 321 (331), a system ROM 322 (332) for storing programs for CPU 321 (331), a system RAM 323 (333) to be used for a working memory area and a timer 324 (334) for enabling CPU 321 (331) to control timing.

FIG. 7 shows a hardware structure of the FIFO 305. The FIFO 305 is comprised of a RAM 3051 and a timing control circuit for the RAM 3051. Data to be stored in the FIFO 305 are processed in units of packets which are preferably comprised of five words (each word is comprised of 16 bits). The RAM 3051 is controlled by circuits 3052 to 3055 so as to read or write data in units of one word. The control for the packet unit is executed by circuits 3056 to 3058.

The control in unit of a packet is executed by a packet counter 3056 which is an up and down counter of 14 bits in the present preferred embodiment. The packet counter 3056 is incremented by a PACKET WRITE pulse sent through a signal line 3108 after the first information processor 320 has outputted one packet to RAM 3051 through a signal line 3101. A count value of the packet counter 3056 is checked by a full check circuit 3057 and, when the packet counter counts up to a predetermined count value which is set at 13107 in the present preferred embodiment, a FIFO FULL signal is outputted to the first information processor 320 through a signal line 3110. Meanwhile, the existence of packets in RAM 3051 is checked by an empty check circuit 3058 and, when the count value of the packet counter 3056 is zero, a FIFO-EMPTY signal is outputted to the second information processor 330 through a signal line 3111. When it is confirmed that at least one packet exists in RAM 3051, the second information processor 330 sends a PACKET READ pulse to the packet counter 3056 through a signal line 3109 to read a packet. The packet counter 3056 is decremented by this PACKET READ pulse.

In order for the control of a word unit, two counters 3054 and 3055 are provided for counting packets independently. The write address counter 3054, which is comprised of a counter of 16 bits in the present preferred embodiment, is provided for indicating individual write addresses for word data to be written from the first information processor 320 into RAM 3051 and is counted up by a DATA WRITE pulse sent through a signal line 3105 when one word has been written into RAM 3051. On the contrary, the read address counter 3055 is provided for indicating individual read addresses for word data to be read from RAM 3051 into the second information processor 330 and is counted up by a DATA READ pulse sent through a signal line 3106 when one word has been read out of RAM 3051. Each of these counters 3054 and 3055 can be comprised of an up-counter or a down-counter, but they should be of a same type. Further a memory timing controller 3052 is provided for controlling memory timing of RAM 3051. It is driven by a DATA WRITE pulse and/or a DATA READ pulse. It has a function for switching an address selector 3053 and a function for adjusting timings of write end and read end through signal lines 3103 and 3104 in order to force respective information processor to wait when a DATA WRITE pulse and a DATA READ pulse are generated at the same time.

Meanwhile, the three counters 3054, 3055 and 3056 are forcibly cleared upon switching on the power source and therefore, the entire FIFO is cleared at that time.

Figure 8:
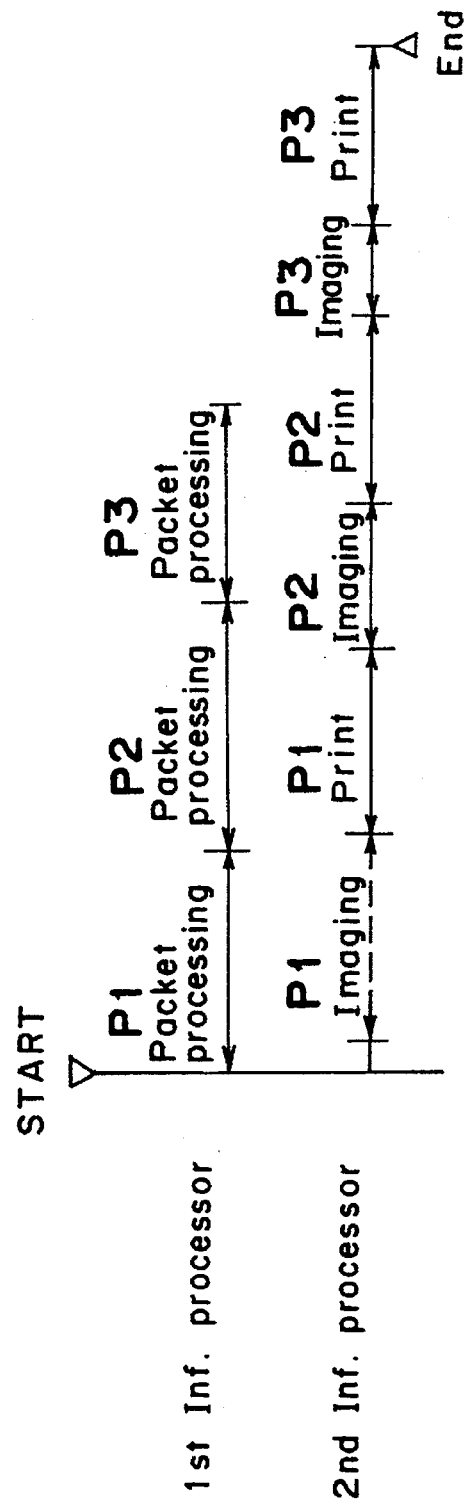
FIG. 8 is a time-chart showing relations of processing executed by the present invention.

As shown in a time chart of FIG. 8, when data (codes) of three pages are sent from the external data processor 1 sequentially, they are stored in R-buffer 304 in the order of pages. The first information processor 320 processes data stored in R-buffer 304 sequentially to transform them into intermediate codes and sends the transformed intermediate codes to the FIFO 305 in order to store them temporarily therein (hereinafter this processing is referred to as packet processing). Meanwhile, the second information processor 330 reads the intermediate codes from the FIFO 305, since the FIFO 305 is empty at first, and, sends the intermediate codes to the bit map writer 31 for transforming them into bit images.

Generally speaking, it takes much more time to transform data into intermediate codes than it does to transform intermediate codes into bit images. Due to this reason, the packet processing is performed intermittently because of waiting for every input signal or the like. The bit map writer 31 writes bit image data on BM-RAM 32. Writing bit images onto BM-RAM 32 and printing are performed in units of page. Namely, as soon as writing bit images of one page has been completed, the print of the first page P1 is started.

Since the FIFO 305 is interposed between the first and second information processors 320 and 330, each processor can process data independently of the other as long as available empty space exists in the FIFO 305. Accordingly, the first information processor 320 is able to begin data processing for the second page P2 as soon as the packet processing for the first page P1 is completed. Further, the second information processor 330 begins imaging of bit images of the second page P2 onto BM-RAM 32 by reading intermediate codes from FIFO 305 as soon as the first page P1 has been printed out. Since the packet processing of the second page P2 has proceeded considerably during printing the first page P1, imaging of the second page P2 can be done successively to the print of the first page P1. Similarly, data of the third page P3 are processed.

Accordingly, the packet processing by the first information processor 320 and the imaging by the second information processor 330 are performed in parallel and successively except for intermittent imaging of the first page P1 onto BM-RAM 32. This contributes to speed up the data processing.

Figure 9:
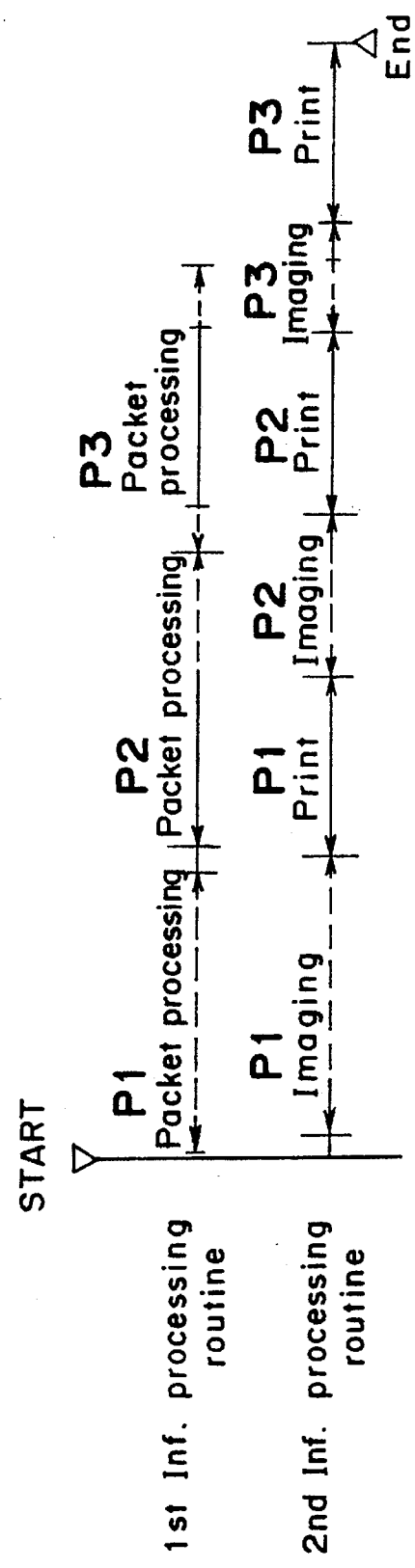
FIG. 9 is a time-chart showing relations of processing executed by a data processor of a conventional printer.

FIG. 9 shows a time chart of data processing according to a conventional printer system wherein the packet processing and the imaging are executed by one CPU. Since these processing are executed in a time-division mode by one CPU, they are executed intermittently, as indicated by dotted lines in FIG. 9, except for "in printing". This slows down the data processing accordingly.

(c) Image Area

Figure 10:
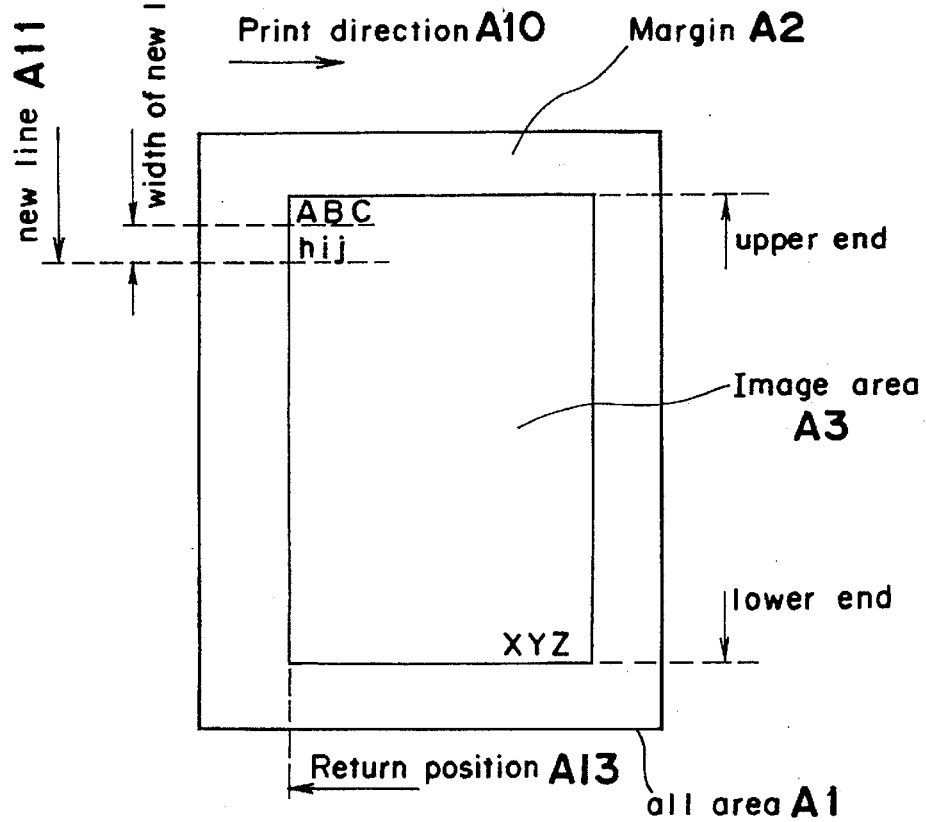
FIG. 10 is an explanative plan view for showing an image area.

FIG. 10 shows an example of an image area.

The area A1 corresponds to a paper of a predetermined size and, accordingly, to an area provided on the BM-RAM32. A margin area A2 is an area to be kept blank upon printing. During operation, images are printed on an image area A3 which is defined by subtracting the margin area A2 from the whole area A1.

The printing is started from a left upper corner of the image area A2 and proceeds in a printing direction A10. When a NEW LINE code is input, the next print position is moved by a line width A12 set for a new line in a new line direction A11. Where a RETURN LINE code is input, the next print position is moved to a return line position A13 on the left edge of the image area A3.

(d) Processing for Image Data and Output thereof

Figure 11:
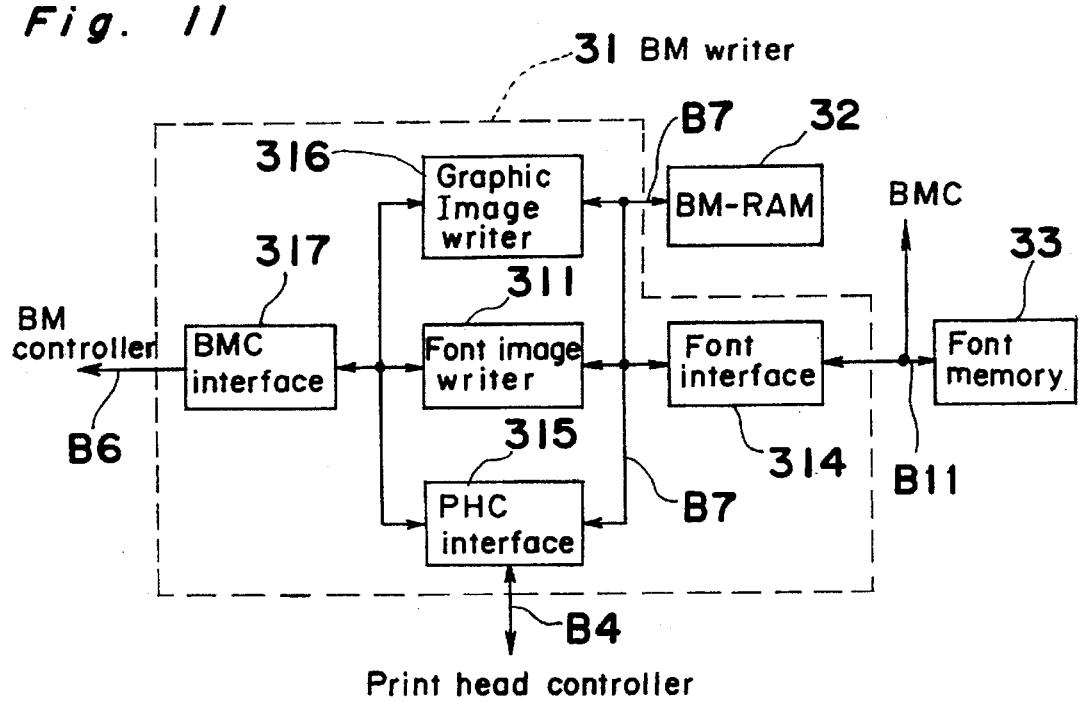
FIG. 11 is a block diagram of the bit map writer shown in FIG. 4.

FIG. 11 shows a block diagram of the bit map writer 31. The functions of the bit map writer 31 are generally classified into an imaging function onto the BM-RAM 32 and an outputting function for outputting data in the BM-RAM 32 to the print engine 4 upon printing.

The imaging function is further divided into an imaging function for imaging lines and/or circles which is executed by a graphic image writer (GIW) 316 and an imaging function for imaging characters which is executed by a font image writer (FIW) 311. Both of the graphic and font image writers 316 and 311 are operated according to packets sent from the bit map controller 30 through a bit map controller (BMC) interface 317. The graphic imagewriter 316 usually writes bit images on the BM-RAM 32 according to results obtained by analyzing parameters included in a packet, while the font image writer 311 usually writes font images on the BM-RAM 32 which are read from the font memory 33 through a font memory interface 314 according to data in the FIFO 305.

On the contrary, the output function for outputting data upon printing is executed by a print head controller interface 315. Namely, when it receives a PRINT START code sent from the bit map controller 30 through the bit map controller interface 317, it outputs data in the BM-RAM 32 to the print head controller 42 in synchronization with synchronized signals sent from a control circuit of the print head controller 422 through the bus B4.

(e) Bit Map Control

Hereinafter, operations of the printer system will be described according to flow charts shown in FIGS. 12 to 20.

In the printer system according to the present invention, two main routines are executed in parallel by the first and second information processors 320 and 330, respectively.

<e-1> Routine by 1st information processor

FIGS. 12 to 17 are flow charts of routines to be executed by the first information processor 320 of the bit map controller 30.

Figure 12:
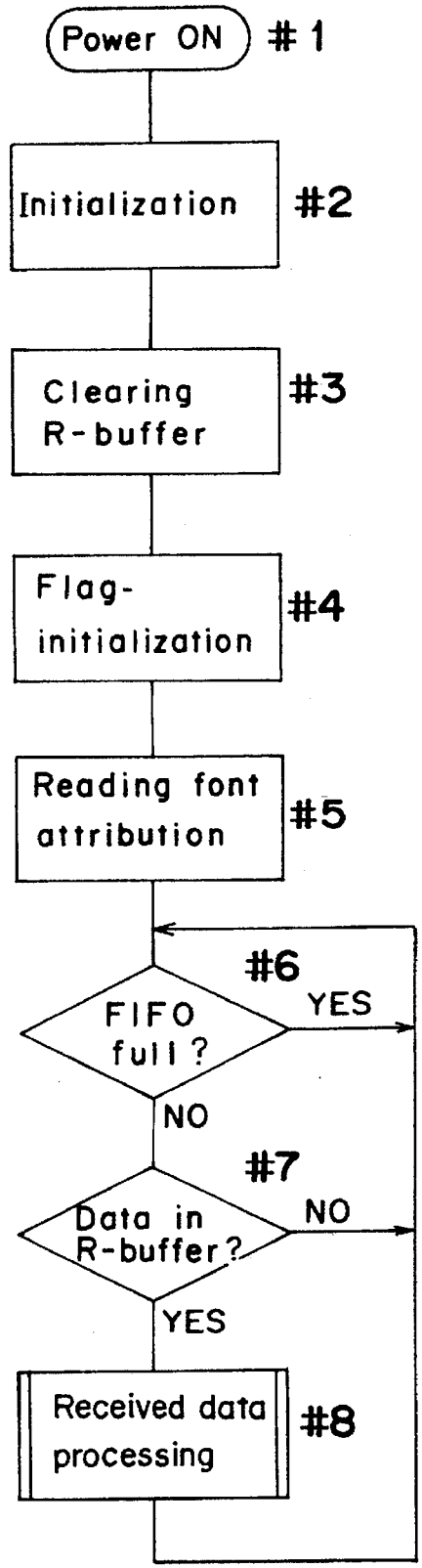

Referring to FIG. 12, when the power source is turned on at step #1, the first information processor 320 is initialized internally at step #2 and, then, R-buffer 304 for storing data received from the external data processor 1 is cleared at step #3. Also, a control flag is initialized at step #4. Concretely, an LPWRITE flag for indicating "pre-editing stage" in a received data processing routine is cleared. As stated above, the FIFO 305 is forcibly cleared upon switching on the power supply. Then, at step #5, a font attribution is read from the font memory 33 in preparation for transformation into intermediate codes in order to determine a font format of characters to be printed.

After completion of these preparation operations, the process enters into a main loop including steps #6, #7 and #8. In this main loop, analysis of received data and transformation into intermediate codes are executed. At first, data sent from the external data processor 1 is stored in R-buffer 304 by an interruption routine (See FIG. 17) for receiving data which is started in asynchronous with the main loop by a REQUEST command from the data processor interface 308. If the FIFO 305 is not full at step #6 and there are data in R-buffer 304, these received data are transformed into intermediate codes by a RECEIVED DATA PROCESSING routine (step #8 and see FIG. 13(a)) to store transformed intermediate codes in the FIFO 305. In other words, the first information processor 320 transfers data processing, via the FIFO 305, to the second information processor 330 in the style of intermediate codes. These intermediate codes include respective values of write addresses for the BM-RAM 32 which are calculated according to a selected font pattern and font size and, accordingly, they are deemed as pre-edited data.

The reason why the font attribution is read at step #5 is to pre-edit data asynchronously from imaging of characters executed by the second information processor 330.

Figure 13A:
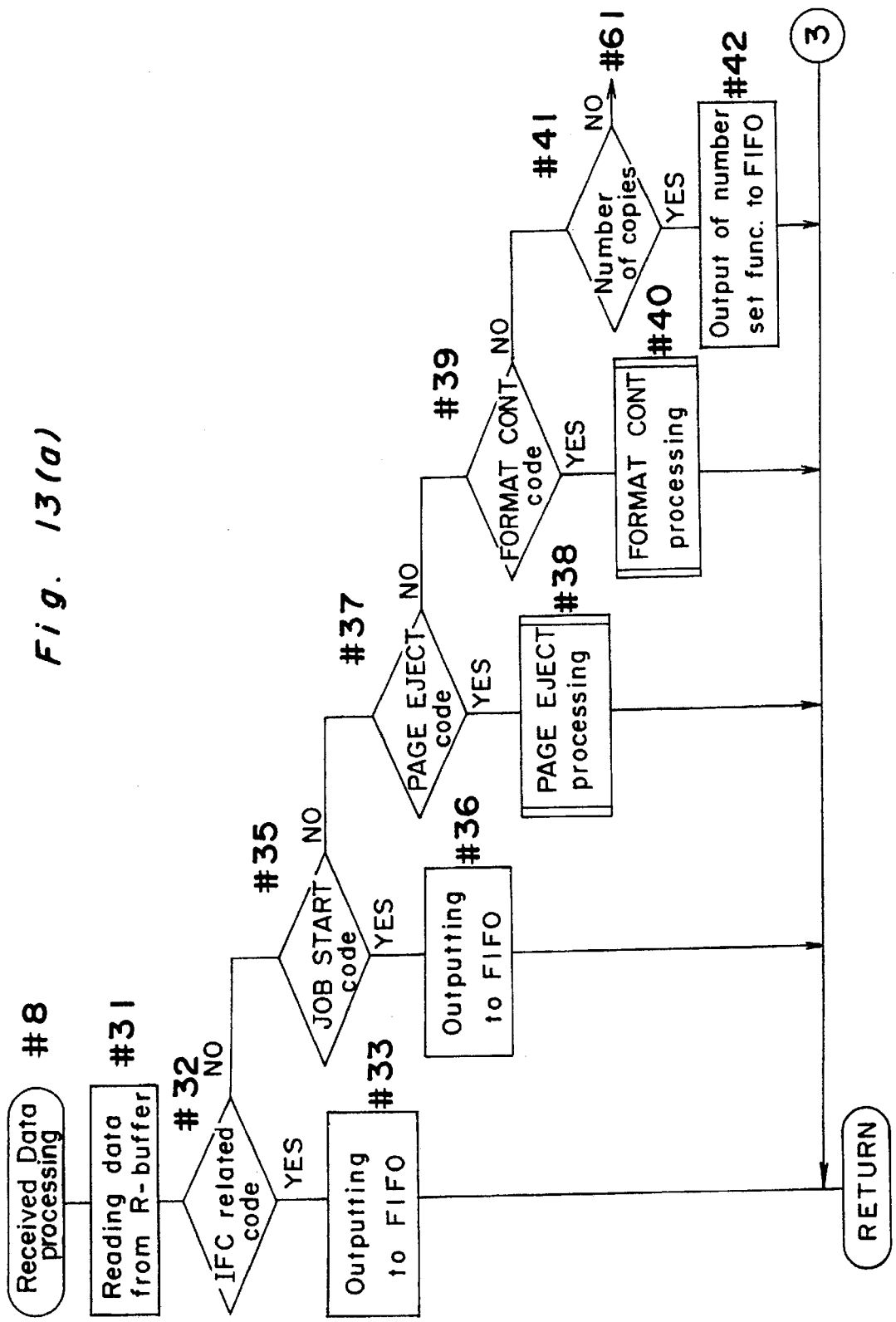
Figure 13B:
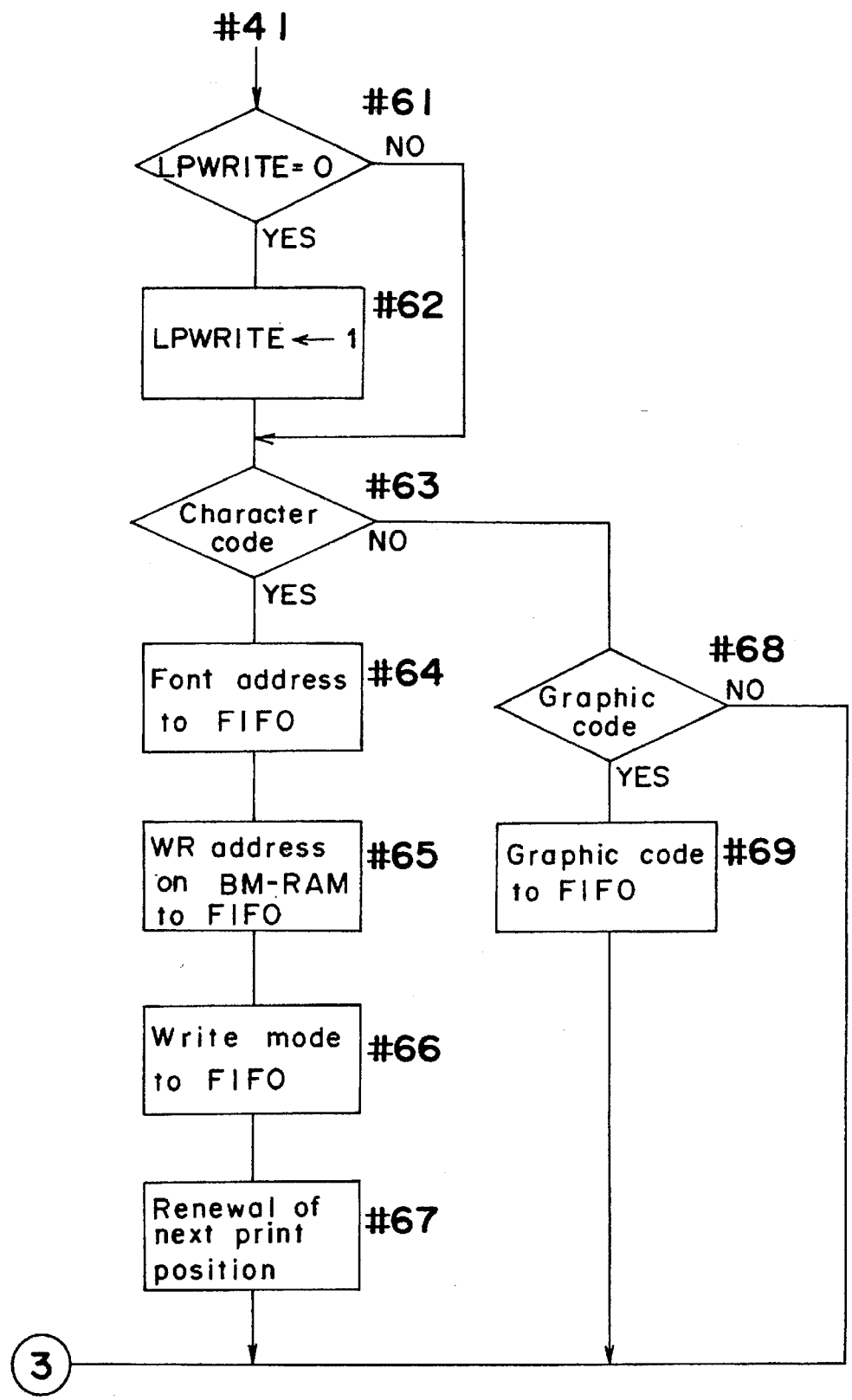

FIGS. 13(a) and 13(b) show a flow chart for the RECEIVED DATA processing.

The received data are classified into four kinds as follows:
 IFC related code (print engine related code)
 JOB control code (JOB START, PAGE EJECT)
 FORMAT control code
 Print data (Character code, Graphic code)

At first, each code data stored in R-buffer 304 is read therefrom and the kind of the code is identified at step #31. If it is print data (all NOs at steps #32, #35, #37, #39 and #41), the LPWRITE flag is set at "1" at step #62 and the print data is transformed into an intermediate code having a corresponding format to output the latter to the FIFO 305. If it is a character code (YES at step #63), an address of the corresponding font pattern which is calculated at step #64, a write address on the BM-RAM 32 corresponding to a print position on the image area A3 which is calculated at step #65 and a WRITE MODE code (step #66) are outputted to the FIFO 305 since the format of the character code is same as that of the font imagewriter 311. In the case of a character code, the next print position is renewed at step #67. If it is a graphic code (YES at step #68), a graphic function code is outputted to the FIFO 305 in a format same as that of a command to the graphic imagewriter 316 at step #69.

If the code data is an IFC related code (YES at step #32), it is to be outputted to the FIFO 305 as an intermediate code of function type being different from a type of print data in order for synchronization with print data at step #33.

As JOB CONTROL codes, there are provided PAGE EJECT code for indicating an end of every page and JOB START code for indicating an end of every JOB (every group of pages). If the code data is either one of JOB CONTROL codes (YES at step #35 or #37), it is outputted to the FIFO 305 at step #36 or #38 similarly to the IFC related code.

A FORMAT CONTROL code is provided for altering the print format. If the code data is a FORMAT CONTROL code (YES at step #39), FORMAT CONTROL processing is executed at step #40 (see FIG. 15).

If the code data is a code for designating a number of copies for the same image (YES at step #41), a function corresponding to the code is outputted to the FIFO 305 at step #42 in order to synchronize print data.

Figure 14:
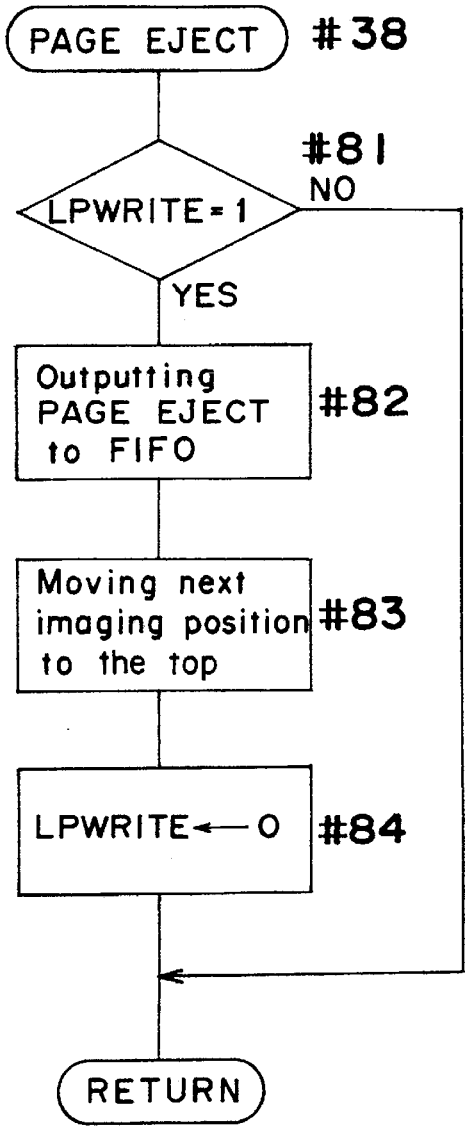

FIG. 14 shows a flow chart for PAGE EJECT processing at step #38 of FIG. 13.

This PAGE EJECT processing is a kind of imaginary processing for pre-editing data on the FIFO 305 as intermediate codes and, accordingly, is different from INTERMEDIATE DATA processing (see FIG. 19) wherein a paper supply action is accompanied. This processing is executed when the LPWRITE flag is set at "1" (at step #81). At first, an intermediate code indicating PAGE EJECT is outputted to the FIFO 305 at step #82. However, an actual paper discharge is done when the second information processor 330 receives the intermediate code from the FIFO 305.

At step #83, the next print position is moved to the top position of the image area in preparation for edition of the next page. Then, the LPWRITE flag is reset at "0" at step #84. If the LPWRITE flag is equal to "0" at step #81, the PAGE EJECT processing is not executed in order to avoid a discharge of an empty page.

Figure 15:
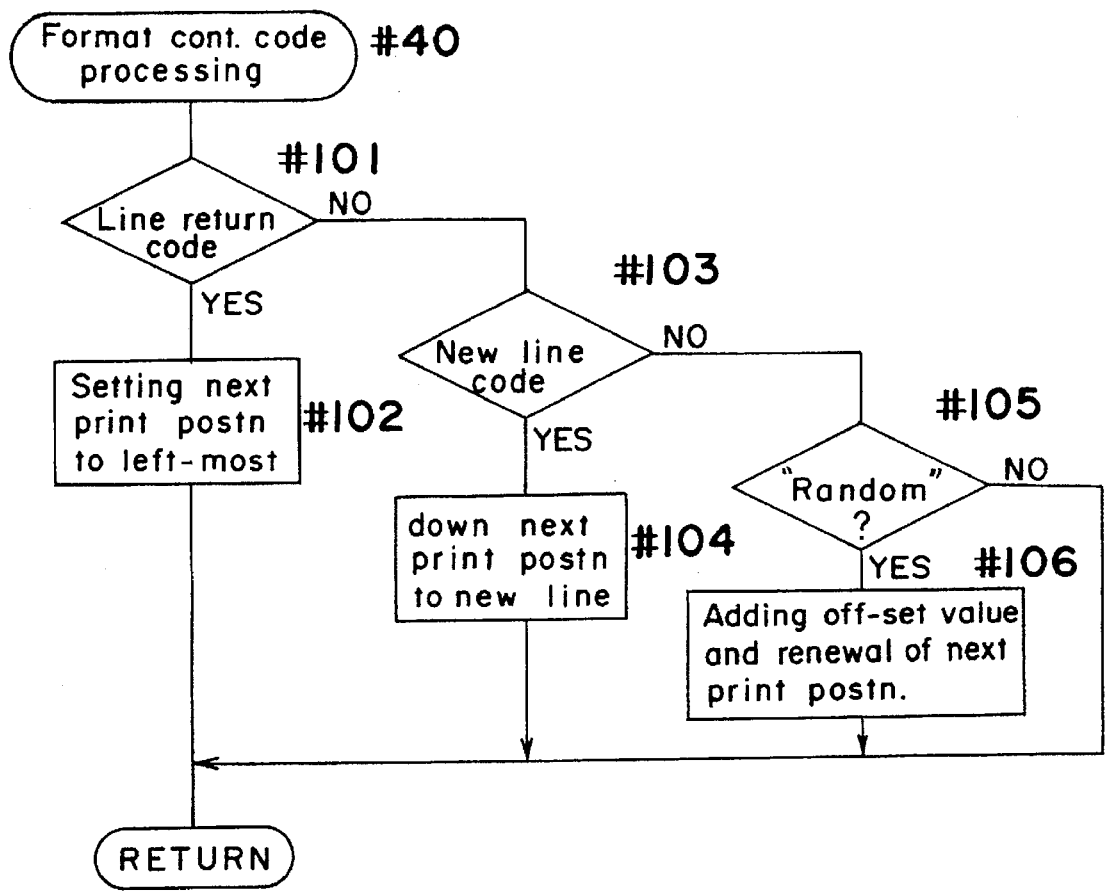

FIG. 15 shows a flow chart for FORMAT CONTROL CODE processing at step #40 of FIG. 13 (see FIG. 10).

If the code data is a RETURN LINE code at step #101, the next print position is moved to the left-most position A13 of the image area A3 at step #102. If the code data is a NEW LINE code at step #103, the next print position is moved down by one line at step #104. If the code data is a RANDOM DESIGNATION code at step #105, the next-print position is renewed by adding an off-set value at step #106.

Figure 16:
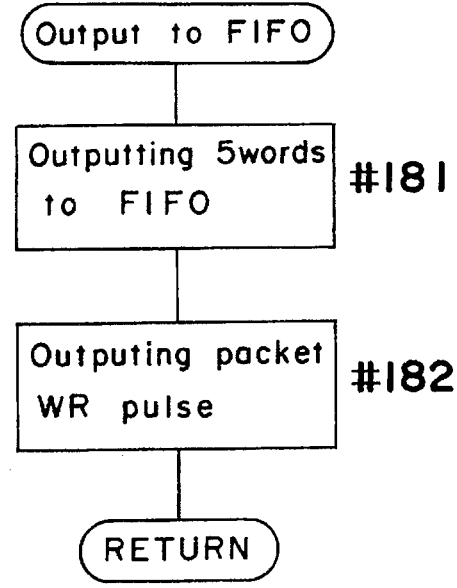

FIG. 16 shows an output routine of packet toward the FIFO 305. When one packet (5 words) has been outputted to the FIFO 305 at step #181, a PACKET WRITE pulse is outputted to the FIFO 305 at step #182.

Figure 17:
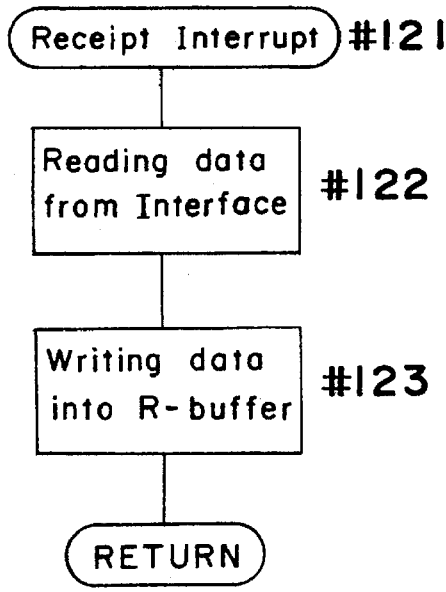

FIG. 17 shows an interruption routine to be executed upon data receipt.

When an interruption signal is input from the external processor interface 308 at step #122 and, then, the data is written into R-buffer 304.

<e-2> Routine by 2nd information processor

FIGS. 18, 19(a) and 19(b) and 20 show respective flow charts of routines to be executed by the second information processor 330.

Figure 18:
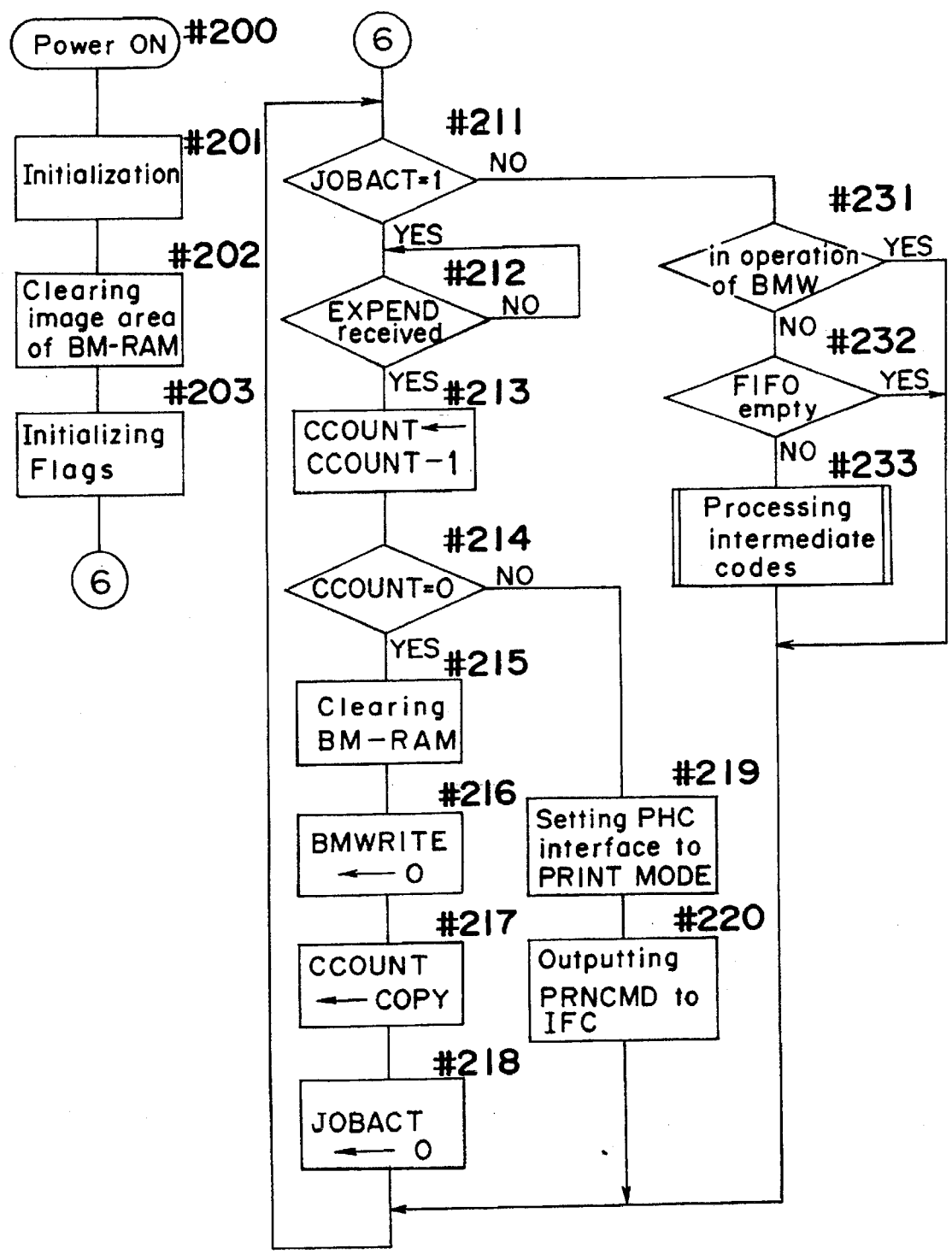

In FIG. 18, when the power is turned on at step #200, an internal initialization is done at step #201, the image area A3 of the BM-RAM 32 is cleared at step #202 and control flags are initialized at step #203. Specifically, a JOBACT flag for indicating a printing state and a BM-WRITE flag for indicating an imaging state to the BM-RAM 32 are cleared, a COPY flag for indicating a number of copies for the same page is set at "1" and a copy counter CCOUNT for counting the number of copies for the same page is set at "1".

After the initialization of these flags, the process enters into the main routine which includes a print sequence control from step #212 to step #220 and a processing for intermediate codes from step #231 to step #233.

If the JOBACT flag which is a flag indicating a paper discharge condition is "1" at step #211, the process enters into the print sequence control which will be stated later.

If the JOBACT flag is not equal to "1" the process proceeds to step #231 in order to execute the processing for intermediate codes at step #233.

Figure 19A:
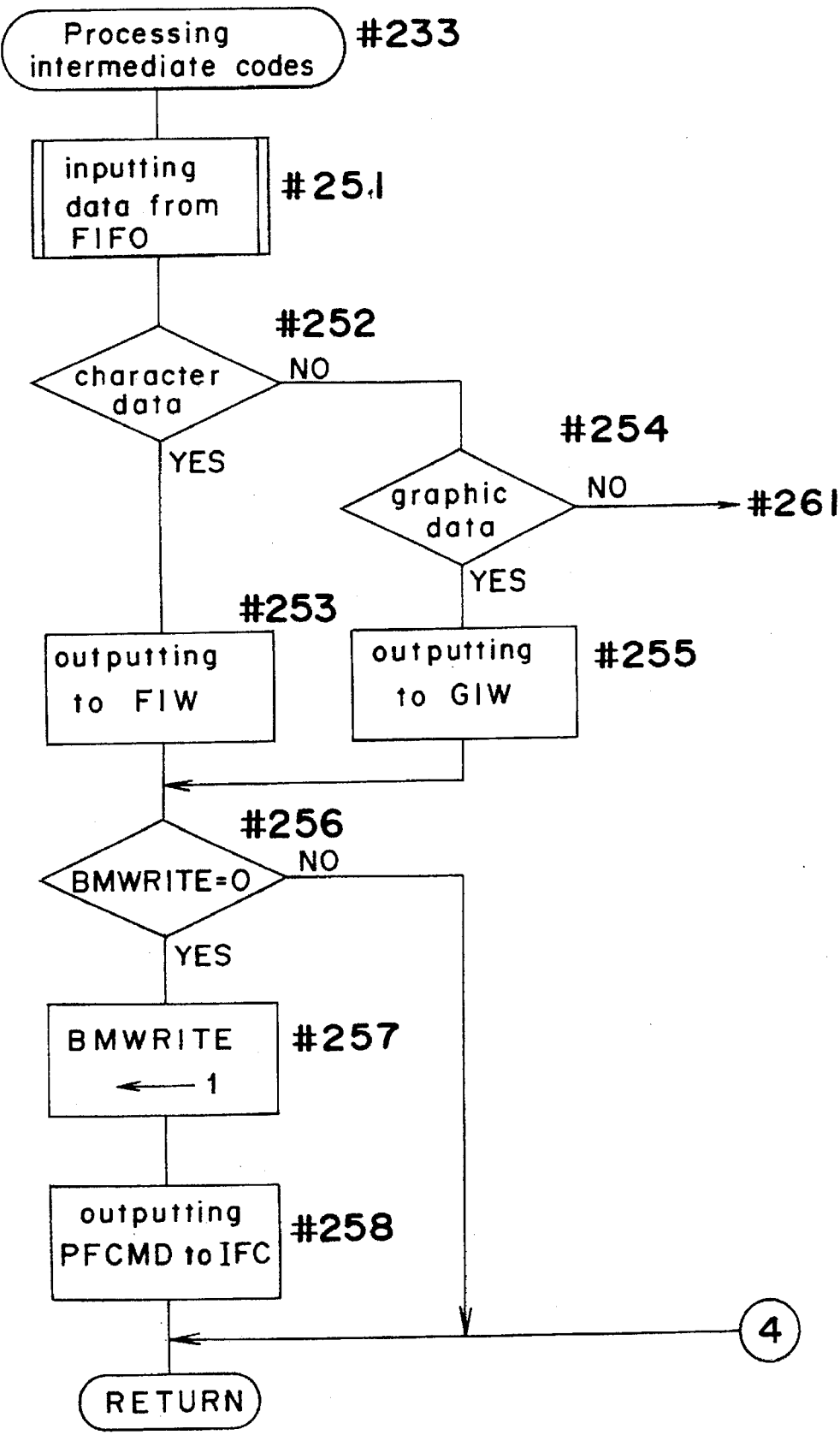
Figure 19B:
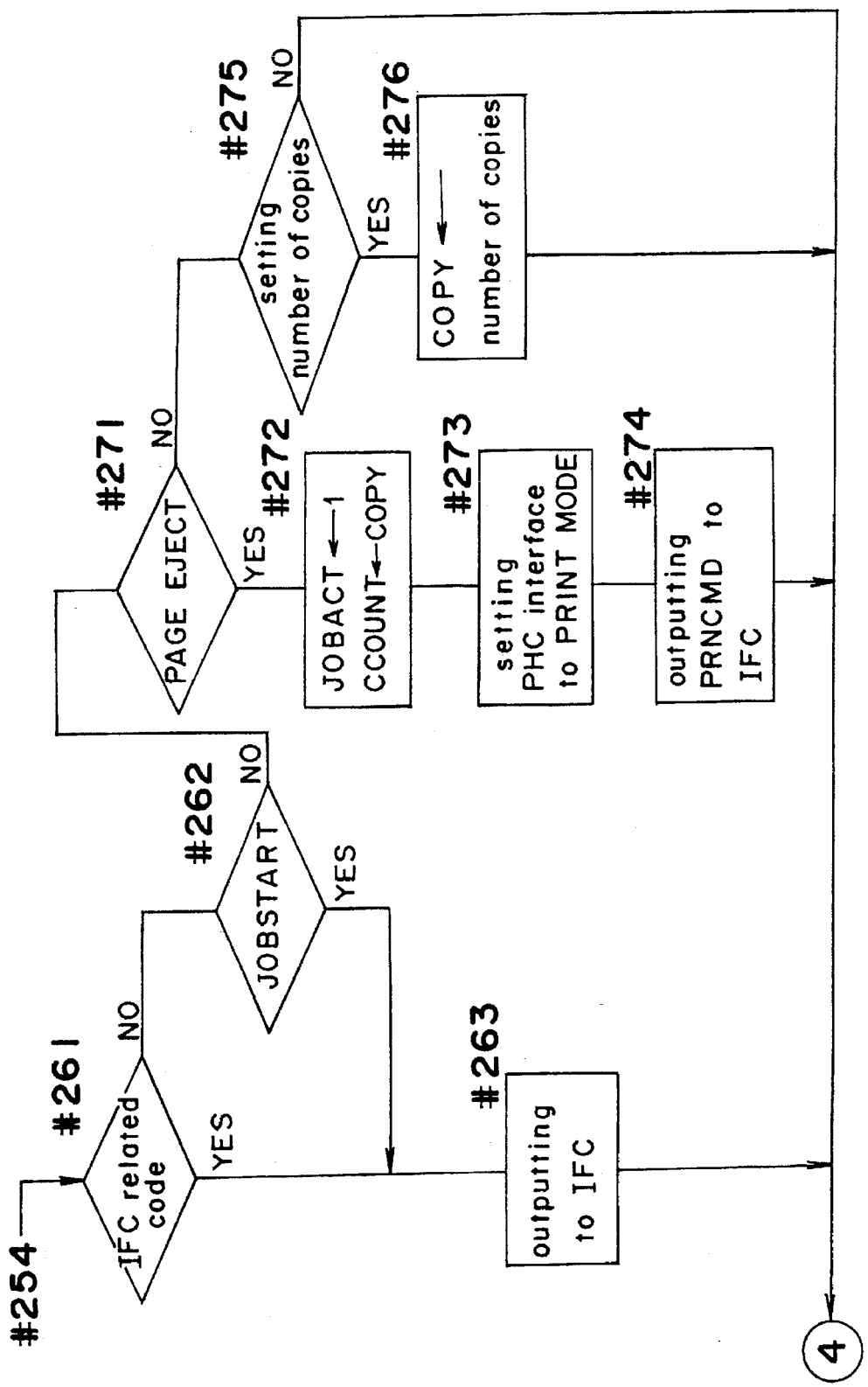

FIGS. 19(a) and 19(b) show a flow chart of the processing for intermediate codes (#233).

In this processing, an imaging of a bit image onto the BM-RAM 32 is performed according to an intermediate code read from the FIFO 305 and a sequence control for the print engine 4 by outputting commands thereto. At first, an intermediate code having been stored in FIFO 305 is read out at step #251. If it is a character data (YES at step #252), it is outputted to the font imagewriter (FIW) 311 at step #253. If it is a graphic data (YES at step #254), it is outputted to the graphic imagewriter (GIW) 316 at step #255.

If it is the first data to be written, namely, a BMWRITE flag is equal to "0" at step #256, the flag is set at "1" at step #257. At step #258, a PFCMD command for prefeeding a blank paper is outputted to the interface controller 40 in order to make the print engine 4 perform a preparation for printing. Due to this step, an exposure by the laser beam to the photoconductive drum can be started as soon as the preparation for printing has been completed in the bit map data processor 3. Accordingly, the throughput of data is improved.

In the case of an IFC related code (at step #261) or of a JOB START code (at step #262), the code is outputted to the interface controller 40 at step #263.

Though the output of intermediate codes from the FIFO 305 to the bit map writer 31 is continued as long as they are in the FIFO 305 (see steps #214 to #216 of FIG. 18), if the PAGE EJECT code is detected at step #271, the process starts a print action since data transformation of one page has been finished. The JOBACT flag is set at "1" in order to prohibit from imaging bit images to the BM-RAM 32 and the CCOUNT is renewed at step #272. Also, the renewal of the BM-RAM 32 is prohibited thereat. Then, the print head controller interface 315 is set into the print mode at step #273 and a PRNCMD (print command) is outputted to the interface controller 40 at step #274.

If it is a code for setting a number of copies (at step #275), a COPY indicating the number of copies is renewed at step #276. After these steps, the print head controller interface 315 outputs data of the BM-RAM 32 to the print head controller 42 through the bus B4 in synchronization with pulses sent therefrom.

When the print operation has been finished, the process returns to the main routine shown in FIG. 12.

Since the JOBACT flag is set still at this stage (step #211), the process waits until an EXPEND command for indicating an end of exposure is outputted from the interface controller 40 at step #212.

When, an EXPEND command is detected at step #212, the process proceeds into a copy control routine for the same image (page). Namely, at first, the copy counter CCOUNT is decremented at step #213 and, then, it is checked at step #214 whether copies of a predetermined number have been finished. If finished, the BM-RAM 32 is cleared at step #215 in order for the next imaging. Then, the BMWRITE flag is cleared at step #216, the copy counter CCOUNT is reset to the value of COPY at step #217 and the JOBACT flag is reset in order to cancel the printing state.

If not finished at step #214, the print operation for the same image is repeated at steps #219 and #220.

Figure 20:
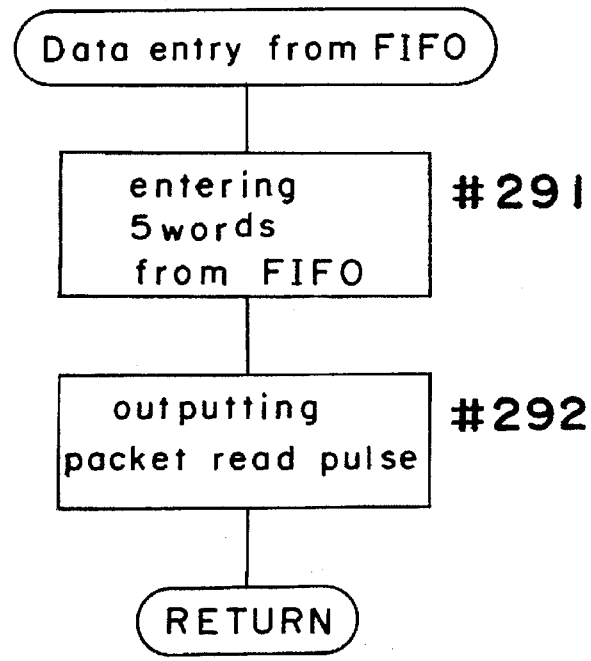

FIG. 20 shows an input routine of data from the FIFO 305 which corresponds to the subroutine of step #251 in FIG. 19. After five words have been entered from the FIFO 305 at step #291, a PACKET READ pulse is outputted to the FIFO 305 at step #292.

Second Preferred Embodiment

Figure 21:
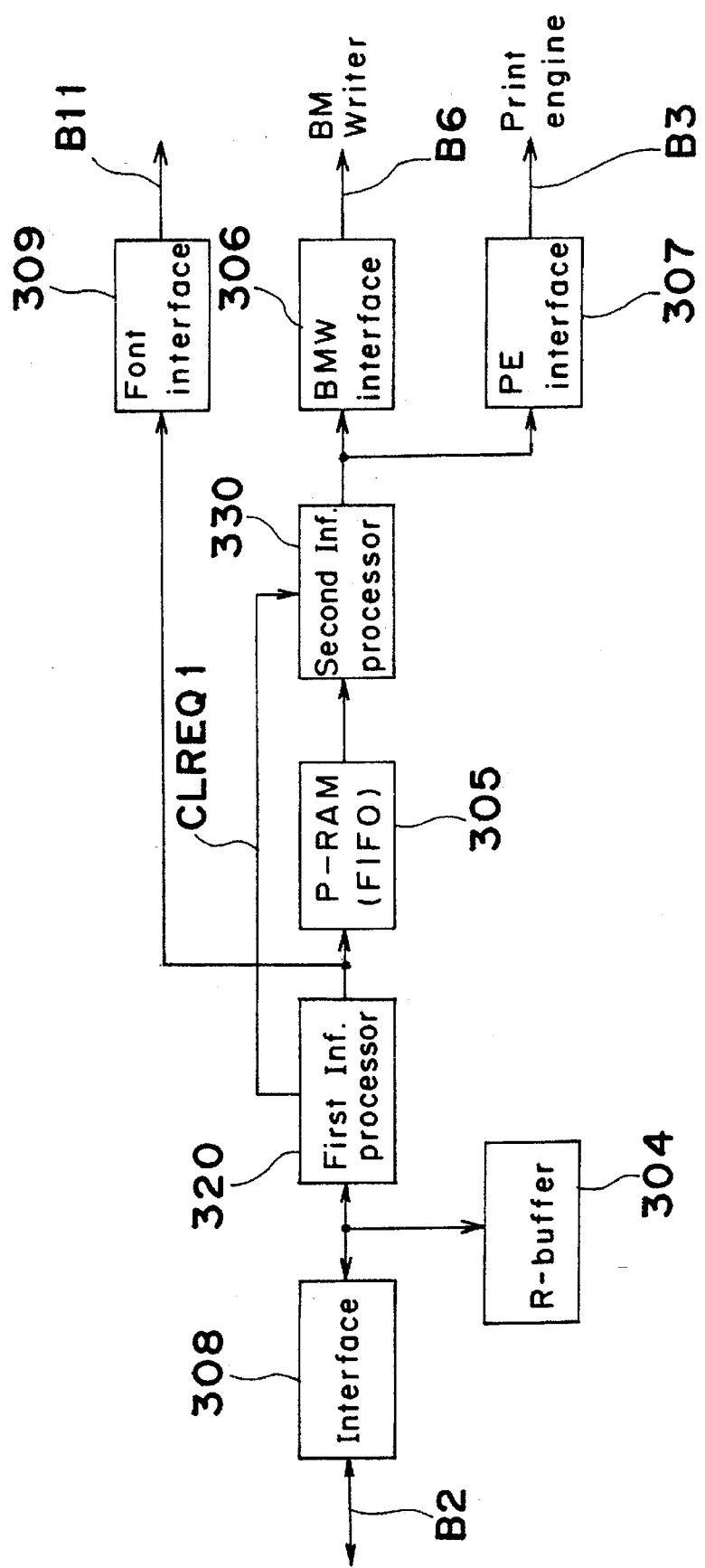
FIG. 21 is a block diagram showing a bit map controller according to a second preferred embodiment of the present invention.

FIG. 21 shows a block diagram of the bit map controller 30.

As is apparent from comparison of FIG. 21 with FIG. 5, in the second preferred embodiment of the present invention, there is provided a signal line CLREQ 1 which connects between the first information processor 320 and the second information processor 333 directly. The first information processor 320 can send a signal such as a CLEAR REQUEST signal or the like to the second information processor 330 through the signal line CLREQ 1 at real time.

Accordingly, the first information processor 320 enables the second information processor 330 to cancel data thereof without slowing down the processing speed of data.

According to the second preferred embodiment, two types of cancel processing can be performed in the bit map controller 30.

One of them is a CURRENT PAGE cancel wherein the current page data being imaged at the present time is cancelled and another one is an ALL PAGE cancel wherein all data stored in the FIFO 305 and the BM-RAM 32 is cancelled.

Figure 22:
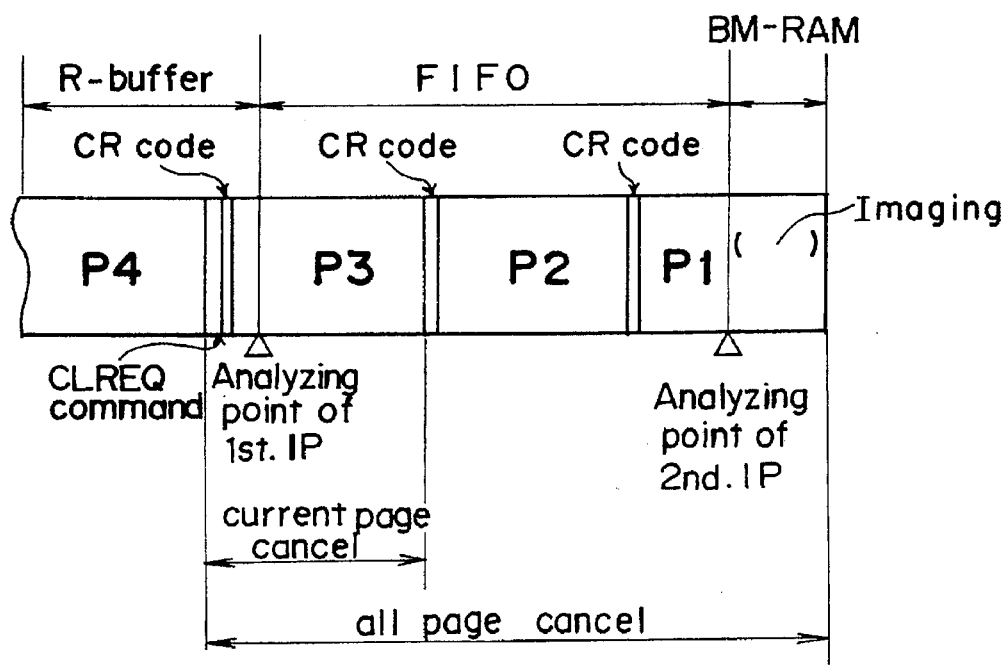
FIG. 22 is an explanative diagram showing CURRENT PAGE cancel and ALL PAGE cancel.

FIG. 22 shows ways how these cancel processing are made.

In the CURRENT PAGE cancel, if the first information processor 320 is now processing data of the third page at the timing that a CANCEL REQUEST (CLREQ) command is input thereto, only data of the third page is cancelled.

According to the ALL PAGE cancel, all data contained in the first to third pages are cancelled assuming that the second information processor 330 is now processing data of the first page at the timing mentioned above.

When CANCEL code (command) is sent from the external data processor 1, it is stored in R-buffer 304 at first. And, when it is read into the first information processor 320, the cancel processing is made.

Figure 23:
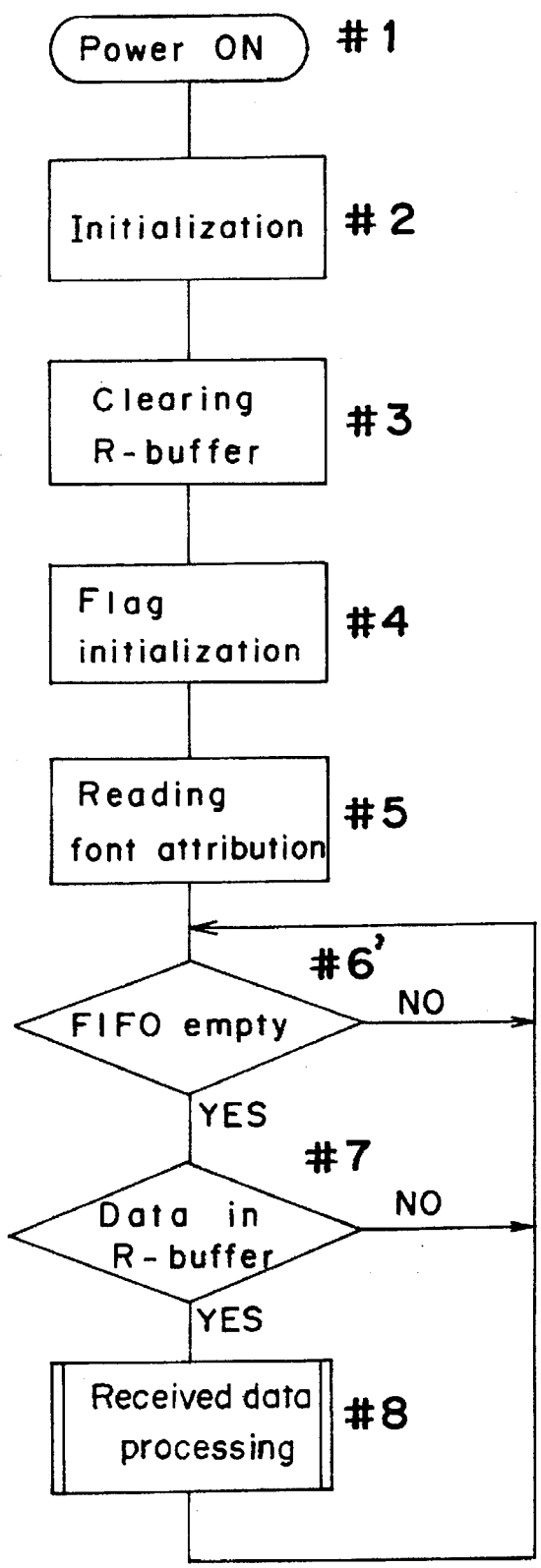
FIG. 23 is a flow chart of a main routine to be executed by the first information processor.
Figure 24A:
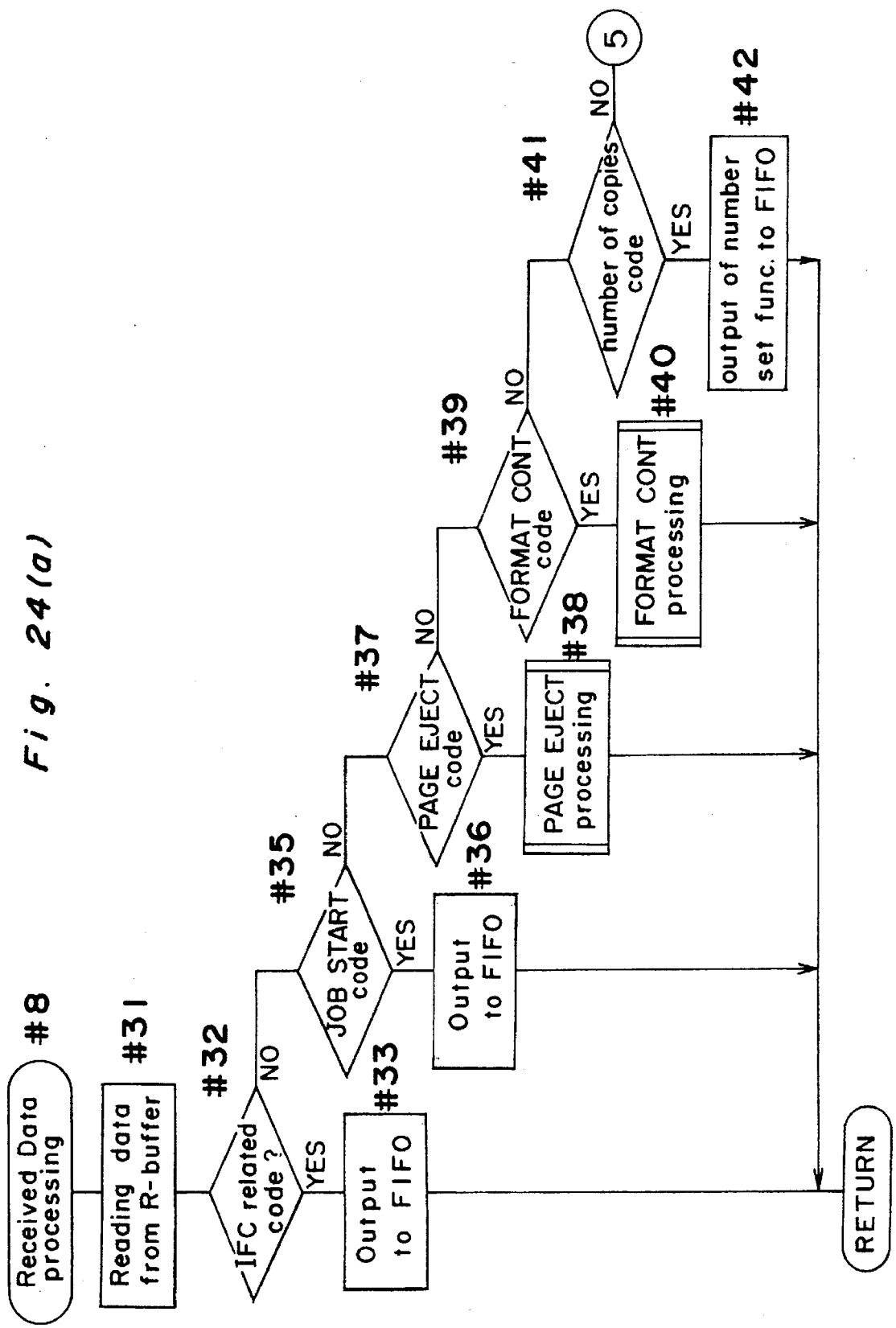
FIGS. 24(a), 24(b), and 24(c) are parts of a flow chart of RECEIVED DATA processing routine to be executed by the first information processor.
Figure 24B:
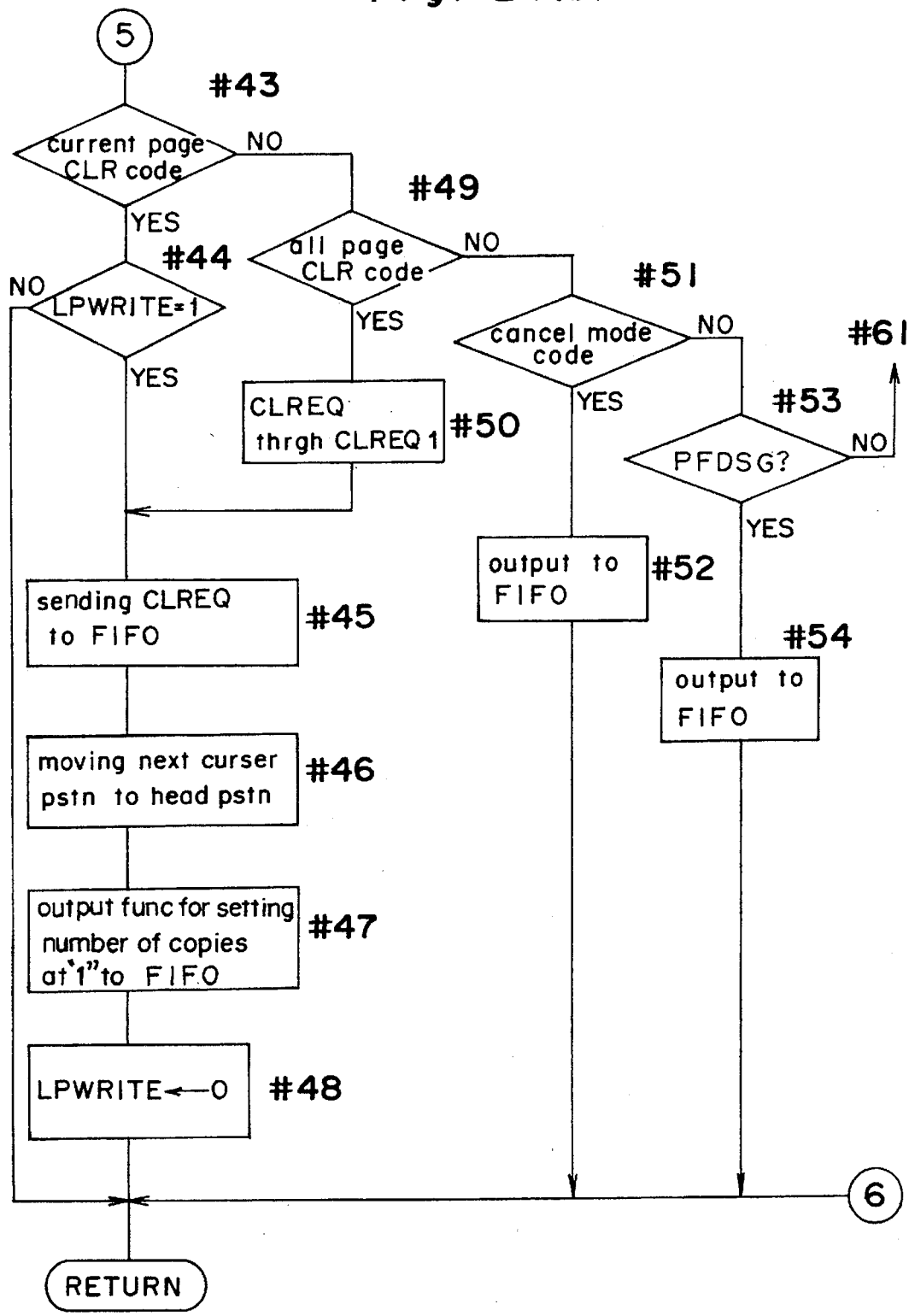
Figure 24C:
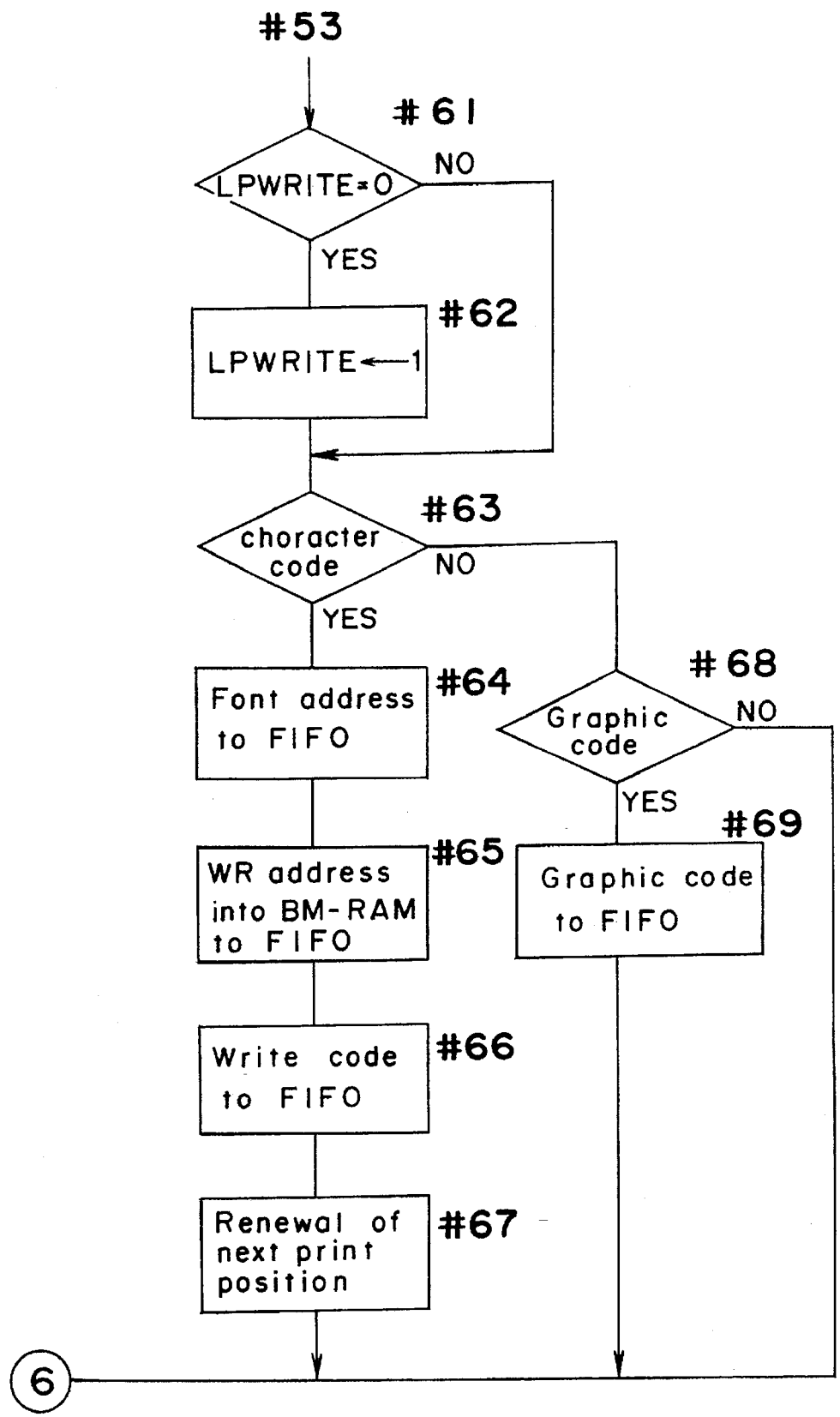

FIGS. 24(a), 24(b) and 24(c) show RECEIVED DATA processing which is a subroutine corresponding to step #8 of processing FIG. 23 being substantially equal to FIG. 12.

As is apparent from comparison of FIGS. 24(a)–(c) with FIGS. 13(a) and 13(b) of the first preferred embodiment, steps from #31 to #42 in FIG. 24(a) are the same as those of the first half (FIG. 13(a)) and steps from #61 to #69 in FIG. 24(a) are the same as those of the last half (FIG. 13(b)). In other words, steps from #43 to #54 in FIG. 24(b) are inserted between the first half (FIG. 13(a)) and the last half (FIG. 13(b)).

If the code data read at step #31 is a CURRENT PAGE CANCEL (CLEAR) command at step #43, a CLEAR REQUEST (CLREQ) code is sent to the FIFO 305 at step #45 so as for the second information processor 330 to be able to detect a completion of the CLEAR processing. Then, the next cursor position is moved to the top position at step #46 in order to set a state for writing image data onto a new page, a function for setting a number of copies at "1" is sent to the FIFO 305' at step #47 and, finally, LPWRITE flag is reset to "0" at step #48. Accordingly, the second information processor 330 proceeds to the CLEAR processing only when CLREQ function is received from the FIFO 305. Therefore, the CLEAR processing is executed in synchronization with image data.

If the code data is the ALL PAGE CLEAR code at step #49, the CLREQ command is outputted, through the signal line CLREQ 1, to the second information processor 330. In the second information processor 330, CLREQ i interruption is executed when CLREQ command is received as will be explained with respect to FIG. 26. Then, the process proceeds to steps #45 to #48 similarly to the CURRENT PAGE cancel.

Due to this processing, the second information processor 330 can receive the CLREQ command directly from the first information processor 320 which is synchronized with another CLREQ command outputted to the FIFO 305 together with image data and, therefore, a range wherein data are to be cleared can be detected from the direct CLREQ through CLREQ 1 line and another CLREQ from the FIFO 305.

The CANCEL MODE code includes a code for indicating to output data now being imaged on the BM-RAM 32 as they are and a code for indicating to discharge a blank paper after clearing the BM-RAM 32.

This CANCEL MODE code is outputted to the FIFO 305 at step #52, similarly to the case of IFC related code.

Also, a PREFEED DESIGNATION code for designating PREFEED mode is outputted to the FIFO 305 at step #53.

FIG. 25, 26, 27(a), 27(b), 28, 29 and 30 show flow charts of routines to be executed by the second information processor 330.

Figure 25:
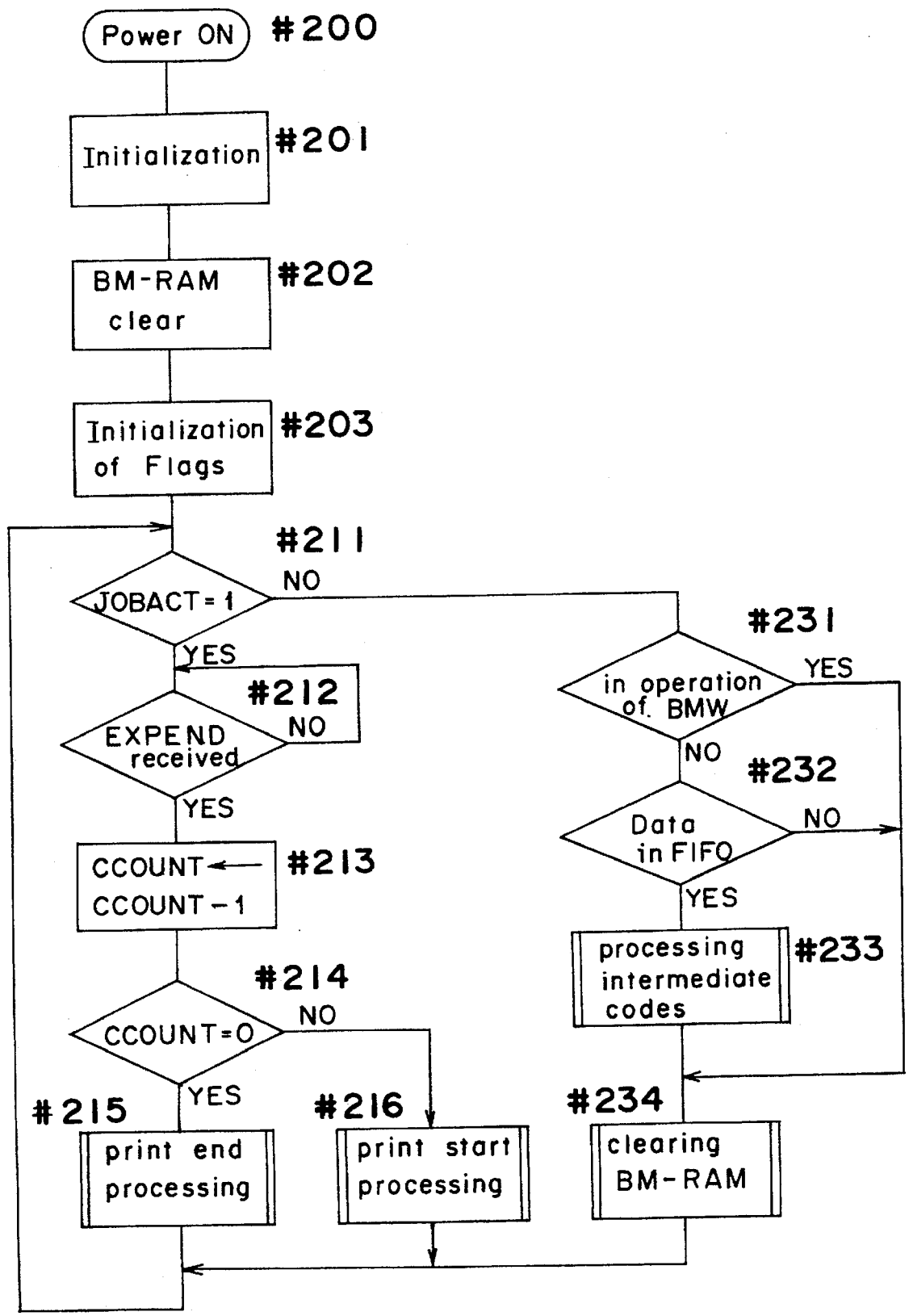
FIG. 25 is a flow chart of a main routine to be executed by the second information processor.

FIG. 25 which corresponds to FIG. 18 shows a main routine of the second information processor 330.

The routine shown in FIG. 25 is substantially the same as that of FIG. 18 except for BM-RAM CLEAR processing at step #234. The BM-RAM CLEAR processing subroutine at step #234 will be stated in detail with use of FIG. 29.

Figure 26:
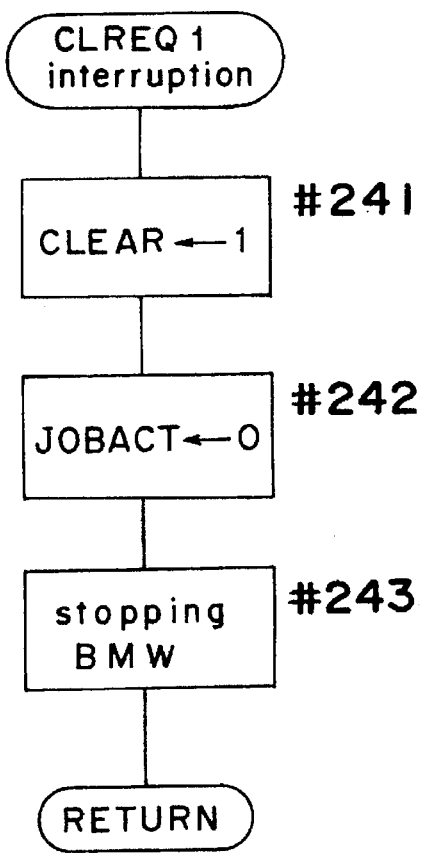
FIG. 26 is a flow chart of CLREQ 1 interruption to be executed by the second information processor.

FIG. 26 shows an interruption subroutine by the signal line CLREQ 1. When an interruption is caused, the CLEAR flag is set at "1" at step #241 and, at step #242, the JOBACT flag is reset in order not to enter into the print sequence (steps from #212 to #216) of the main routine. Further, the bit map writer 31 is controlled to stop imaging thereby at step #243.

Figure 27A:
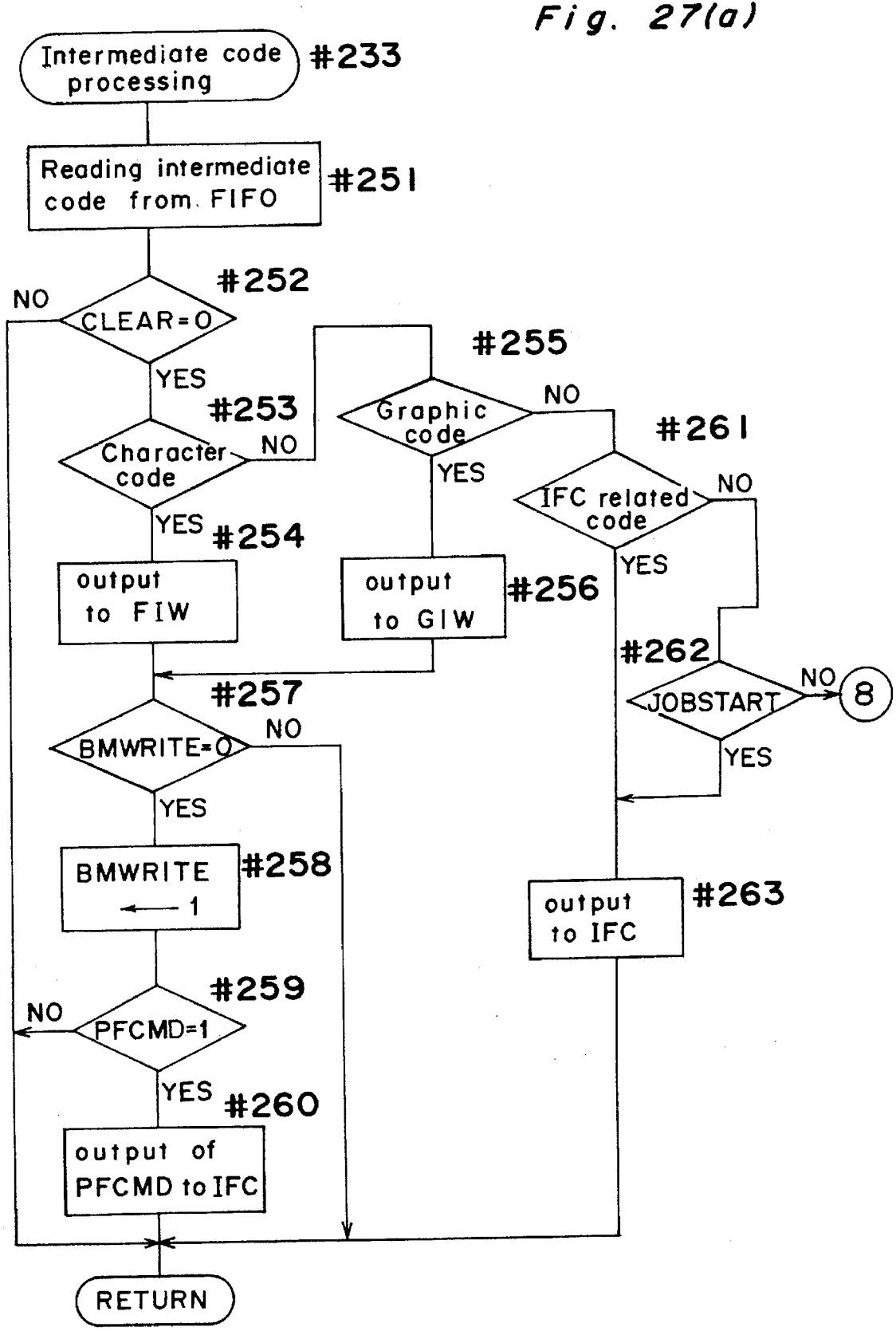
FIGS. 27(a) and 27(b) are parts of a flow chart of INTERMEDIATE CODE processing routine to be executed by the second information processor.
Figure 27B:
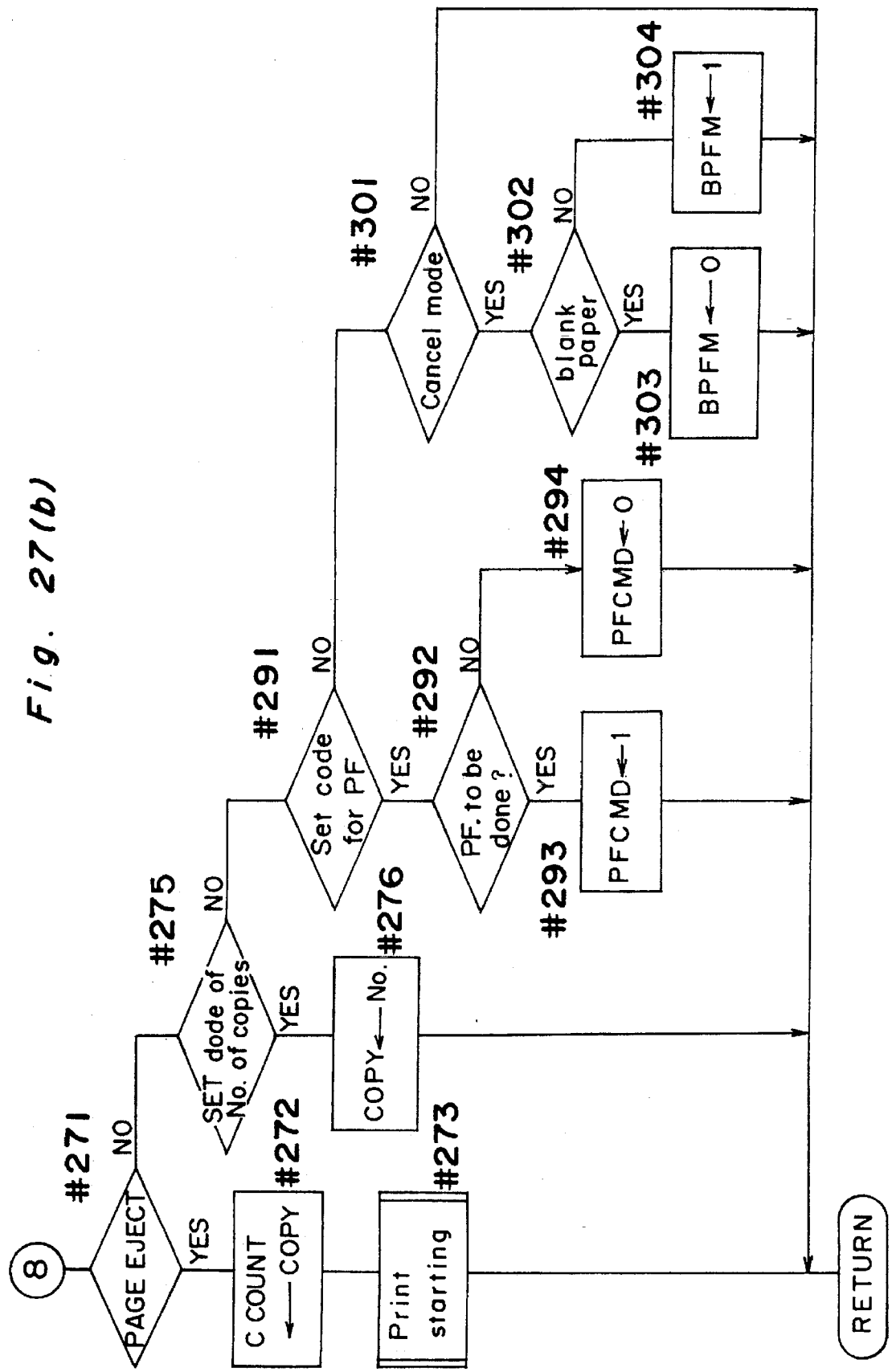

FIGS. 27(a) and 27(b) show INTERMEDIATE CODE processing. Steps from #251 to #276 are substantially the same as those of FIGS. 19(a) and 19(b) of the first preferred embodiment. In other words, steps #291 to #294 and steps #301 to #304 are added in FIG. 27(b).

If the intermediate code is a PREFEED code at step #291, it is decided at step #292 whether the PREFEED operation is to be performed or not. If it is to be performed, a PECMD (PREFEED command) flag is set at "1" at step #293. If it is not to be performed, the PFCMD flag is set at "0" at step #294.

If the intermediate code is a CANCEL MODE SET code at step #301, it is decided at step #302 whether a blank paper is to be discharged or not. If it is so, a BPFM (BLANK PAPER FEED command) flag is set at "0" at step #303. If it is not so, the BPFM flag is set at "1" at step #304.

Figure 28:
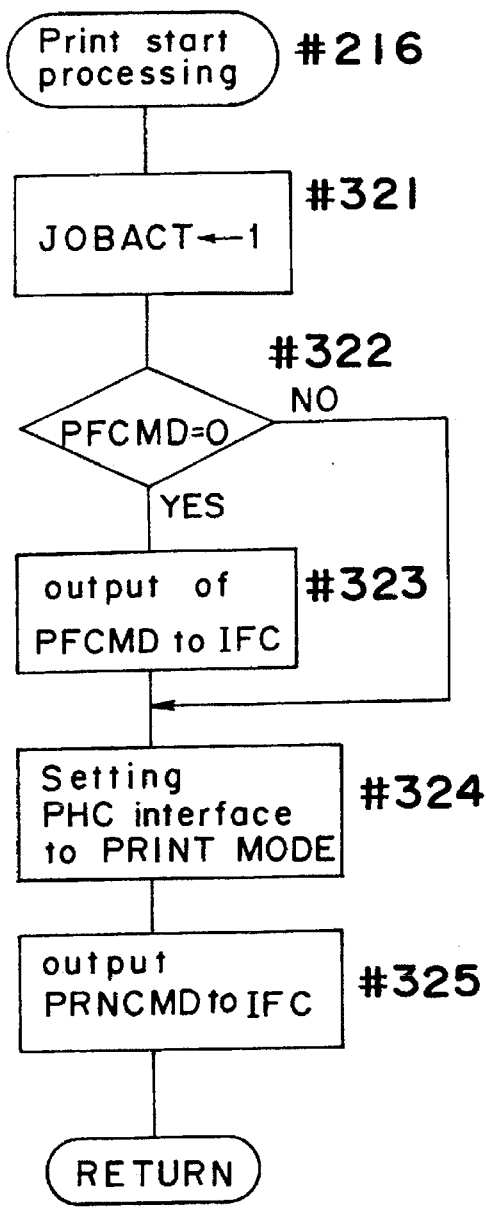
FIG. 28 is a flow chart of PRINT START processing routine to be executed by the second information processor.

FIG. 28 shows a subroutine of PRINT START processing at step #216 shown in FIG. 25.

When this subroutine is started, renewal of the BM-RAM 32 is prohibited by setting the JOBACT flag at "1" at step #321 at first and, only when the PFCM flag is not set at "1" at step #322, a PFCMD (PRE-FEED command) is outputted to the interface controller 40 at step #323. After setting the print head controller interface 315 in the print mode at step #324, a PRNCMD (PRINT command) is outputted to the interface controller 40 at step #325. After these steps, the print head controller interface 315 outputs data of BM-RAM 32 through the bus B4 in synchronization with pulses sent from the print head controller 42.

Figure 29:
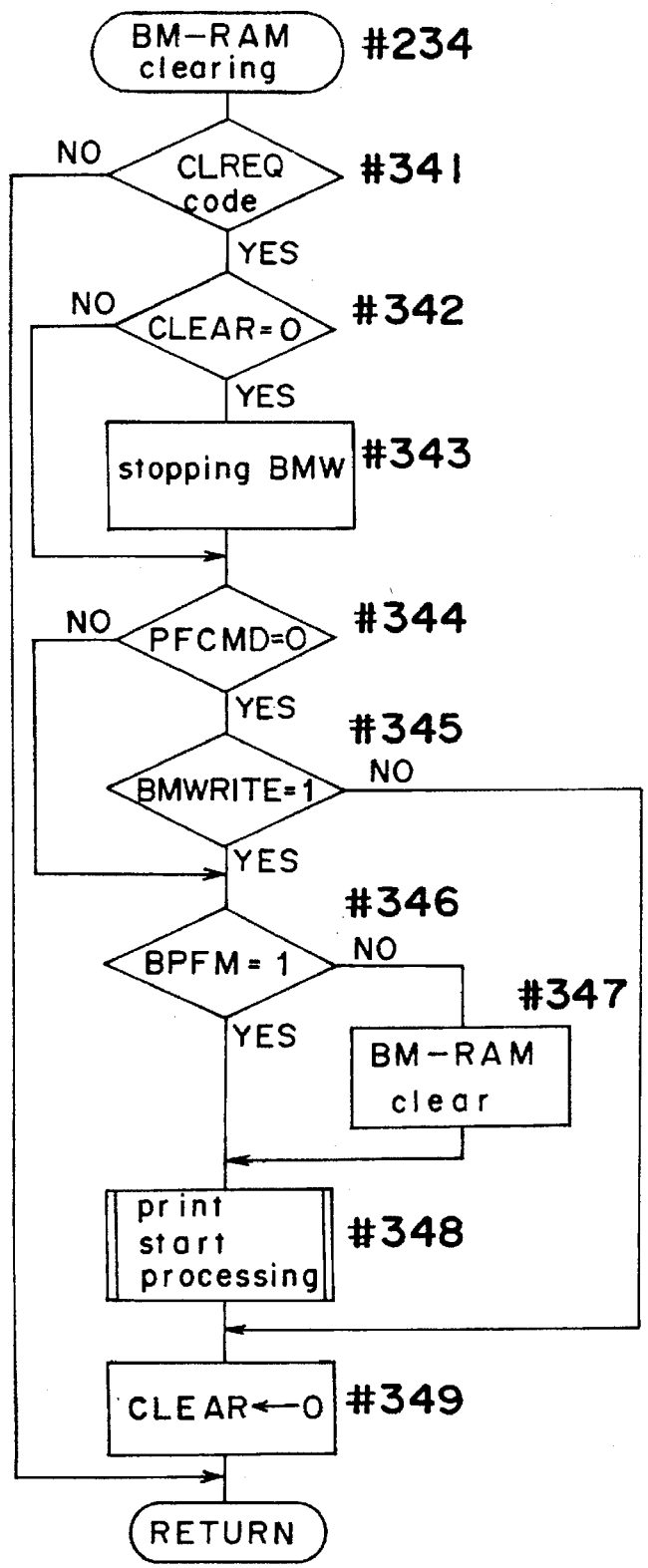
FIG. 29 is a flow chart of BM-RAM CLEAR processing routine to be executed by the second information processor.

FIG. 29 shows a subroutine of BM-RAM CLEAR processing of step #234 of FIG. 25. This subroutine is executed forcibly even when the bit map writer 31 is imaging a character image or a graphic image.

If the intermediate code is not a CLREQ code at step #341, the process returns without doing anything.

If it is a CLREQ code at step #341 and only when the CLEAR flag is not set at "1" at step #343, namely a CURRENT PAGE CLEAR code is input from the external data processor 1, the bit map writer 31 is stopped at step #343. Next, it is decided at step #344 whether a PFCM (PREFEED command) is designated or not. If it is not, namely, it is set at "1" at step #344, the process skips step #345 to execute PAPER DISCHARGE processing. If it is equal to "0" at step #344 and if the BMWRITE flag is set at "1" at step #345, the process also proceeds to execute PAPER DISCHARGE processing.

If the BPFM flag is set at "0" at step #346, the BM-RAM 32 is cleared at step #347 prior to the start of the printer at step #348. Accordingly, if the BPFM flag is equal to "0", a blank paper is discharged from the printer. On the contrary, if the BPFM flag is equal to "1" at step #346, image data having been imaged already are printed out at step #348. Thereafter, the CLEAR flag is reset at step #349.

If any image data has not been written on the BM-RAM 32 (NO at step #345), the CLEAR flag is reset at once at step #349.

After resetting the CLEAR flag, the process returns to step #211 of FIG. 25.

Figure 30:
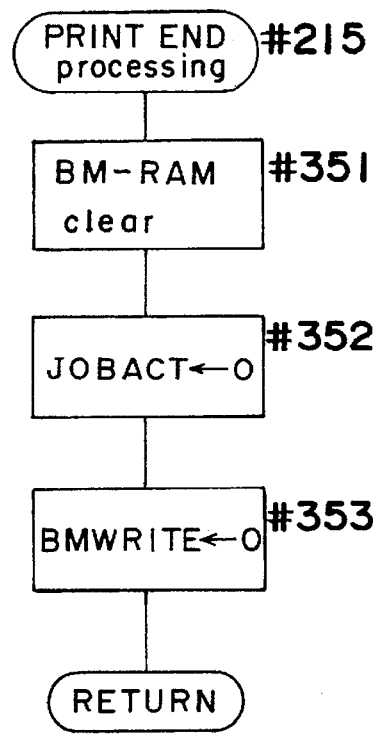
FIG. 30 is a flow chart of PRINT END processing routine to be executed by the second information processor.

FIG. 30 shows PRINT END processing of step #215 of FIG. 25.

In this processing, the BM-RAM 32 is cleared in order to image the next page at step #351, the JOBACT flag is reset in order to release the print state at step #352 and, then, the BMWRITE flag for indicating an imaging state to the BM-RAM 32 is reset at step #353.

If "ALL PAGE CLEAR" is requested by the first information processor 320 and, accordingly, the CLEAR flag is set at "1" (at step #252 of FIG. 27(a), intermediate codes in the FIFO 305 are skipped over in the INTERMEDIATE CODE processing until the CLREQ code is checked. Accordingly, intermediate codes read from the interruption by CLREQ 1 till the CLREQ command are cancelled sequentially.

If the CLREQ command is entered into the second information processor 330 at step #341 of FIG. 29, the BM-RAM 32 is cleared to cancel all bit images written thereon, as mentioned above.

Figure 31:
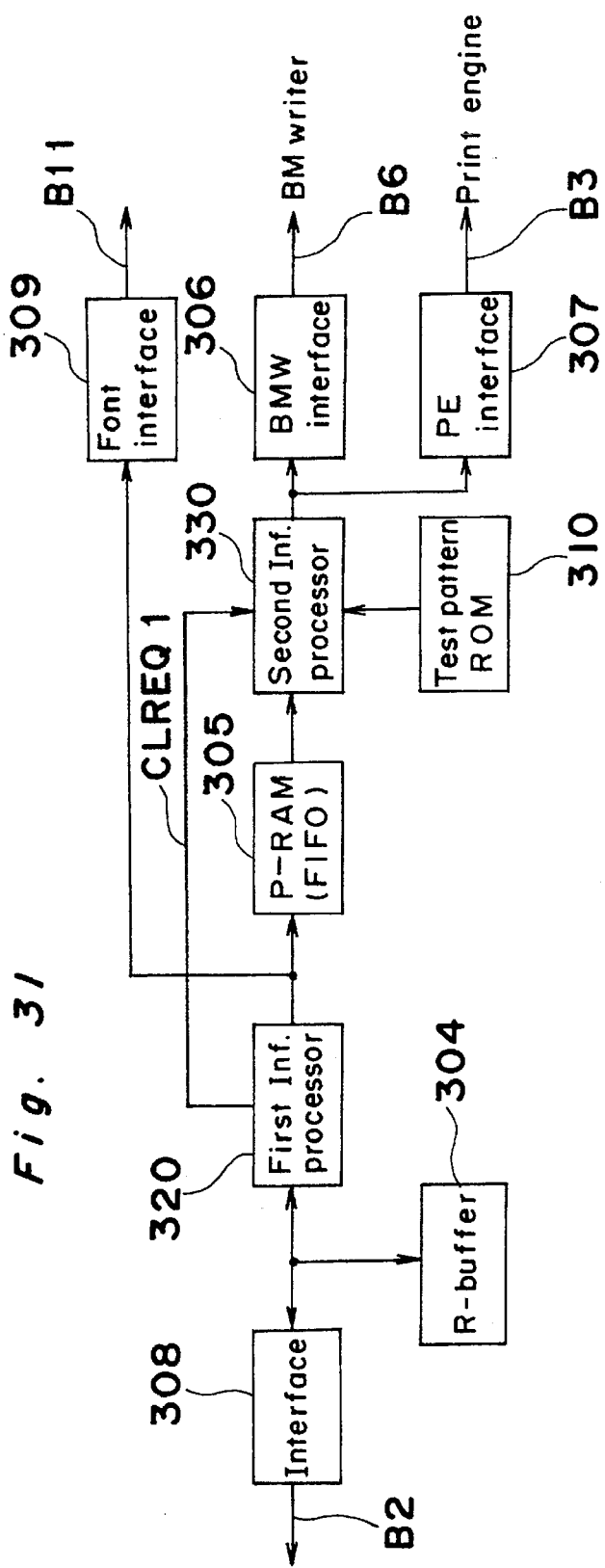
FIG. 31 is a block diagram of the bit map controller according to a variation of the second preferred embodiment.

FIG. 31 shows a variation of the second preferred embodiment wherein the signal line CLREQ 1 is used for another purpose.

In this variation, the second information processor 330 has a ROM 310 for memorizing a test pattern imaging program which is written with use of intermediate codes. When a TEST command is input from the external data processor 1 to the first information processor 320, the latter sends it directly to the second information processor 330 through the signal line CLREQ 1. When the second information processor 330 receives the TEST command, it stops an imaging processing and stacks a flag state. Thereafter, intermediate codes of test pattern are read out of a TEST PATTERN ROM 310 and the test pattern is imaged on the BM-RAM 32. Then, a PAPER DISCHARGE is requested to print the test pattern. After printing the test pattern, the page which was under imaging is imaged again.

Figure 32:
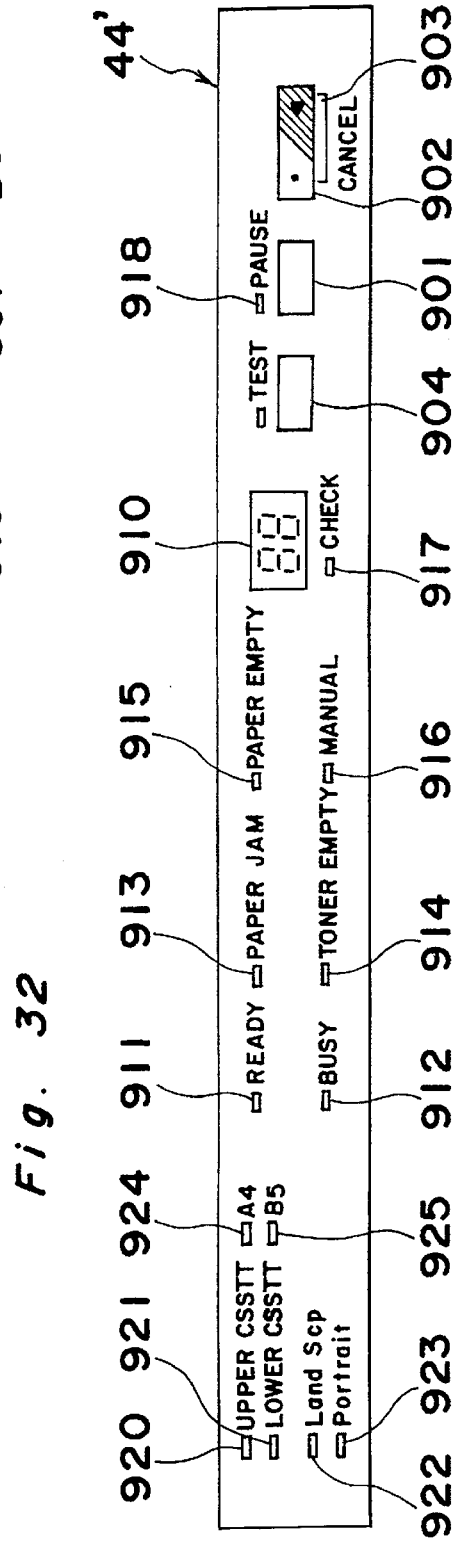
FIG. 32 is a plan view of an operational panel suitable for the variation shown in FIG. 31.

The signal line CLREQ 1 can be utilized for switching display modes of an operation panel 44' shown in FIG. 32.

The LED 910 of seven segments shown in FIG. 3 displays "00" usually and, when an error occurs, the LED 910 displays an error code corresponding thereto.

However, it becomes possible to display arbitrary information on the LED 910 by using the signal line CLREQ 1. Namely, when a display command for displaying a desired information is sent from the external data processor 1 to the first information processor 320, the latter sends the display command to the second information processor 330 through the signal line CLREQ 1. The second information processor 330 sends the received command, via the print engine interface 307, to the print engine 4 to indicate switching of the display mode. As shown in FIG. 38, LEDs 920 to 925 are arranged on the operation panel 44' in order to display a state of the printer having been set at the present. In this example, a selected cassette, a selected paper size and a selected type of image data (landscape or portrait) are displayed for indicating the state of the printer.

Third Preferred Embodiment

Figure 33:
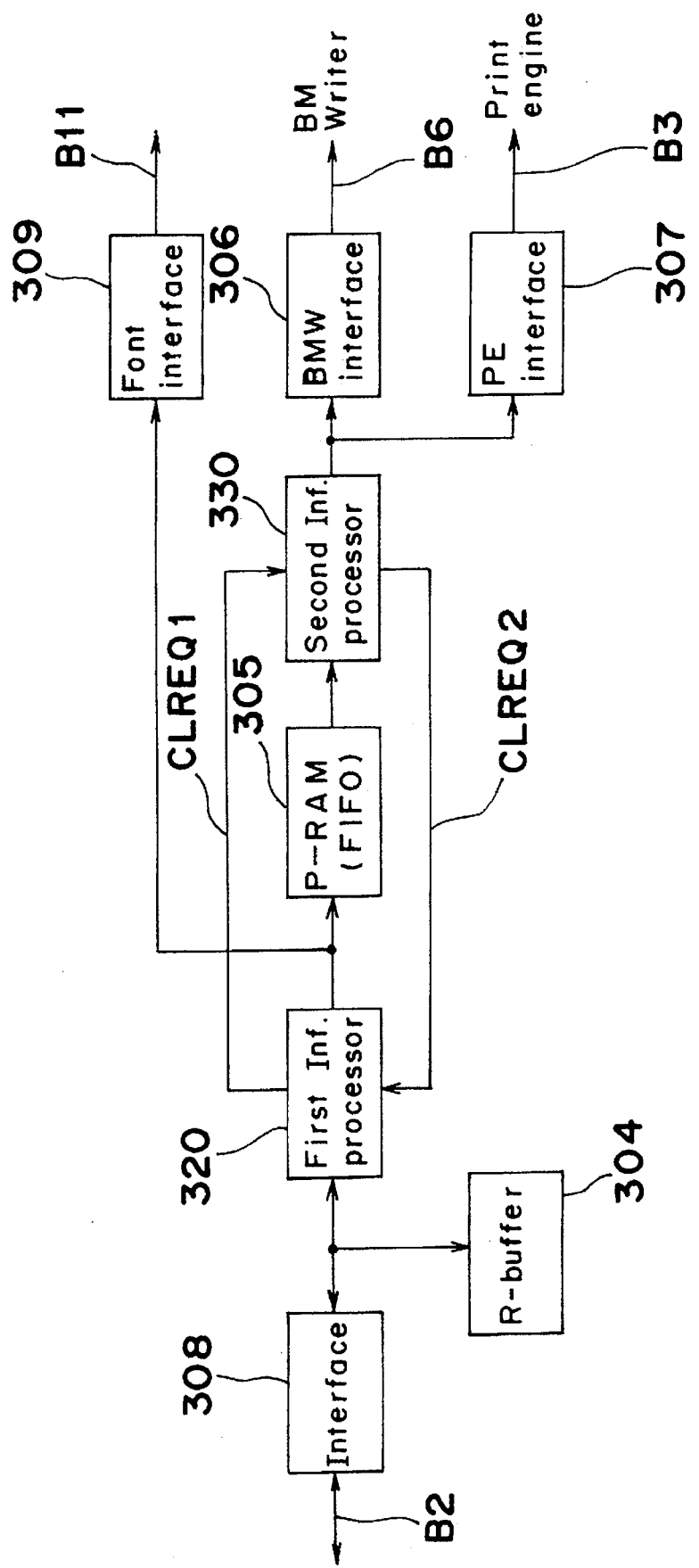
FIG. 33 is a block diagram of the bit map controller according to a third preferred embodiment of the present invention.

FIG. 33 shows a block diagram of the bit map controller according to the third preferred embodiment of the present invention.

In the third preferred embodiment, the first information processor 320 and the second information processor 330 are connected by signal lines CLREQ 1 and CLREQ 2 directly. The first information processor 320 can send a CLEAR REQUEST command to the second information processor 330 through the signal line CLREQ 1 while the second information processor 330 can send a command to clear data of the first information processor 320 thereto through the second signal line CLREQ 2.

According to the third preferred embodiment, cancel processing of three types become possible by operating the operation panel 44 of the printer.

(A) CURRENT PAGE CANCEL

When the key 902 on the operation panel 44 is operated, a CPCLR command for cancelling data of the page now being imaged is sent, via the interface controller 40 and the print engine controller 307, to the second information processor 330.

The second information processor 330 clears data written on the BM-RAM 32 when a PAGE EJECT code for indicating an end of the page being now processed is read into the second information processor 330 from the FIFO 305 (see FIG. 39).

(B) ALL PAGE CANCEL

Figure 38A:
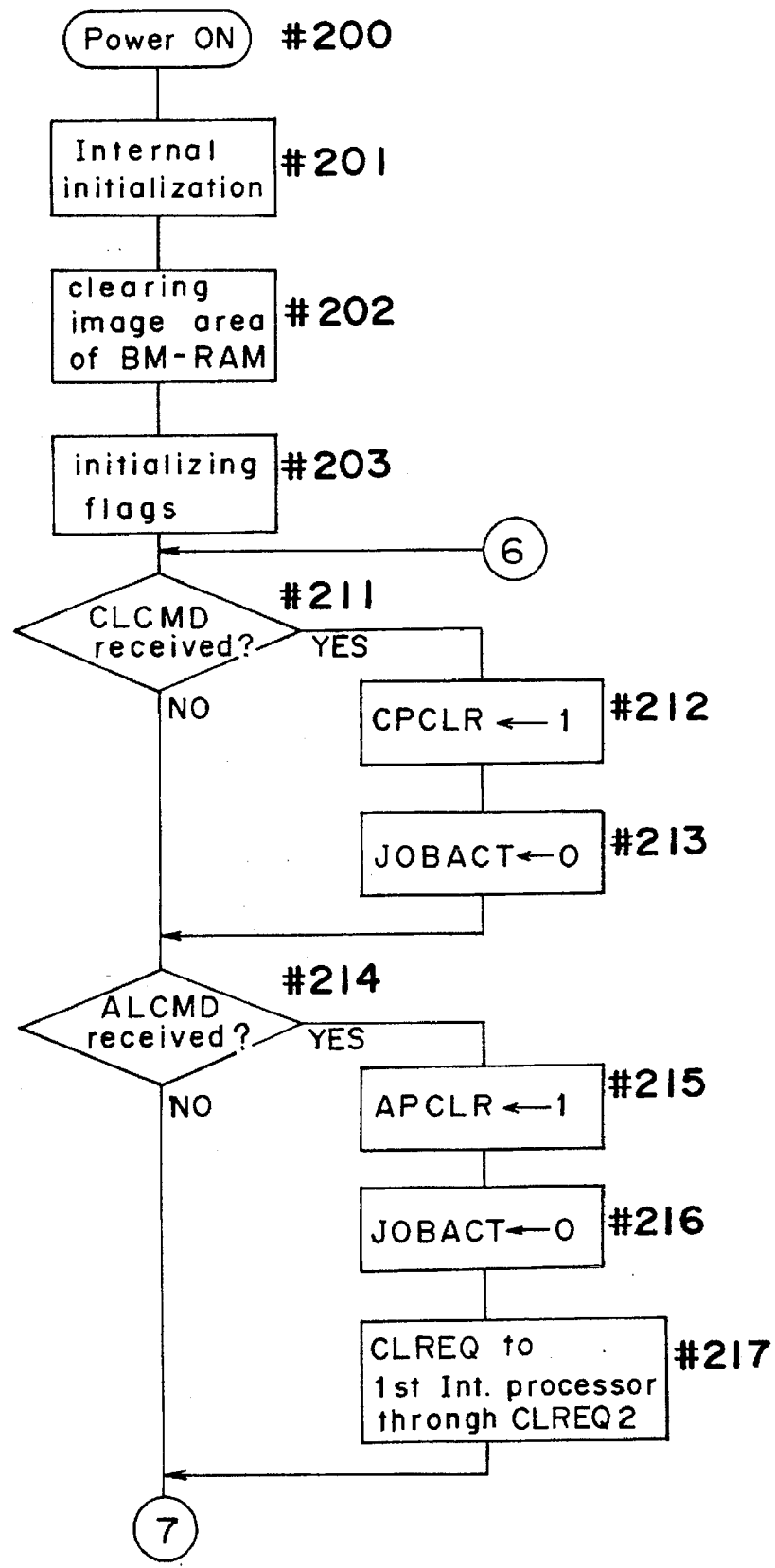
FIGS. 38(a) and 38(b) are parts of a flow chart of a main routine to be executed by the second information processor.
Figure 38:
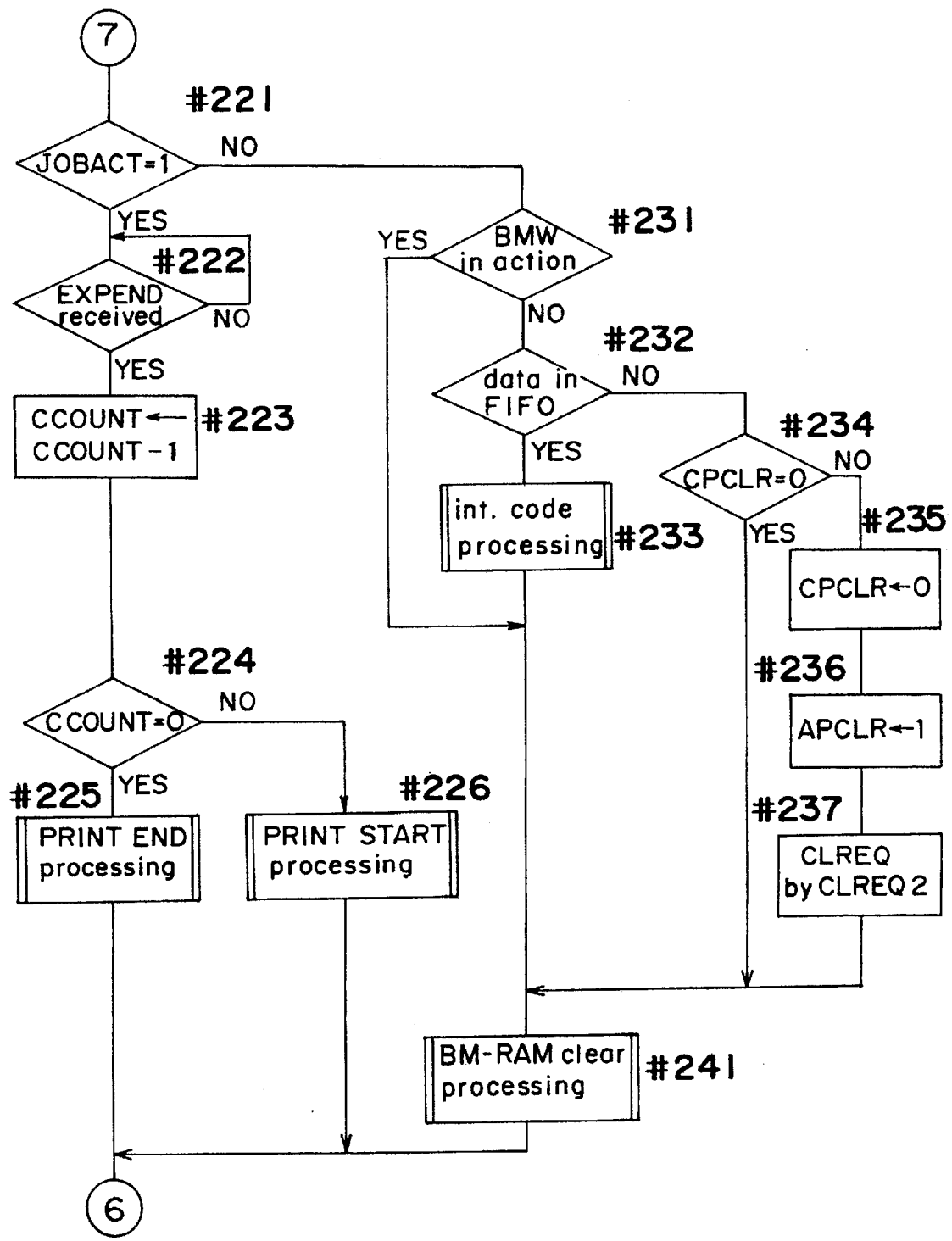

When two keys 902 and 903 on the operation panel 44 are operated at the same time, an APCLR command for cancelling all data stored in the FIFO 305 and the BM-RAM 32 is sent, via the interface controller 40 and the print engine controller 307, to the second information processor 330 (see FIGS. 38(a) and 38(b)).

In the second information processor 330, the BM-RAM 32 is cleared when a CLEAR CONFIRMATION (CLCNF) code is generated by the first information processor 320 just after PAGE EJECT processing.

Further, the second information processor 330 sends a command to the first information processor 320 through the signal line CLREQ 2 (see step #217 of FIG. 38(a)).

When the command is sent from the second information processor 330 to the first information processor 320 via the signal line CLREQ 2, the CLCHK flag is raised. The first information processor 320 executes RECEIVED DATA CANCEL processing when the CLCHK flag is raised, and sends a CLCNF code to the FIFO 305 in order to cancel data of the FIFO after PAGE EJECT processing.

(C) MIXED CANCEL MODE

If the FIFO 305 becomes empty during CURRENT PAGE CANCEL processing executed by the second information processor 330, the cancel mode is switched to ALL PAGE CANCEL mode since it is considered that a part of the page data is processed by the first information processor 320 and the other part thereof is processed by the second information processor 330. In this case, the command for ALL PAGE CANCEL is sent through the signal line CLREQ 2 to the first information processing 320 at real time. Then, the second information processor 330 clears data on the BM-RAM 32.

FIG. 34 shows examples of CURRENT PAGE cancel and ALL PAGE cancel. As is apparent from comparison of FIG. 34 with FIG. 22, the page to be cancelled in the CURRENT PAGE cancel processing is different from the latter since it is executed by the command from the operation panel 44 in the present preferred embodiment.

<CANCEL processing to be executed by the first information processor>

Figure 35:
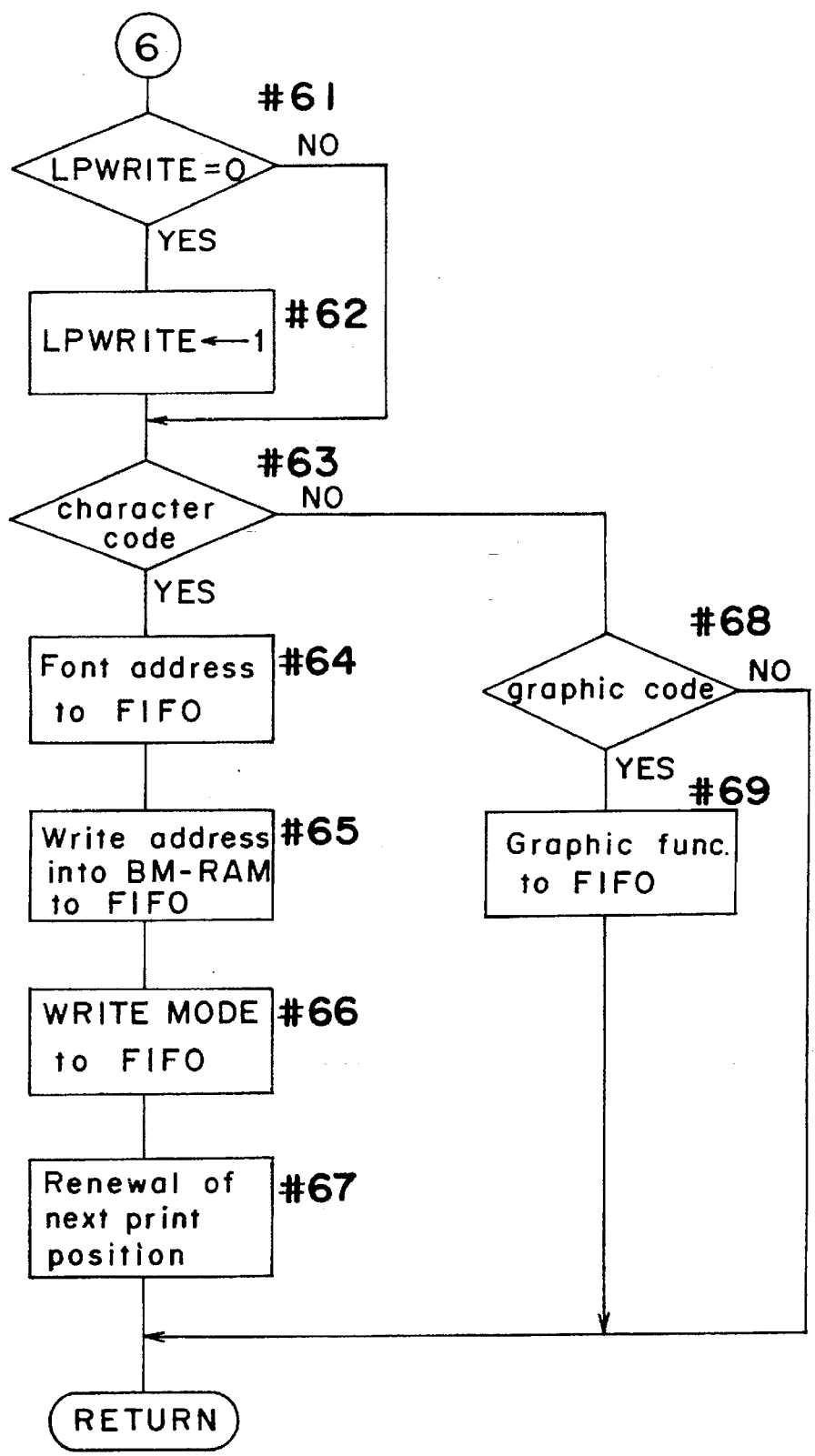
FIGS. 35(a), 35(b), and 35(c) are parts of a flow chart of received data processing routine to be executed by the first information processor.

FIGS. 35(a), 35(b) and 35(c) show RECEIVED DATA processing executed by the first information processor 320.

As is apparent from comparison of FIGS. 35(a)–(c) with FIGS. 24(a)–(c), the CLCHK flag is checked at step #32 at first. If the CLCHK flag has been raised by CLREQ 2 interruption (see FIG. 38), the process proceeds to step #33 and the first information processor 320 executes cancelling of received data thereat.

The CLCHK flag is raised by an interruption shown in FIG. 36 which is executed when a CLREQ command is sent through the signal line CLREQ 2.

The other steps of FIGS. 41(a)–(c) are substantially the same as those of FIGS. 24(a)–(c). But, it is to be noted that steps from #43 to #50 of FIG. 24(b) are omitted in FIGS. 41(a)–(c) since a PAGE CANCEL command is sent from the printer side through the signal line CLREQ 2 in the present preferred embodiment.

Figure 37:
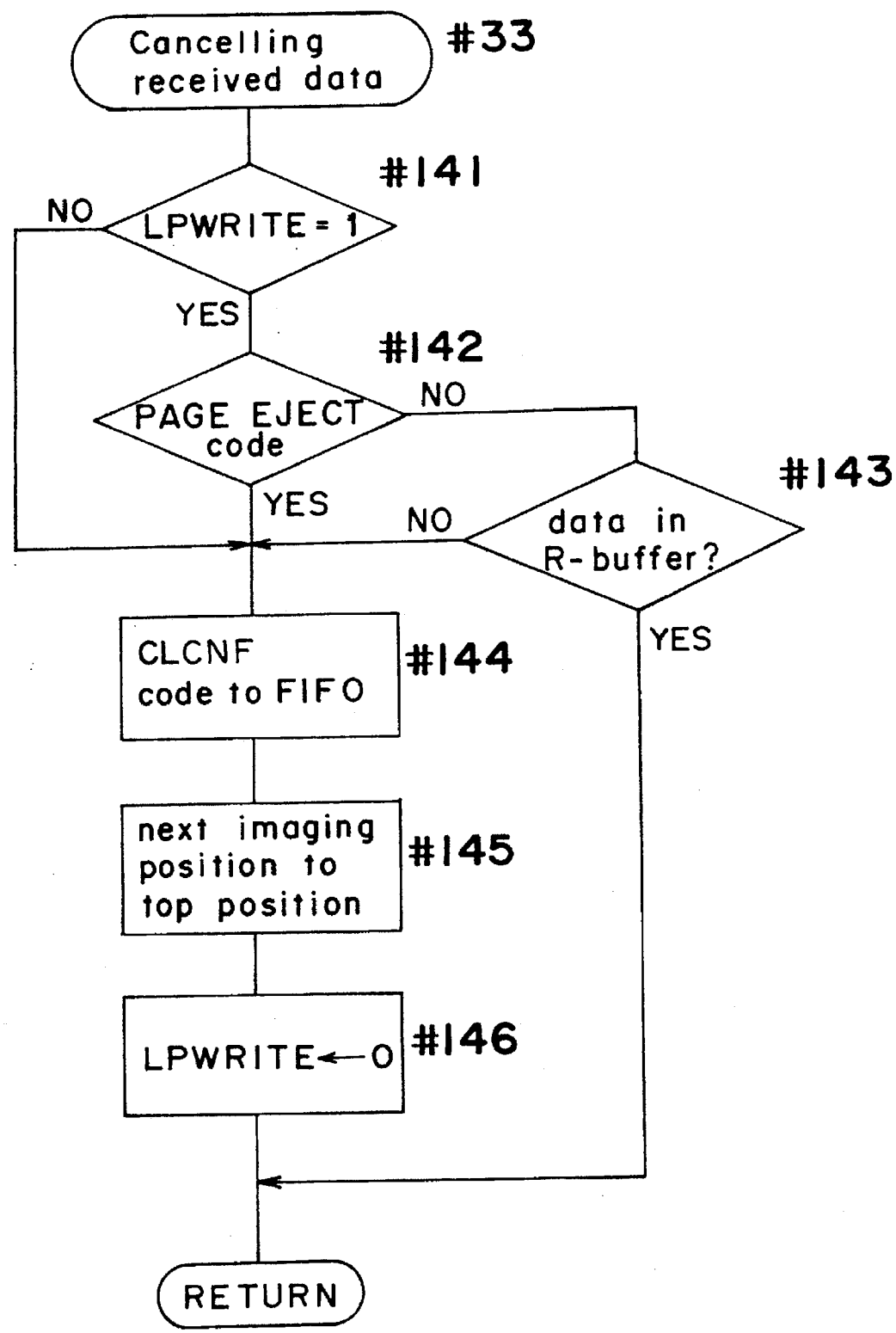
FIG. 37 is a flow chart of RECEIVED DATA CANCEL processing routine to be executed by the first information processor.

FIG. 37 shows a flow chart of RECEIVED DATA CANCELLING subroutine of step #33 of FIG. 35(a).

At first, the LPWRITE flag is checked at step #141 to determine whether PAGE EJECT processing has been completed just before the flag check. If the LPWRITE flag is not set at "1", the process proceeds directly to step #144 in order to output a CLEAR CONFIRMATION (CLCNF) function to the FIFO 305. And, then, an initialization for a new pre-editing is done at steps #145 and #146.

If the pre-editing has been started already (YES at step #141), the process returns without executing steps #144 to #146 as far as data exists in the R-buffer 304 at step #143. Accordingly, any received data is not sent to the FIFO 305 until the PAGE EJECT code is entered at step #142.

Further, if the PAGE EJECT code is not entered (NO at step #142) and the R-buffer 304 becomes empty (NO at step #143), the CLCNF code is forcibly sent to the FIFO 305 in order to avoid a waste of waiting time.

<Cancel processing to be executed by the second information processor>

FIGS. 38(a) and 38(b) show a main routine to be executed by the second information processor 330.

When the power source is switched on at step #200, an internal initialization is done at step #201 and, then, the image area of the BM-RAM 32 is cleared at step #202.

Further, at step #203, control flags are initialized. Specifically, the JOBACT flag for indicating a printing state is cleared, the copy counter CCOUNT for counting a number of copies is set at "1", the PFCM flag for admitting a pre-feed of paper is set, the BPFM flag for indicating to output upon CANCEL processing after clearing data having been imaged on the BM-RAM 32 is reset, the CPCLR flag for indicating CURRENT PAGE CANCEL is reset and the APCLR flag for indicating ALL PAGE CANCEL is reset. Thereafter, the process proceeds to a main loop. This main loop includes a clear commend check routine (steps #211 to #217), an imaging routine for analyzing intermediate codes and for writing bit images on the BM-RAM 32 (steps from #231 to #241), a print sequence control routine (steps from #222 to #226) and BM-RAMCLEAR routine (step 241).

When a command CLCMD for indicating CURRENT PAGE CANCEL or a command ALCMD for indicating ALL PAGE CANCEL is entered from the print engine 4 at step #211 or step #214, a corresponding flag CPCLR or APCLR is raised at step #212 or step #215 and the JOBACT flag is cleared in order to prohibit the print sequence control at step #213 or step #216. Further, when ALCMD is entered, a signal CLREQ for requesting data cancel is sent to the first information processor 320 through the signal line CLREQ 2 at seep #217. Then, the process proceeds to step #221 to check the JOBACT flag. If it is set at "1" the process proceeds to the print sequence control (steps #222 to #226) and, if it is set at "0", the process proceeds to the INTERMEDIATE CODE processing (steps #231 to #233).

In the INTERMEDIATE CODE processing, if the CURRENT PAGE CANCEL processing is executed when the FIFO 305 has become empty (NO at step #234), the CANCEL mode is switched to ALL PAGE CANCEL processing since is becomes necessary to cancel data now processed by the first information processor 320, namely page data is laid between the first and second information processors 320 and 330. More concretely, when CLCMD command is entered at step #234, the CPCLR flag is cleared to "0" at step #235 and the APCLR flag for indicating ALL PAGE cancel is raised at step #236. Then, a signal for requesting DATA CANCEL is sent to the first information processor 320 through the signal line CLREQ 2 at step #237. Thereafter, BM-RAMCLEARprocessing is executed at step #241.

The PRINT SEQUENCE processing in steps #222 to #226 is substantially the same as that for steps #212 to #216 of FIG. 25.

FIG. 39 shows a subroutine for the INTERMEDIATE CODE processing of step #233 of FIG. 38(b).

As is apparent from comparison of FIG. 39 with FIG. 27(a), two steps, step #302 and step #303, are inserted in FIG. 39 place of step #252 in FIG. 27(a). The other steps of the FIG. 39 are substantially the same as those of FIG. 27(a).

In this subroutine, two flags CPCLR and APCLR are checked at steps #302 and #303, respectively, after reading an intermediate code from the FIFO 305. If either one of these flags is raised, the process returns without executing a step. In other words, intermediate codes are not processed as long as either one of flags is kept raised.

Figure 40A:
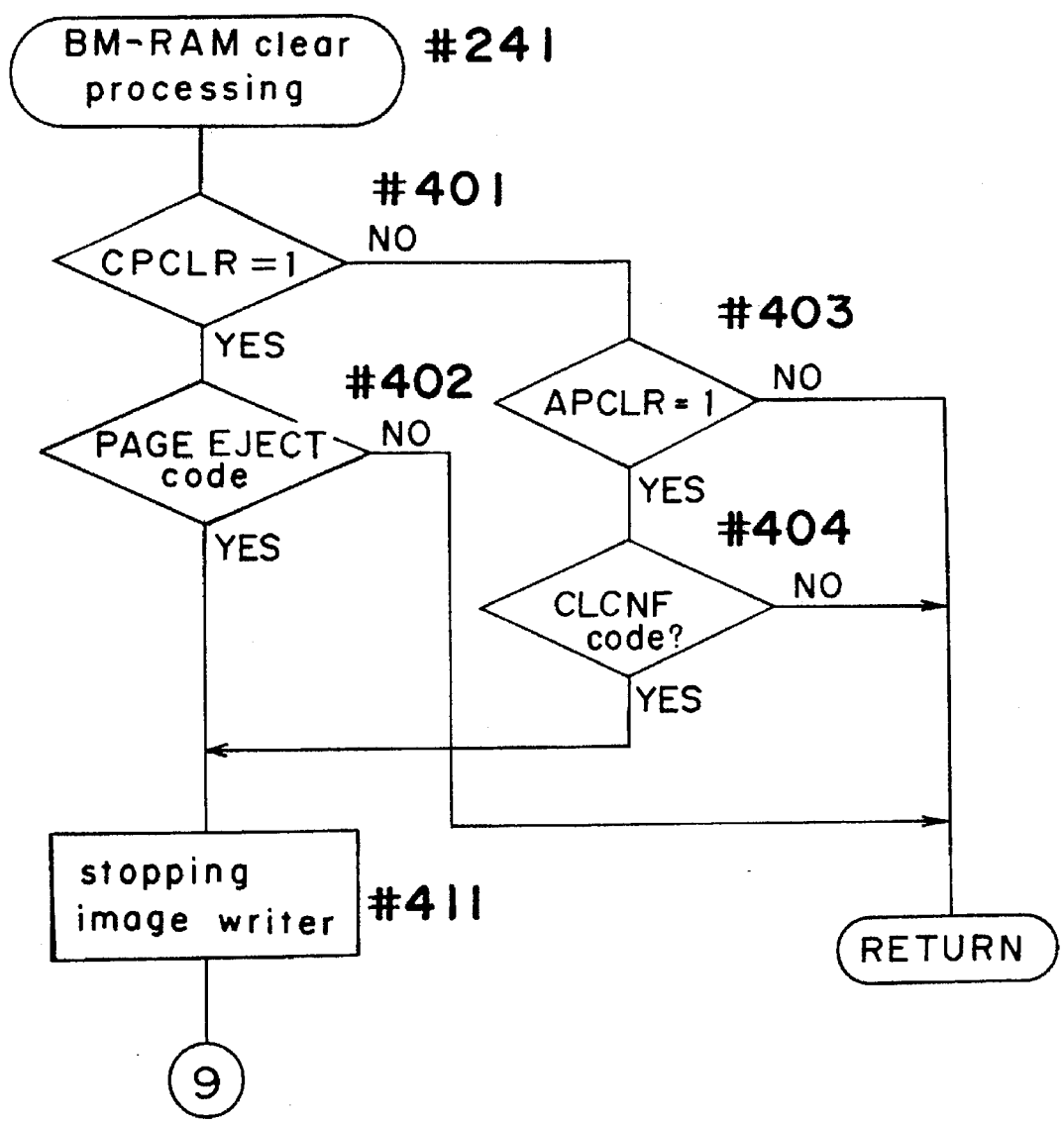
FIG. 40(a) and 40(b) are parts of a flow chart of BM-RAM clear processing routine to be executed by the second information processor.
Figure 40:
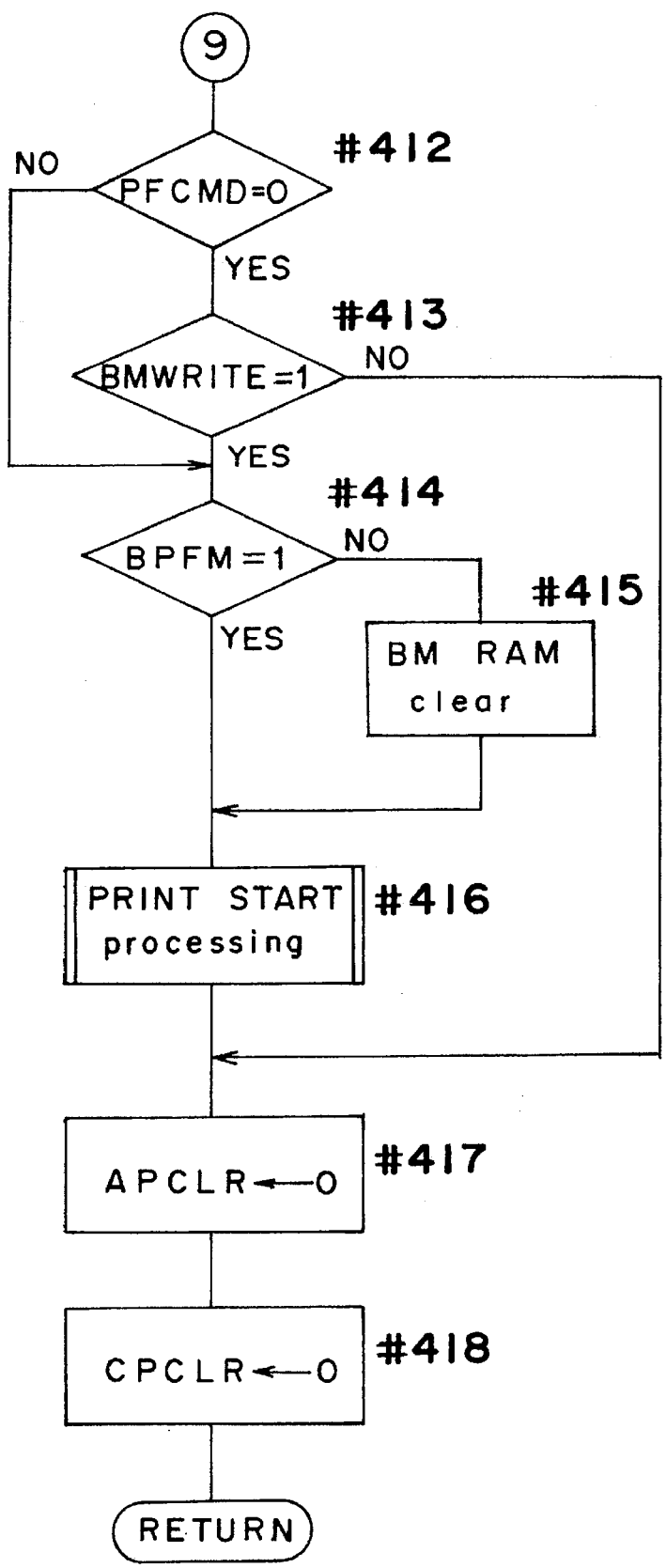

FIG. 40(a) and 40(b) show a flaw chart for the BM-RAM CLEAR subroutine of step #241 of FIG. 38(b).

At first, the CPCLR flag and the APCLR flag are checked at steps #401 and #402, respectively. If neither of them is raised, the process returns directly without executing a step. If the CPCLR flag is raised at step #401, it is checked at step #402 whether the present intermediate code read from the FIFO 305 is a PAGE EJECT code or not. If it is a PAGE EJECT code, the process proceeds to BM-RAM CLEAR processing.

If the APCLR flag is raised, the process proceeds to real BM-RAM CLEAR processing provided that the intermediate code is a CLCNF code which is generated by the first information processor 320 (at step #404).

In the BM-RAM CLEAR processing, the bit map writer 31 is stopped at step #411. If a PFCMD (PRE-FEED COMMAND) is set at "1" at step #412 or if the BMWRITE flag is set at "1" at step #413, PAPER DISCHARGE processing is executed from step #414 to step #416. In this processing, if the BPFM flag is equal to "0" at step #414, the BM-RAM 32 is cleared at step #415. Accordingly, a blank paper is discharged when the printer is driven at step #416.

If the BPFM flag is raised at step #414, bit images having been written at that time are printed out since contents of the BM-RAM 32 are not cleared.

Thereafter, the APCLR and CPCLR flags are reset at steps #417 and #418, respectively.

The signal line CLREQ 2 can be used for other purposes such as pause functions.

For example, when the PAUSE key 901 on the operation panel 44 is operated to suspend data access to the printer, this information is input into the second information processor 330 and, Just after receipt of the information, a signal requesting the suspension of data access is sent directly to the first information processor 320 through the signal line CLREQ 2. The first information processor 320 suspends data access as soon as the signal is input thereinto.

According to the third preferred embodiment of the present invention, data in the first and second information processors 320 and 330 can be cancelled directly by the key operation from the printer side, although they work essentially independent from each other. Accordingly, individual information processors 320 and 330 can start their own data accesses again independent from each other as soon as cancelling operations have been completed.

<Fourth Preferred Embodiment>

Figure 41:
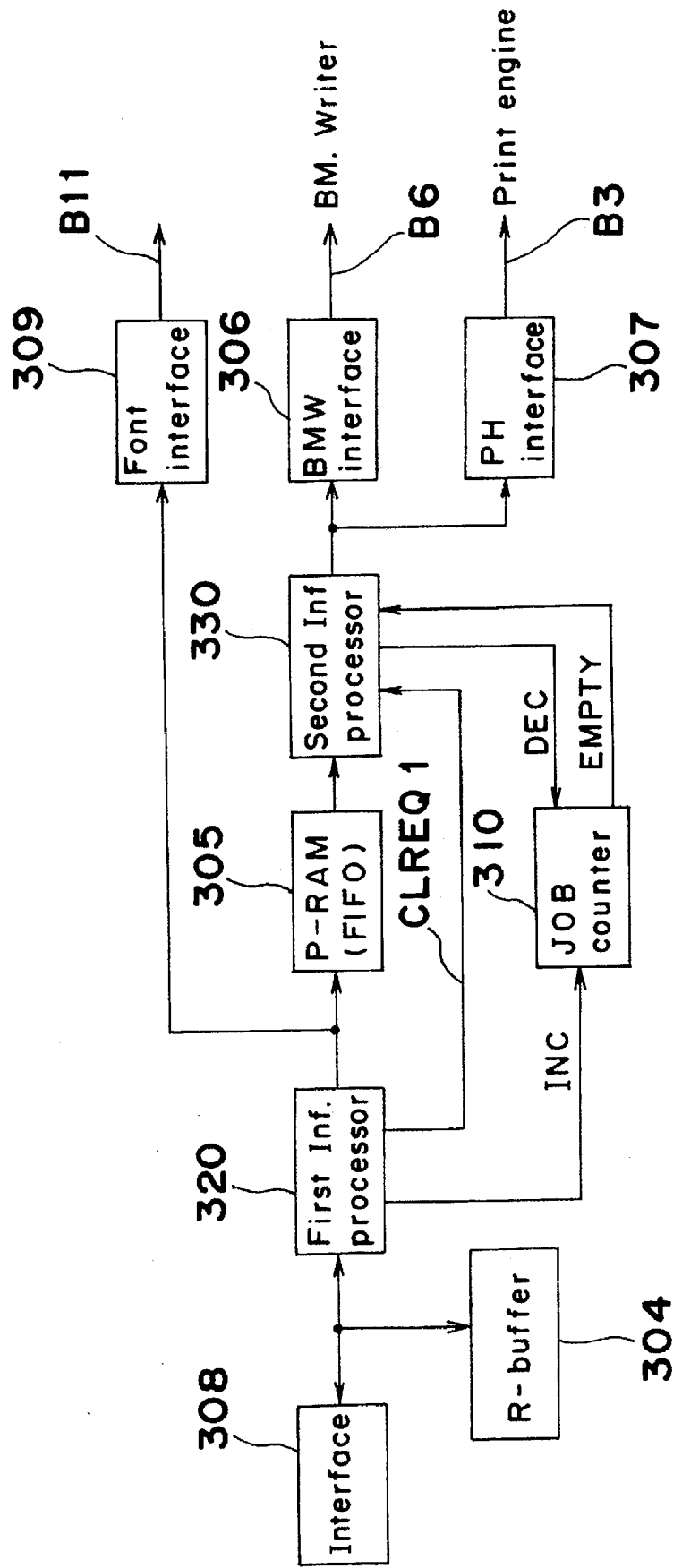
FIG. 41 is a block diagram of the bit map controller according to a fourth preferred embodiment of the present invention.

FIG. 41 shows a block diagram of the bit map controller according to the fourth preferred embodiment of the present invention.

As is apparent from comparison of FIG. 41 with FIG. 21, a JOB counter 310 is provided between the first and second information processors 320 and 330 which are connected by the signal line CLREQ 1.

The JOB counter 310 is a counter for indicating a number of JOBs (pages) stored in the FIFO 305 which is incremented by an INC signal from the first information processor 320 and is decremented by a DEC signal from the second information processor 330. The second information processor 330 can check whether the FIFO 305 has data stored therein or not by an EMPTY signal outputted from the JOB counter 310.

Figure 42:
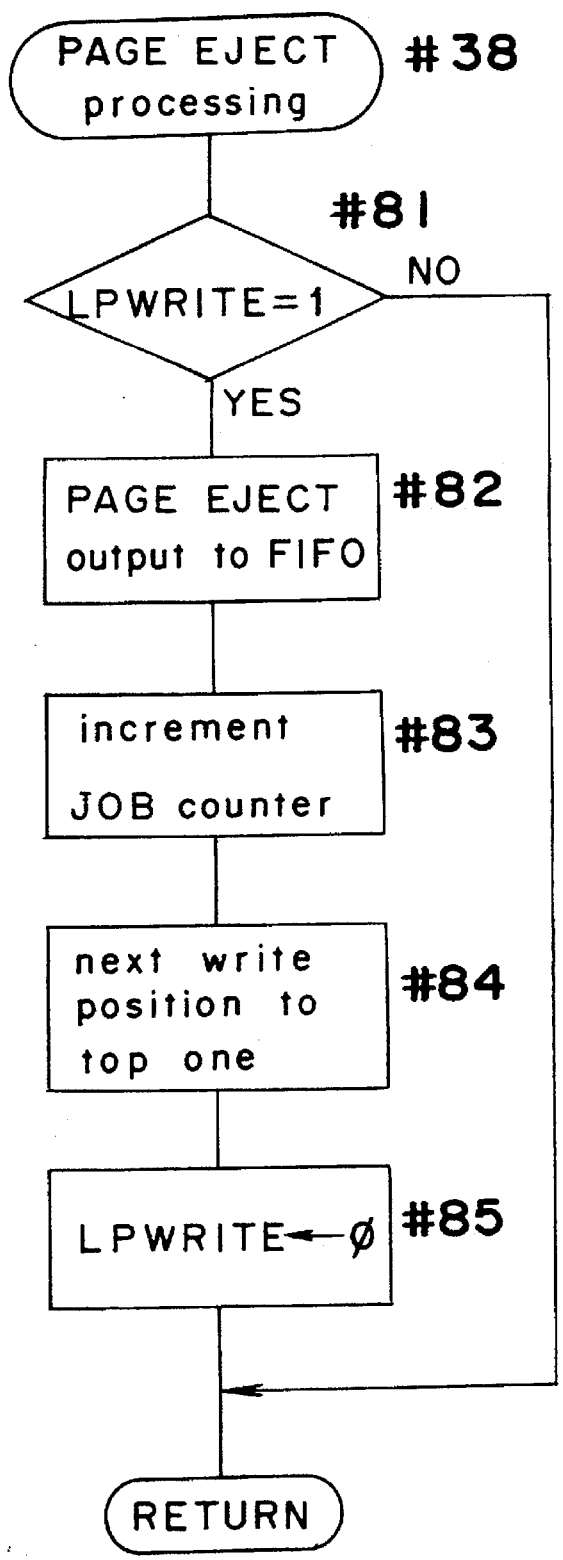
FIG. 42 is a flow chart of PAGE EJECT processing routine to be executed by the first information processor.

FIG. 42 is a flow chart of PAGE EJECT processing to be executed by the first information processor 320.

If the LPWRITE flag for indicating a pre-editing state is raised at step #81, an intermediate code indicating PAGE EJECT is outputted to the FIFO 305 at step #82. Further, the first information processor 320 sends an INC signal to the JOB counter 310 at step #83 in order to increment the latter. Then, the next write position is set at the top position of the next page at step #84 and the LPWRITE flag is reset at "0" at step #85.

Figure 43A:
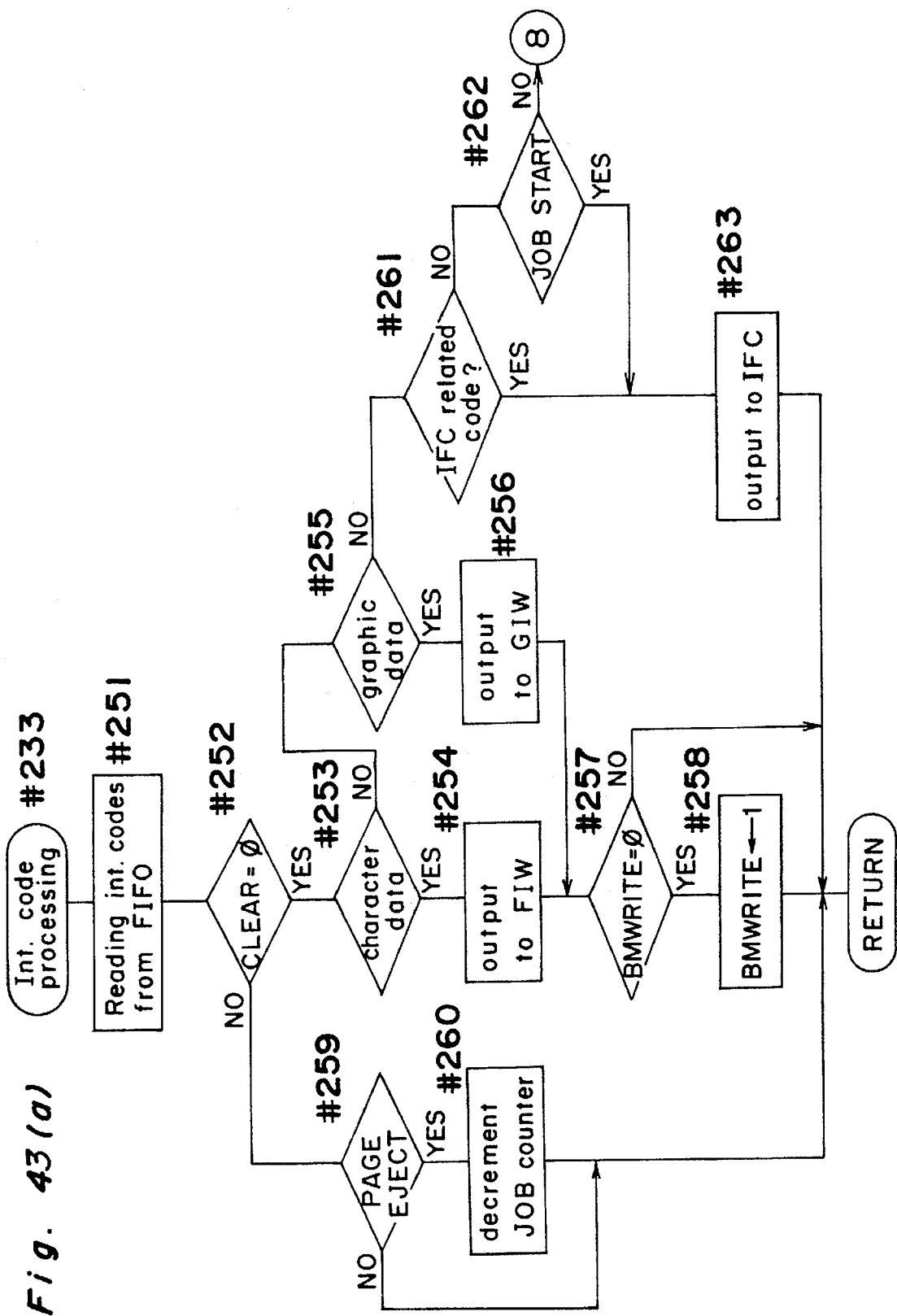
FIGS. 43(a) and 43(b) are parts of a flow chart of INTERMEDIATE CODE processing routine to be executed by the second information processor.
Figure 43B:
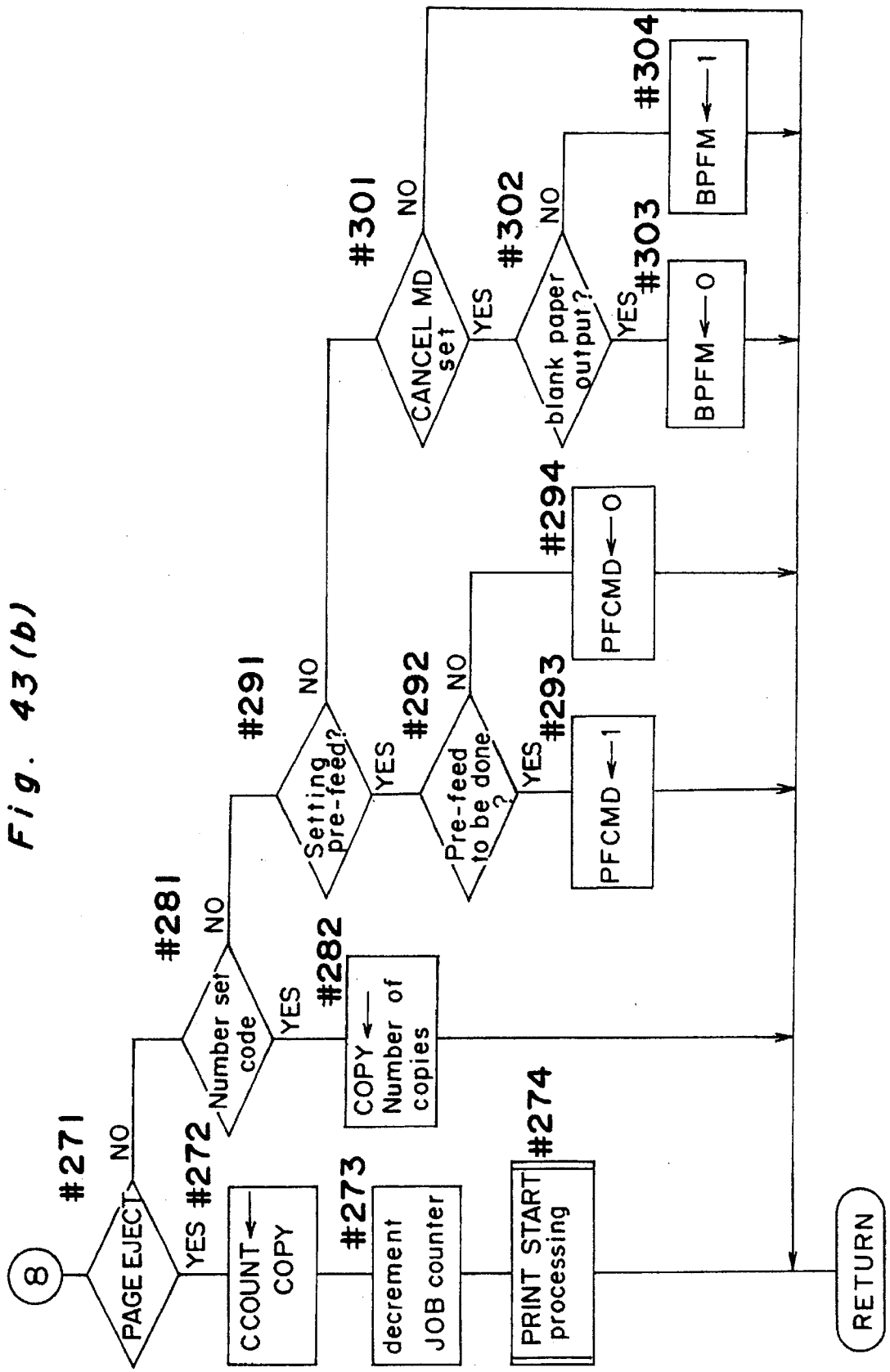

FIGS. 43(a) and 43(b) show a flow chart of INTERMEDIATE CODE processing to be executed by the second information processor 330.

As is apparent from the comparison of FIGS. 42(a) and 42(b) with FIGS. 27(a) and 27(b), in the former, steps related to the JOB counter 310 are added to the processing shown in the latter.

Namely, if the CLEAR flag for indicating a DATA CLEAR REQUEST is raised at step #252, the process proceeds to step #259 in order to check a PAGE EJECT code. If the present intermediate code read from the FIFO 305 is a PAGE EJECT code, the JOB counter 310 is decremented at step #260 by a DEC signal outputted from the second information processor 330 since this means that data of one page are cancelled and then, the process returns directly without executing any further steps. If it is not a PAGE EJECT code, the process skips step #260 and returns directly.

In FIG. 43(b), step #273 is inserted between step #272 and step #274. Namely, if the present intermediate code read from the FIFO 305 is a PAGE EJECT code, the JOB counter 310 is decremented at step #273 since this code means that all data of one page has been processed.

The other steps of FIG. 43(b) are substantially the same as those of FIG. 27(b).

Figure 44:
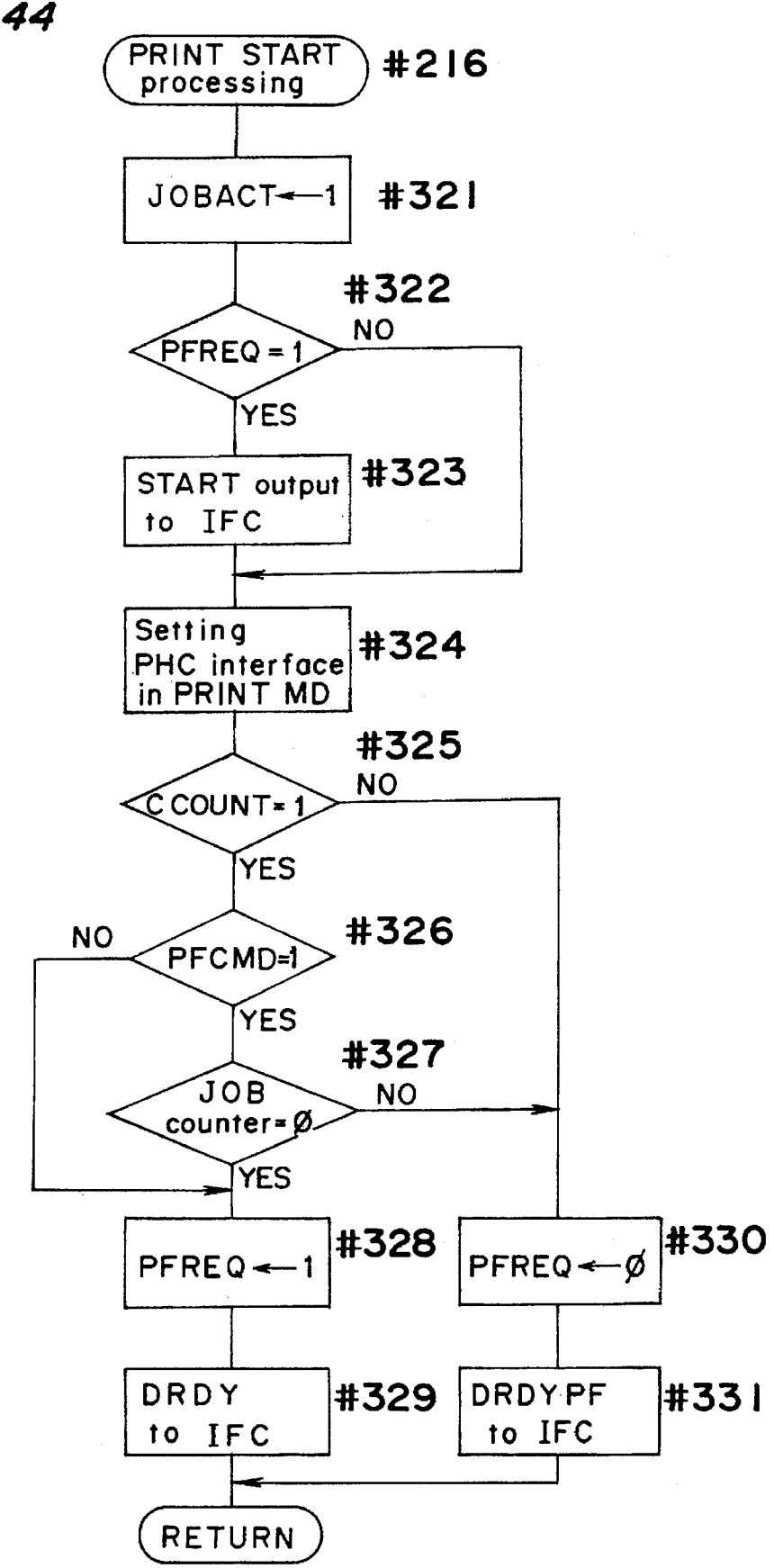
FIG. 44 is a flow chart of PRINT START processing routine to be executed by the second information processor.

FIG. 44 shows a flow chart of the PRINT START processing subroutine.

At step #321, the JOBACT flag is raised to prohibit renewal of the BM-RAM 32. If the PFREQ flag is equal to "1" at step #322 and if a blank paper is not inserted after the latest PRINT START processing, a paper feed request command START is outputted to the interface controller 40 at step #323. Then, the print head controller interface 315 is set in the print mode at step #324. Due to this step, the PHC interface 315 outputs bit images of the BM-RAM 32 through the bus B4 in synchronization with pulses sent from the print head controller 42.

If the CCOUNT is equal to "1" at step #325 and if PFCMD is equal to 0 at step #326, the PEREQ flag is set at "1" at step #328 and a DRDY command for indicating no reservation of prefeed is outputted to the interface controller at step #392.

If CCOUNT is not equal to "1" at step #325 or if PECMD is equal to 1 at step #326 and the JOB counter is not equal to "0" at step #327, namely if there is at least one unit of data in the FIFO next to data being now printed, the PFREQ flag is set at "0" at step #330 in order to improve through-put. Then a print command DRDYPF for designating a preparation operation by feeding the next paper is outputted at #331 after discharging a paper to the print engine 4.

In the other case of NO at step #326 or of YES at step #327, the PFREQ flag is raised at step #328, and, then, the DRDY command is outputted to the interface controller 40.

Fifth Embodiment of the Present Invention (a) Composition of Electro-Photographic Printer The overall composition of the electro-photographic printer in this embodiment is substantially similar to the composition of the electro-photographic printer disclosed in the first embodiment of the present invention, which is illustrated in FIGS. 1–4. Therefore, a detailed description of the composition of the electro-photographic for this embodiment will be omitted.

(b) Bit Map Controller and Bit Map Writer

Figure 45:
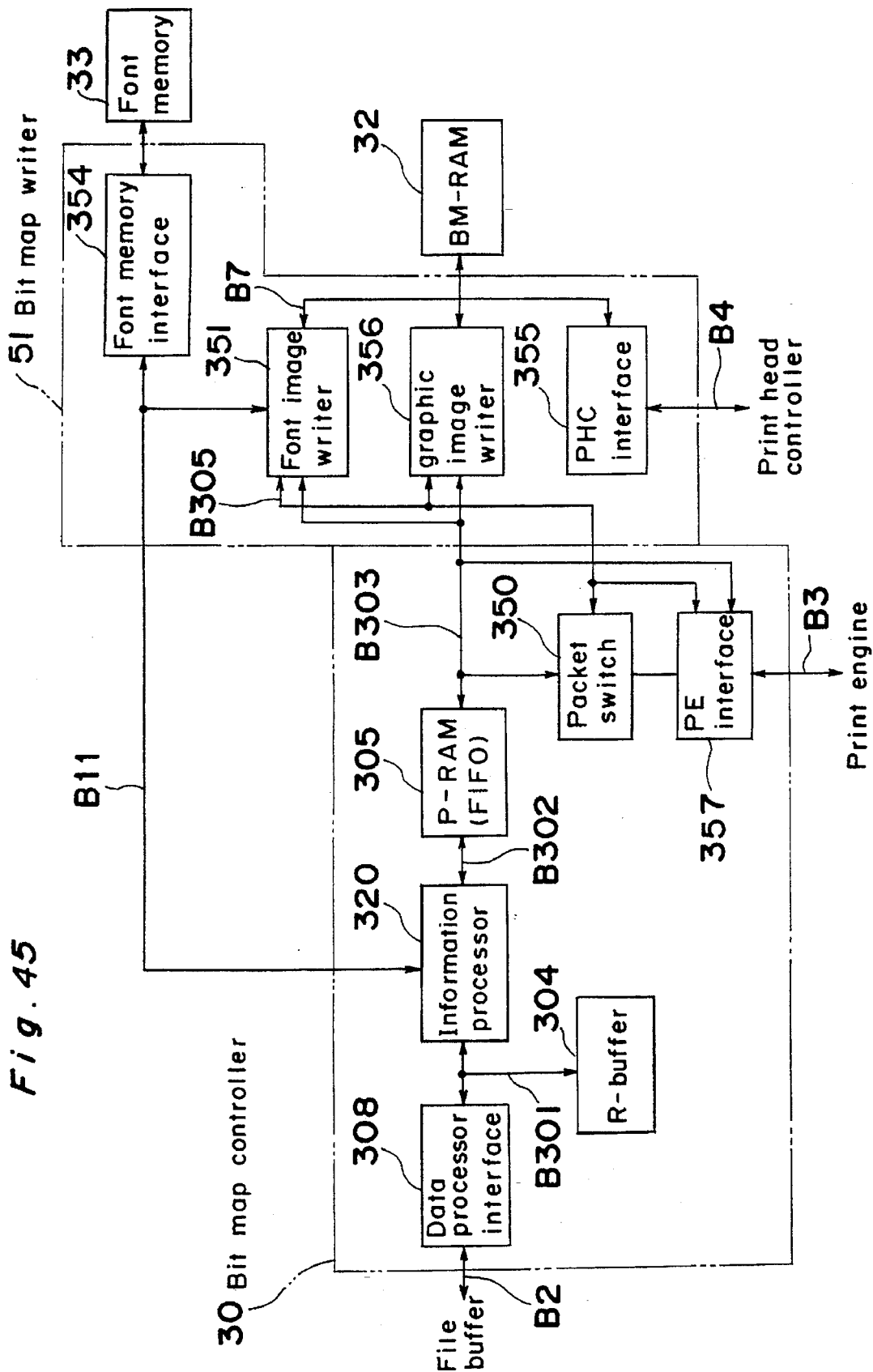
FIG. 45 is a block diagram showing a bit map controller and a bit map writer according to a fifth embodiment of the present invention.

FIG. 45 is a block diagram showing the bit map controller 30 and the bit map writer 51. The bit map controller 30 includes an information processor 320 provided for communicating with the external data processor 1 and for controlling the bit map writer 51 and the print engine 4. The information processor 320 communicates with the external data processor via an external data processor interface 308.

An R-buffer 304 is a buffer memory provided to allow data input from the external data processor 1 in asynchronous with an execution of a program by the CPU.

The bit map controller 30 further includes a packet RAM (P-RAM) 305 constructed as a FIFO of hard-ware construction. The P-RAM 305 is provided for memorizing data from the external data processor I as intermediate codes in order to make the transformation into bit map images easier.

The input side of the P-RAM (FIFO) 305 is connected with the information processor 320 via a bus B302 and the output side thereof is connected, via a bus B303, with a packet switch 350 constructed as hard-ware. The packet switch 350 transmits each intermediate code stored in the P-RAM 305 to either one of a font imagewriter 351 or a graphic image writer 356 of the bit map writer 51 and a print engine interface 357 of the bit map controller 30 through an internal bus B205.

The print engine interface 357 is an interface for communicating JOB information such as the number of prints and each JOB control command such as a PRINT command with an interface installed in the print engine 4 through a bus B3.

The information processor 320 executes PACKET processing for data stored temporarily in the R-buffer 304 in asynchronous with data entry. In this packet processing, protocol analysis, pre-editing of image data into intermediate codes which are intended to make imaging into the BM-RAM 32 easier and storing intermediate codes into the P-RAM 305 are performed successively. In the pre-editing of image data, respective print positions of individual image data are determined according to the result of the protocol analysis. Therefore, every intermediate code includes a pattern code of the image data and an address on BM-RAM 32 at which a dot image corresponding to the intermediate code is to be formed.

The right-hand part of FIG. 45 shows a composition of the bit map writer 51.

Functions of the bit map writer 51 are generally classified into an imaging function onto the BM-RAM 32 and an outputting function for outputting data in the BM-RAM 32 to the print engine 4 upon printing.

The imaging function is further divided into an imaging function for imaging lines and/or circles which is executed by a graphic imagewriter (GIW) 356 and an imaging function for imaging characters which is executed by a font image writer (FIW) 351. Both of the graphic and font image writers 356 and 351, respectfully, are operated according to packets sent from the bit map controller 30. The graphic image writer 356 usually writes bit images on the BM-RAM 32 according to results obtained by analyzing parameters included in a packet, while the font imagewriter 351 usually writes font images on the BM-RAM 32 which are read from the font memory 33 through a font memory interface 354 according to data in the FIFO 305.

An output function for outputting data upon printing is executed by a print head controller interface 355. Namely, when it receives a PRINT START code sent from the bit map controller 30, it outputs data in the BM-RAM 32 to the print head controller 42 in synchronization with synchronized signals sent from a control circuit of the print head controller 42 through the bus B4.

Figure 46:
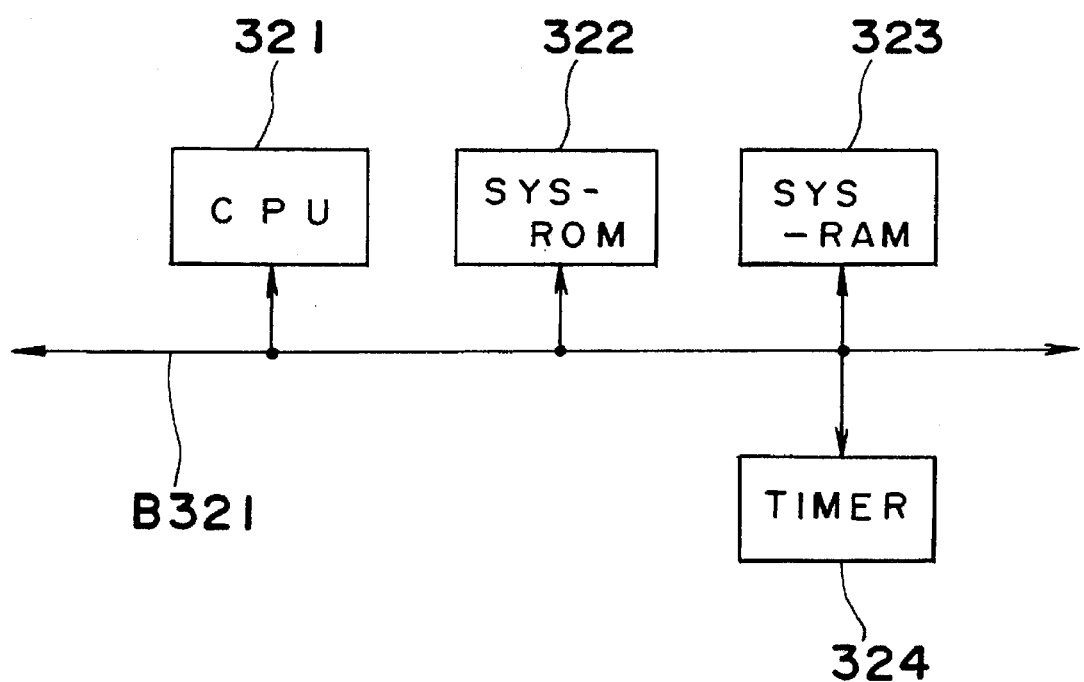
FIG. 46 is a block diagram of an information processor according to the fifth embodiment of the present invention.

FIG. 46 shows an example of a hard-ware structure for the information processor 320. The information processor is comprised of a CPU 321, a system ROM 322 memorizing programs for CPU 321, a system RAM 323 to be used for a working memory area for memorizing various stacks and flags and a timer 324 for enabling CPU 321 to control timing.

Figure 47:
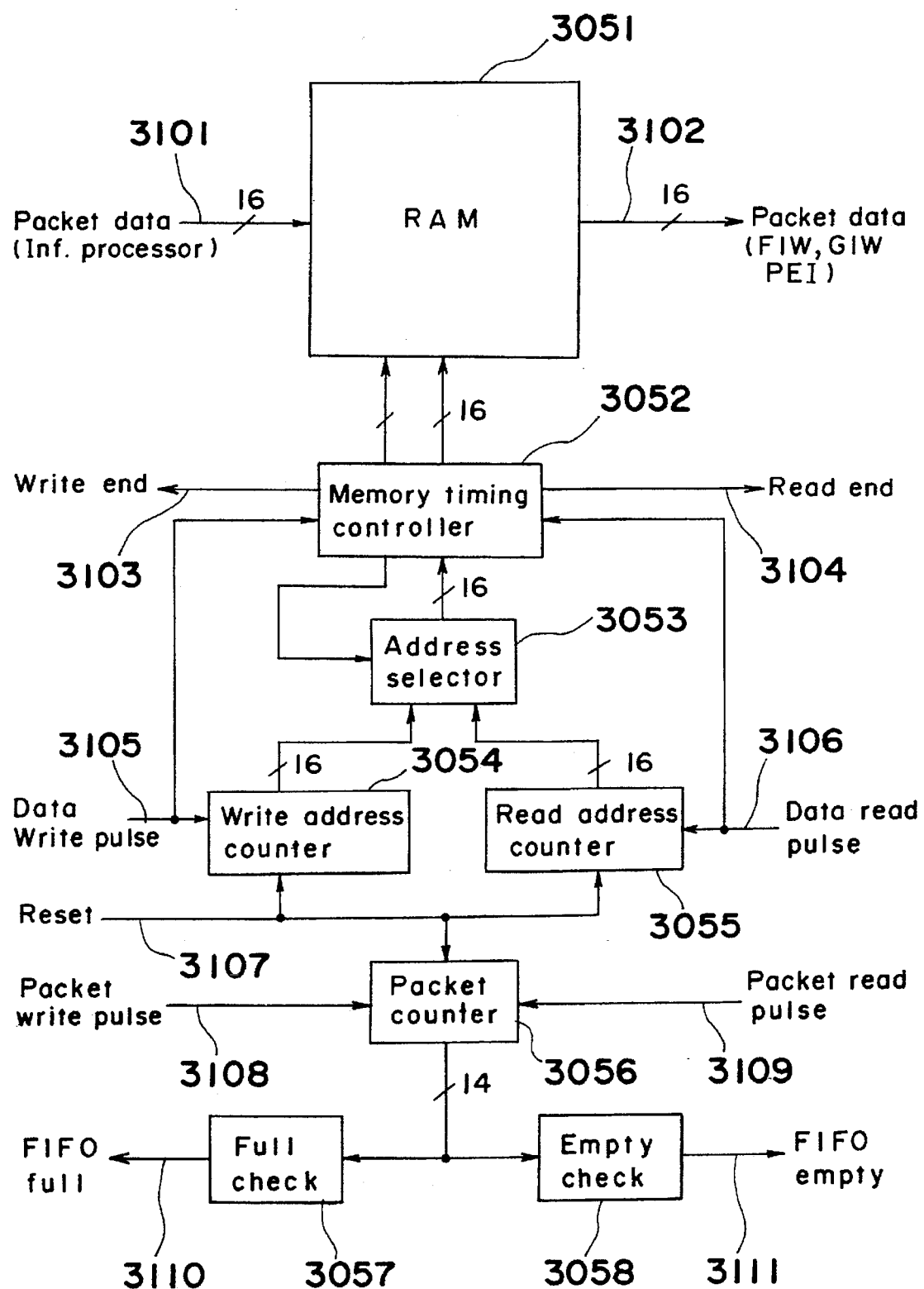
FIG. 47 is a hock diagram of a FIFO according to the fifth embodiment of the present invention.

FIG. 47 shows a hard-ware structure of the FIFO 305. The FIFO 305 is comprised of a RAM 3351 and a timing control circuit for the RAM 3051. Data to be stored in the FIFO 305 is processed in units of a packet which is comprised of five words (each word is comprised of 16 bits). The RAM 3051 is controlled by circuits 3052 to 3055 so as to read or write data in unit of one word. The control for a packet unit is executed by circuits 3056 to 3058.

The control in units of a packet is executed by a packet counter 3056 which is comprised of an up and down counter of 14 bits in the present preferred embodiment. The packet counter 3056 is incremented by a PACKET WRITE pulse sent through a signal line 3108 after the information processor 320 has outputted one packet to the RAM 3051 through a signal line 3101. A count value of the packet counter 3056 is checked by a full check circuit 3057 and, when the packet counter counts up to a predetermined count value, which is set at 13107 in the present preferred embodiment, a FIFO FULL signal is outputted to the information processor 320 through a signal line 3110. Meanwhile, the existence of packets in the RAM 3051 is checked by an empty check circuit 3058 and, when the count value of the packet counter 3056 is zero, a FIFO-EMPTY signal is outputted to the packet switch 350 through a signal line 3111. When it is confirmed that at least one packet exists in the RAM 3051, the packet switch 350 sends a PACKET READ pulse to the packet counter 3056 through a signal line 3109 to read a packet. The packet counter 3056 is decremented by this PACKET READ pulse.

In order for the control of word unit, two counters 3054 and 3055 are provided for counting packets independently. The write address counter 3054, which is comprised of a counter of 16 bits in the present preferred embodiment, is provided for indicating individual write addresses for word data to be written from the information processor 320 into the RAM 3051 and is counted up by a DATA WRITE pulse sent through a signal line 3105 when one word has been written into the RAM 3051. On the contrary, the read address counter 3055 is provided for indicating individual read addresses for word data to be read from RAM 3051 into the packet switch 350 and is counted up by a DATA READ pulse sent through a signal line 3106 when one word has been read out of RAM 3051. Each of these counters 3054 and 3055 can be comprised of either an up-counter or a down-counter, but they should be of a same type. Furthermore, a memory timing controller 3052 is provided for controlling memory timing of the RAM 3051. It is driven by a DATA WRITE pulse and/or a DATA READ pulse. It has a function for switching an address selector 3053 and a function for adjusting the timing of write end and read end through signal lines 3103 and 3104 in order to force the information processor 320 and the packet switch 350 to wait when a DATA WRITE pulse and a DATA READ pulse are generated at the same time.

Meanwhile, three counters 3054, 3055 and 3056 are forcibly cleared upon switching on the power source and, therefore, FIFO is cleared as a whole at that time.

(c) Composition of the Packet Switch

The packet switch 350 reads intermediate codes stored in the FIFO 305 serially and controls to write each intermediate code having a predetermined number of words into either one of intermediate code processors namely, the font image writer (FIW) 351, the graphic image writer (GIW) 356 and the print engine interface (PEI) 357, which is designated by the intermediate code itself.

Figure 48:
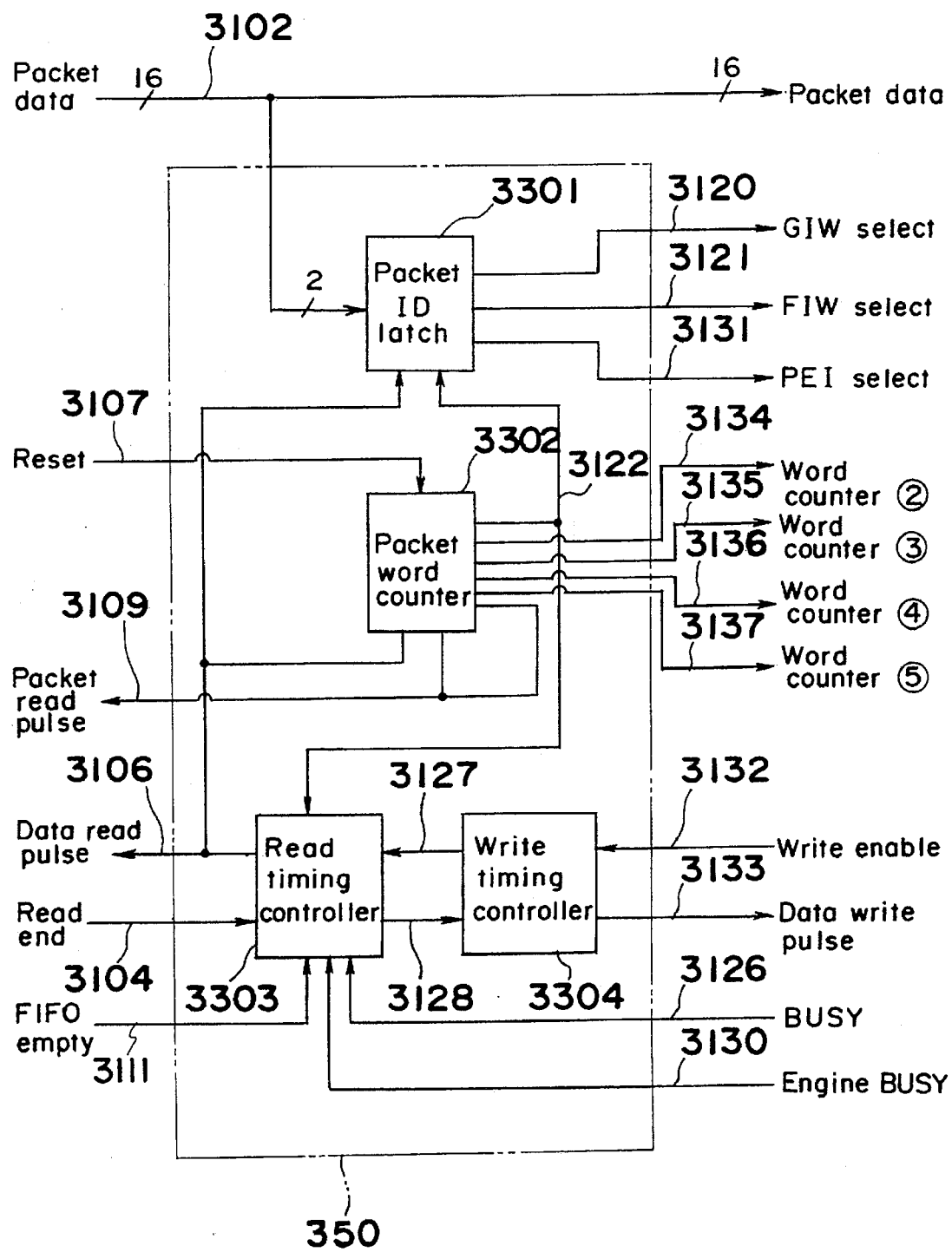
FIG. 48 is a block diagram of the packet switch according to the fifth embodiment of the present invention.

FIG. 48 shows a composition of the packet switch 350 according to the present invention.

The packet switch 350 is comprised of a packet ID latch 3301 for designating one intermediate code processor for the present packet to be processed, a packet word counter 3302 for counting a number of words having been processed in one packet, a read timing controller 3303 for controlling read timing of each intermediate code upon reading it from the FIFO 305 and a write timing controller 3304 for controlling write timing of each intermediate code upon writing it into the designated intermediate code processor.

The packet switch 350 is started to actuate when all of the following conditions are satisfied:
(1) No packet is being set into either one of the intermediate code processors 357, 351 and 356. This is checked from an output signal 3122 of the packet word counter 3302.
(2) Neither of the graphic imagewriter 356 and the font imagewriter 351 are processing a packet. This is checked by a BUSY signal on a signal line 3126.
(3) The print engine 4 is not printing. This is checked by an engine BUSY signal on a signal line 3130.
(4) At least one packet to be processed exists in the FIFO 305. This is checked by an FIFO empty signal on a signal line 3111.

Figure 49:
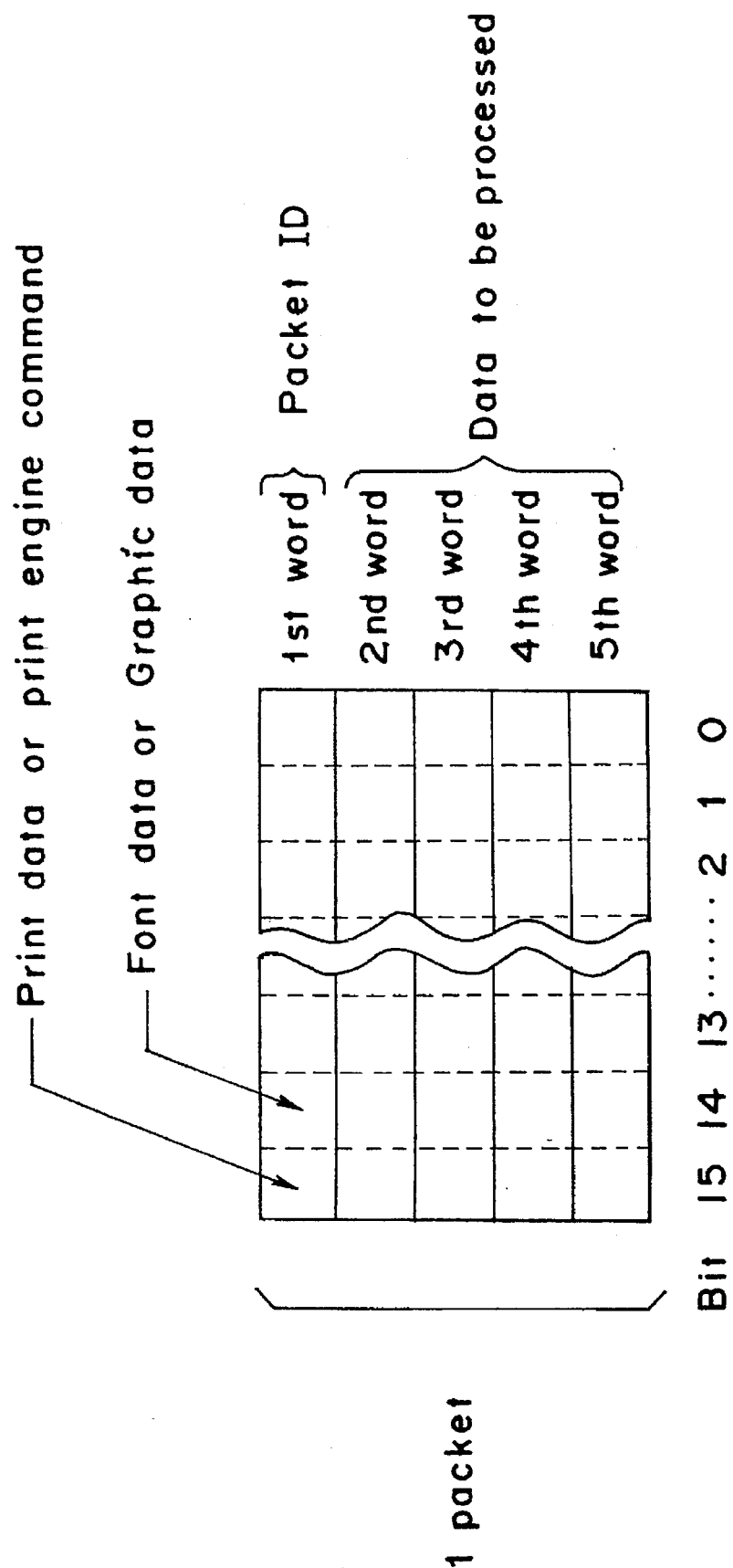
FIG. 49 is an explanative view showing a data structure of one packet.

Next, actions to be done by the packet switch 350 will be explained referring to FIGS. 48, 49 and 50.

When all of four conditions mentioned above are satisfied, the read timing controller 3303 reads the first word data out of FIFO 305. The first word data is data for designating either one of intermediate code processors. Since it is not needed to set into either one of intermediate code processors, the write timing controller (intermediate code timing controller) 3304 for generating a timing signal for setting data into the intermediate code processor is not actuated at that time. This is determined from an output signal indicating the first word data which is outputted from the packet word counter 3302 via the signal line 3122. The first word data is set into the packet ID latch 3301 in accordance with said output signal and a DATA READ pulse on she signal line 3106 and the packet word counter 3302 is incremented by the DATA READ pulse.

One of intermediate code processors is designated by the first word data having been set in the packet ID latch 3301. As shown in FIG. 49, the fifteenth bit of the first word is a bit for designating whether the present packet is a packet containing print data or a packet containing a print engine command and the fourteenth bit of the same word is a bit for designating either one of the font image writer 351 and the graphic image writer 356. The packet ID latch 3301 transforms this data into a select signal for selecting either one of intermediate code processors and outputs it thereto through either one of signal lines 3120, 3121, 3131. By this select signal, either one of intermediate code processors, namely the font imagewriter 351, the graphic imagewriter 356 and the print engine interface 357 is designated.

Figure 50:
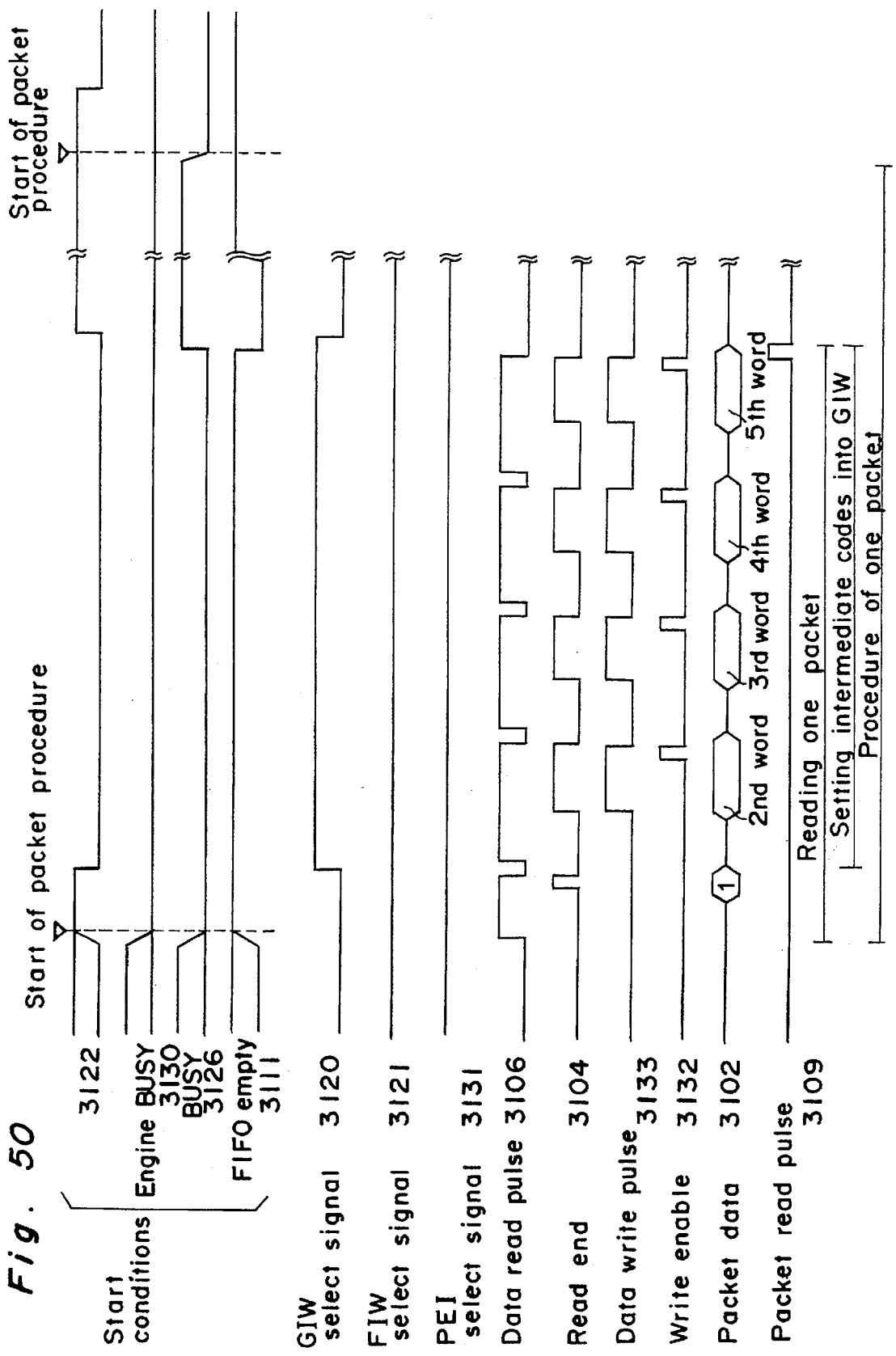
FIG. 50 is a timing chart showing packet data processing.

FIG. 50 is a timing chart of the packet switch 350 for showing a processing to be executed when the graphic image writer 356 is designated as an intermediate code processor.

The reading and setting of one word of data is carried out by two timing controllers 3303 and 3304. Namely, the read timing controller 3303 outputs a DATA READ pulse for demanding a data output to the FIFO 305 through the signal line 3106 at first and outputs a READ END signal indicating that the data output in the FIFO 305 is confirmed through the signal line 3128. The write timing controller 3304 outputs a DATA WRITE pulse for demanding tow rite data to the graphic imagewriter 356 through the signal line 3133 when it receives the READ END signal and, then, stops the DATA WRITE pulse when received a WRITE ENABLE signal for indicating that the graphic image writer 356 is ready for writing data through the signal line 3132. At this time, data is written into the graphic image writer 356. Then, the write timing controller 3304 outputs a signal indicating that data setting into the graphic image writer 356 has been completed through the signal line 3127 and the read timing controller 3303, when it receives the signal, stops to output the DATA READ pulse through the signal line 3106. As a result, the read address counter 3055 in the FIFO 305 is incremented and the packet word counter 3056 is incremented. Thus, the reading of data from the FIFO 305 and setting thereof into the graphic imagewriter 356 is completed.

Similarly, the reading and setting of data is repeated. When the procedure regarding one packet data has been completed, a PACKET READ pulse indicating the completion of the procedure of one packet data is outputted from the packet word counter 3302 through the signal line 3109 and, due to this signal, the packet counter 3056 in the FIFO 305 is decremented. Also, as a result of this signal, the packet word counter itself is cleared to return to the initial state thereof. Furthermore, the designated intermediate code processor outputs a BUSY signal through the signal line 3126 in order to prevent a restart of the packet switch 350 during the procedure when received the fifth word data and, when the procedure of one packet data has been completed, stops the output of the BUSY signal to allow the packet switch 350 to start the next action. Thereafter, the packet switch 350 starts the next action when all of four conditions are satisfied.

The packet word counter 3302 is cleared forcibly at the timing of power on. Also, all of select signals from the packet ID latch 3301 are held at "Low" level during an input of the signal 3122.

(d) Composition of the graphic imagewriter

Figure 51:
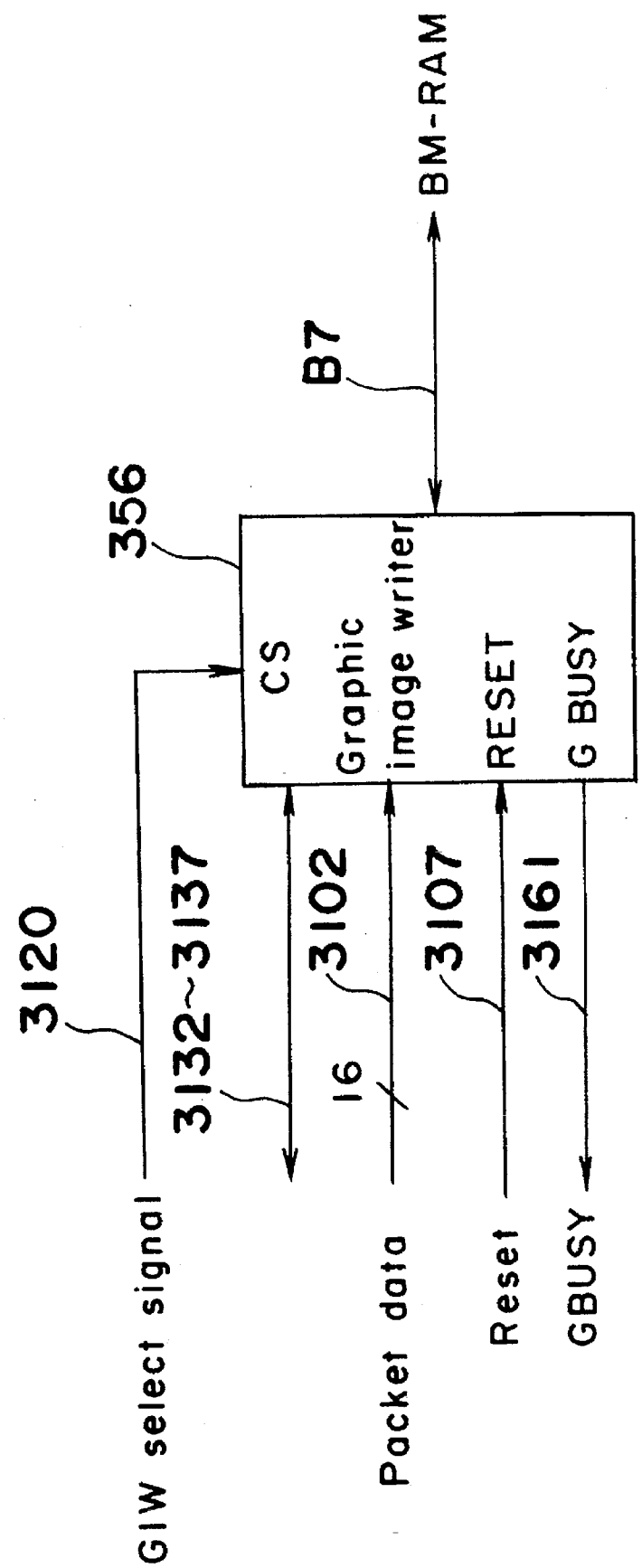
FIG. 51 is a block diagram of a graphic image writer according to the fifth embodiment of the present invention.

FIG. 51 shows a composition of the graphic image writer 356.

The graphic writer 356 is actuated when intermediate codes memorized in the FIFO 305 are set by the packet switch 350 and outputs a GBUSY signal of "High" level indicating that graphic images are being imaged after completion of setting intermediate codes from the packet switch 350 through the signal line 3161. It analyzes parameters contained in the intermediate codes to write graphic images into the BM-RAM 32 through the bus B7. After the completion of writing images, the GBUSY signal is dropped to "Low" level to indicate the completion to the packet switch 350.

It is to be noted that the graphic image writer 356 receives packet data only when the select signal for selecting the same is kept at "High" level. In addition, it is forcibly cleared when the power is turned on.

(e) Composition of the font imagewriter

Figure 52:
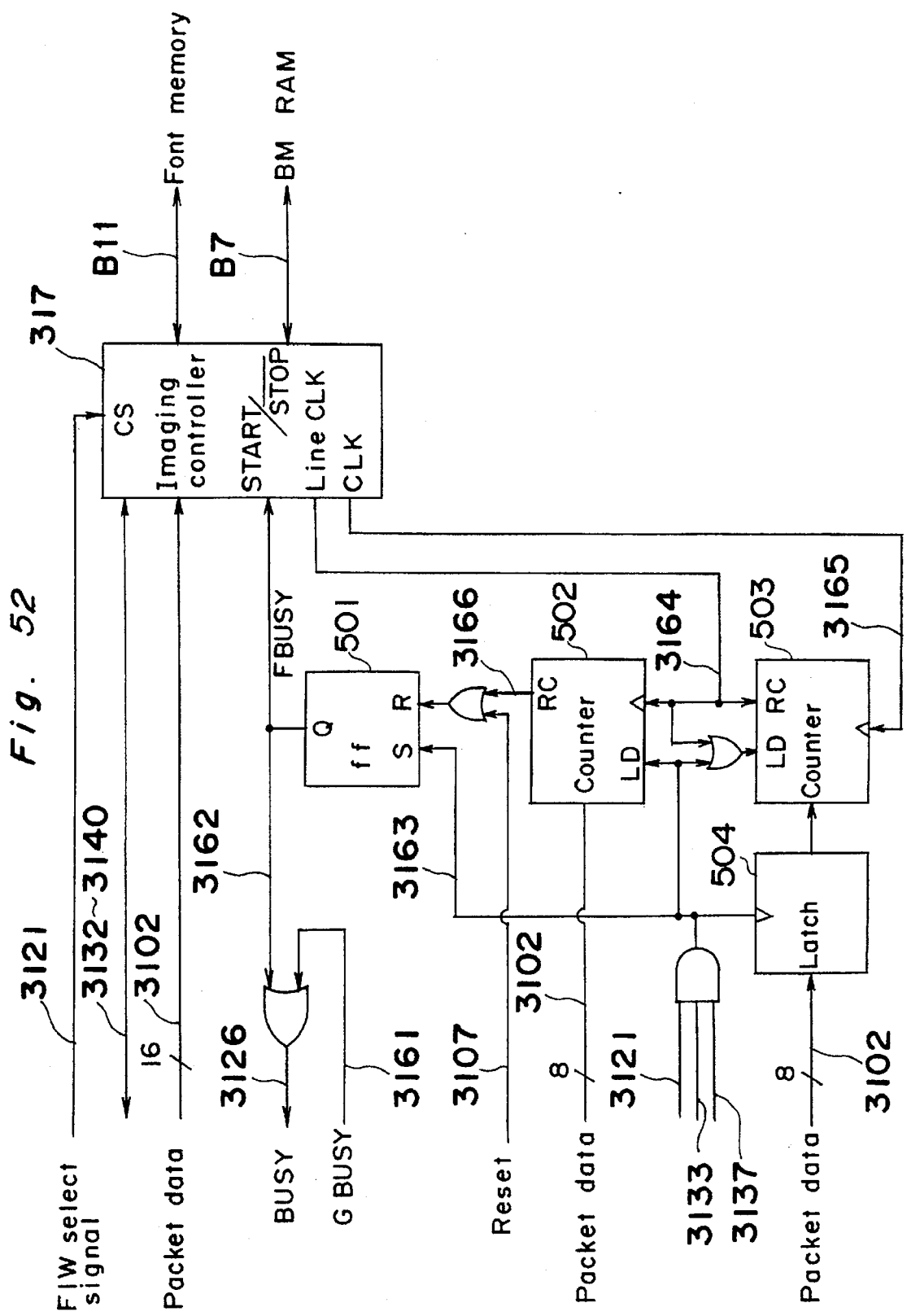
FIG. 52 is a block diagram of a font image writer according to the fifth embodiment of the present invention.

FIG. 52 shows a composition of the font image writer (FIW) 35.

The font image writer 351 is actuated in accordance with data contained in intermediate codes when they are set from the FIFO 305 thereinto by the packet switch 350. When the top address of a font, the top write address into the BM-RAM 32, a write mode and a width and height of a font are set by the packet switch 350, the font imagewriter 351 automatically writes a font image in accordance with those data.

The font imagewriter 351 is comprised of an imaging controller 317 for imaging a font image into the BM-RAM 32 by calculating a font address of each data and a write address on BM-RAM 32 and a count means for counting a pattern size of the font data.

The imaging controller 317 starts to image the font data into the BM-RAM 32 in accordance with set values regarding the top font address, the write address on the BM-RAM 32 and the write mode when an FBUSY signal of "High" level is outputted through the signal line 3162 and calculates a font address and a write address for the next font data after completion of writing each data. And, at the same time, it outputs a clock signal indicating completion of imaging one data through a signal line 3165. The imaging action by the imaging controller 317 is continued until the FBUSY signal is dropped to "Low" level.

The count means for counting a pattern size of a font is comprised of a latch for memorizing the width of a font, a counter 503 for counting the same, a counter 502 for counting the height of a font and a flip-flop 501 for outputting an FBUSY signal on a signal line 3162 which indicates an imaging state and the completion of imaging.

The count means sets the width of a font into the counter 502 and the height of a font into the counter 503 and the latch 504 by outputting a signal for setting a pattern size of a font via a signal line 3163, which is an output of art AND gate generated from an output of the word counter 505 indicating the fifth word of a packet, a DATA WRITE pulse via a signal line 3133 and a FONT IMAGE WRITER SELECT signal via a signal line 3121. And at the same time, it sets the flip-flop 501 in order to output an FBUSY signal of "high" level. As a result of this signal, the imaging controller 317 is started. The counter 503 counts clock signals through a signal line 3165 each of which is outputted by the imaging controller 317 every time that one character has been imaged. When the count operation thereby has been completed, it outputs a RIPPLE CARRY signal indicating completion of writing one line data to a signal line 3164. As a result of this signal, a value of a character width set in the latch 504 is loaded into the counter 503. Furthermore, this signal is input into the imaging controller 317 to calculate a write address on the BM-RAM 32.

When the counter 502 completes counting of the height of a font, a RIPPLE CARRY signal indicating that counting of a pattern size of a font has been completed is outputted through a signal line 3166 to reset the flip-flop 501. When the flip-flop 501 is reset, the FBUSY signal is set at "Low" level in order to indicate the packet switch 350 that the imaging of one font has been completed and to stop an action of the imaging controller 317.

A GBUSY signal on a signal line 3161 which indicates that the graphic imagewriter 356 is in action and a FBUSY signal on a signal line 3162 which indicates that the font image writer 351 is in action are applied to an OR gate and, therethrough, transmitted to the packet switch 350 as a BUSY signal indicating that the bit map writer 51 is in action via a signal line 3126.

The font imagewriter 351 receives and processes data only when the FONT IMAGE WRITER SELECT signal is at "High" level. Furthermore, the flip-flop 501 is forcibly cleared upon turning on the power supply and, therefore, the font image writer 351 is cleared.

(f) Composition of PEI

Figure 53:
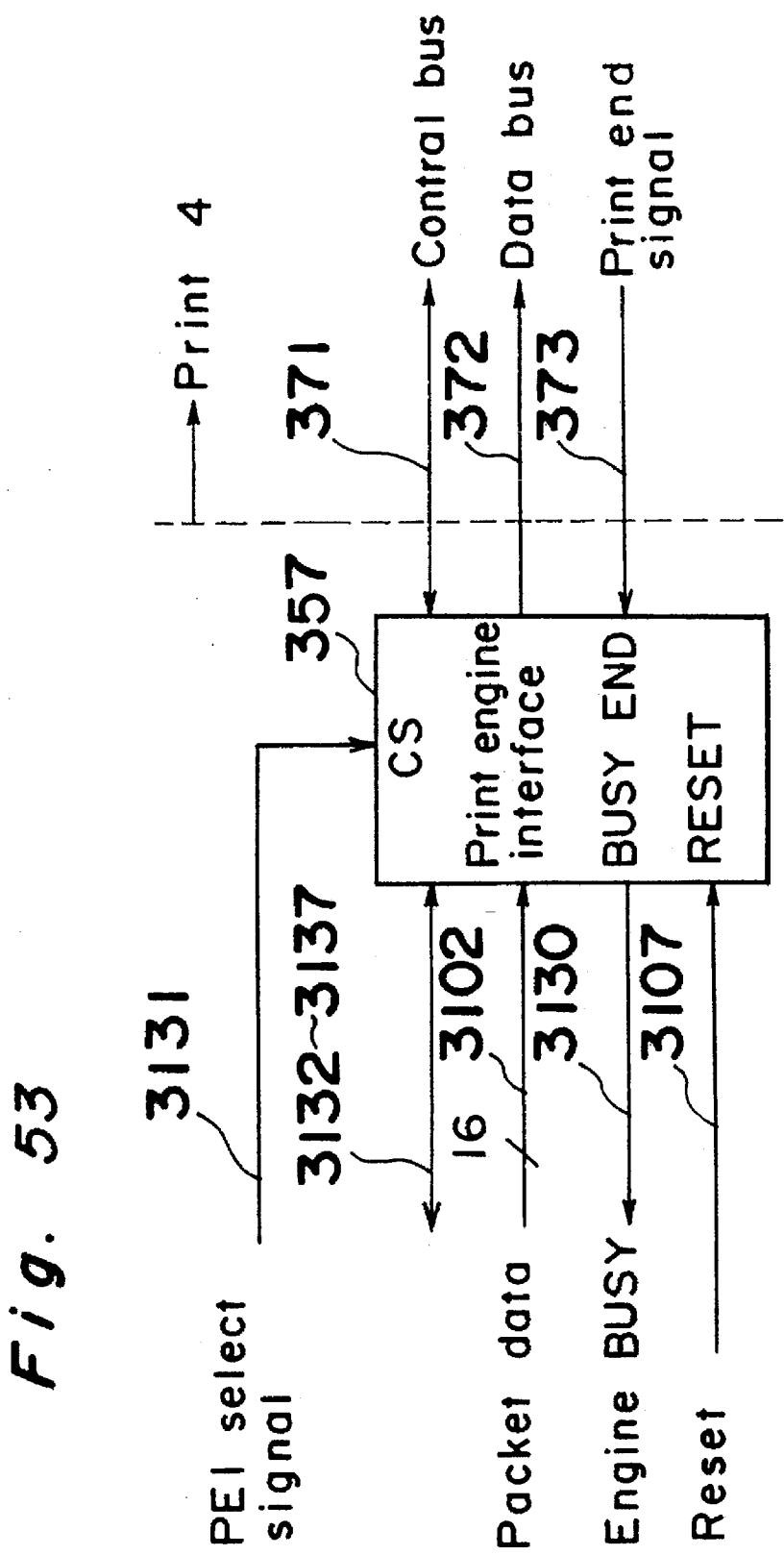
FIG. 53 is a block diagram of a print engine interface according to the fifth embodiment of the present invention.

FIG. 53 shows a composition of the print engine interface 357.

The print engine interface 357 processes print engine commands such as IFC related codes and JOB control codes among intermediate codes memorized in the FIFO 305. It receives PRINT ENGINE commands read out of the FIFO 305 by the packet switch 350 and transmits them to the print engine 4. If the received PRINT ENGINE command is a PAGE EJECT code, it outputs an ENGINE BUSY signal through a signal line 3130 during receiving intermediate codes since it is necessary to suspend imaging operation by the bit map writer 51.

The ENGINE BUSY signal is kept continued until a PRINT END signal is input thereto through a signal line 373 which is outputted by the print engine 4 after completion of a print operation.

If the PRINT ENGINE command is not a PAGE EJECT code, the ENGINE BUSY signal is not outputted since it is not necessary to suspend the action of the packet switch 350 in processing the command which is not related to the action of the bit map writer 51.

The print engine interface 357 receives packet data only when the PRINT ENGINE INTERFACE SELECT signal is at "High" level and is forcibly cleared upon turning on the power supply.

<Image area>

The image area for the present embodiment is the same as the image area illustrated in FIG. 10 of the first embodiment of the present invention.

(g) Routines by the information processor

Figure 54:
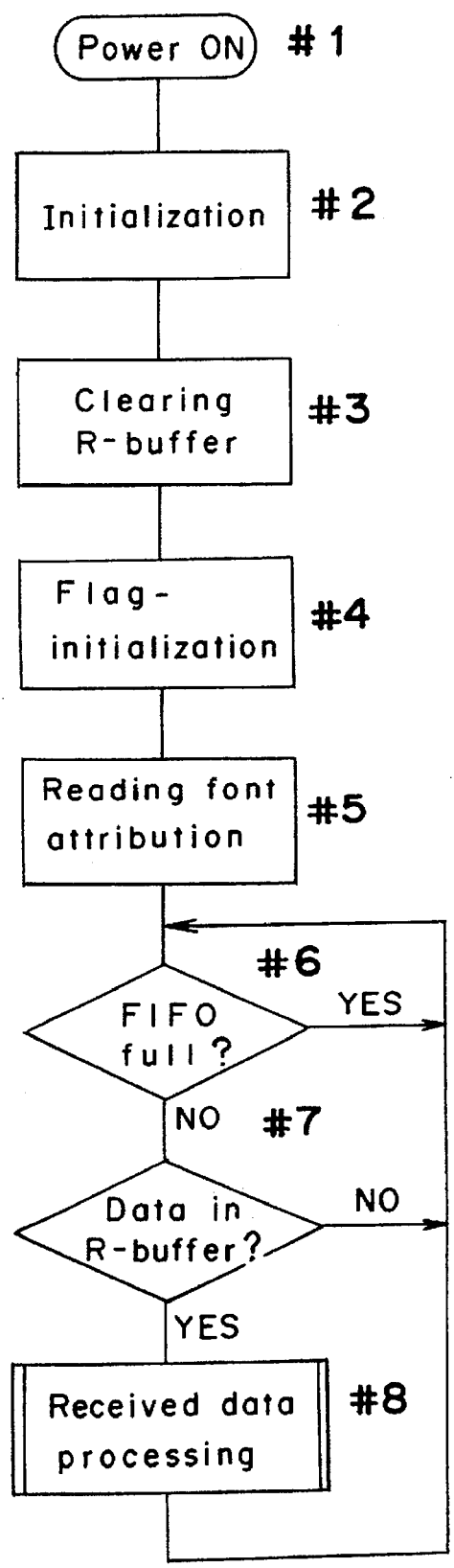
FIG. 54 is a flow chart of the main routine to be executed by the information processor according to the fifth embodiment of the present invention.

Referring to FIG. 54, when the power source is turned on at step #1, the information processor 320 is initialized internally at step #2 and, then, the R-buffer 304 for storing data received from the external data processor I is cleared at step #3. Also, a control flag is initialized at step #4. Specifically, an LPWRITE flag for indicating a "pre-editing stage" in a received data processing routine is cleared. As stated above, the FIFO 305 is forcibly cleared upon switching on the power supply. Then, at step #5, a font attribution is read from the font memory 33 in preparation for transformation into intermediate codes in order to determine a font format of characters to be printed.

After completion of these preparation operations, the process enters into a main loop including steps #6, #7 and #8. In this main loop, analysis of received data and transformation of the received data into intermediate codes are executed.

At first, data sent from the external data processor 1 are stored in the R-buffer 304 by an interruption routine (See FIG. 59) for receiving data which is started in asynchronous with the main loop by a REQUEST command from the data processor interface 308. If the FIFO 305 is not full at step #6 and there is data in the R-buffer 304, these received data are transformed into intermediate codes by a RECEIVED DATA PROCESSING routine (step #8 and see FIG. 53) to store transformed intermediate codes in the FIFO 305. In other words, the information processor 320 transfers data processing, via the FIFO 305, to the bit map writer 51 in the style of intermediate codes. These intermediate codes include respective values of write addresses on BM-RAM 32 which are calculated according to the selected font pattern and font size and, accordingly, they are deemed as pre-edited data.

The reason why the font attribution is read at step #5 is to pre-edit data in asynchronous with imaging of characters to be executed by the bit map writer 51.

Figure 55A:
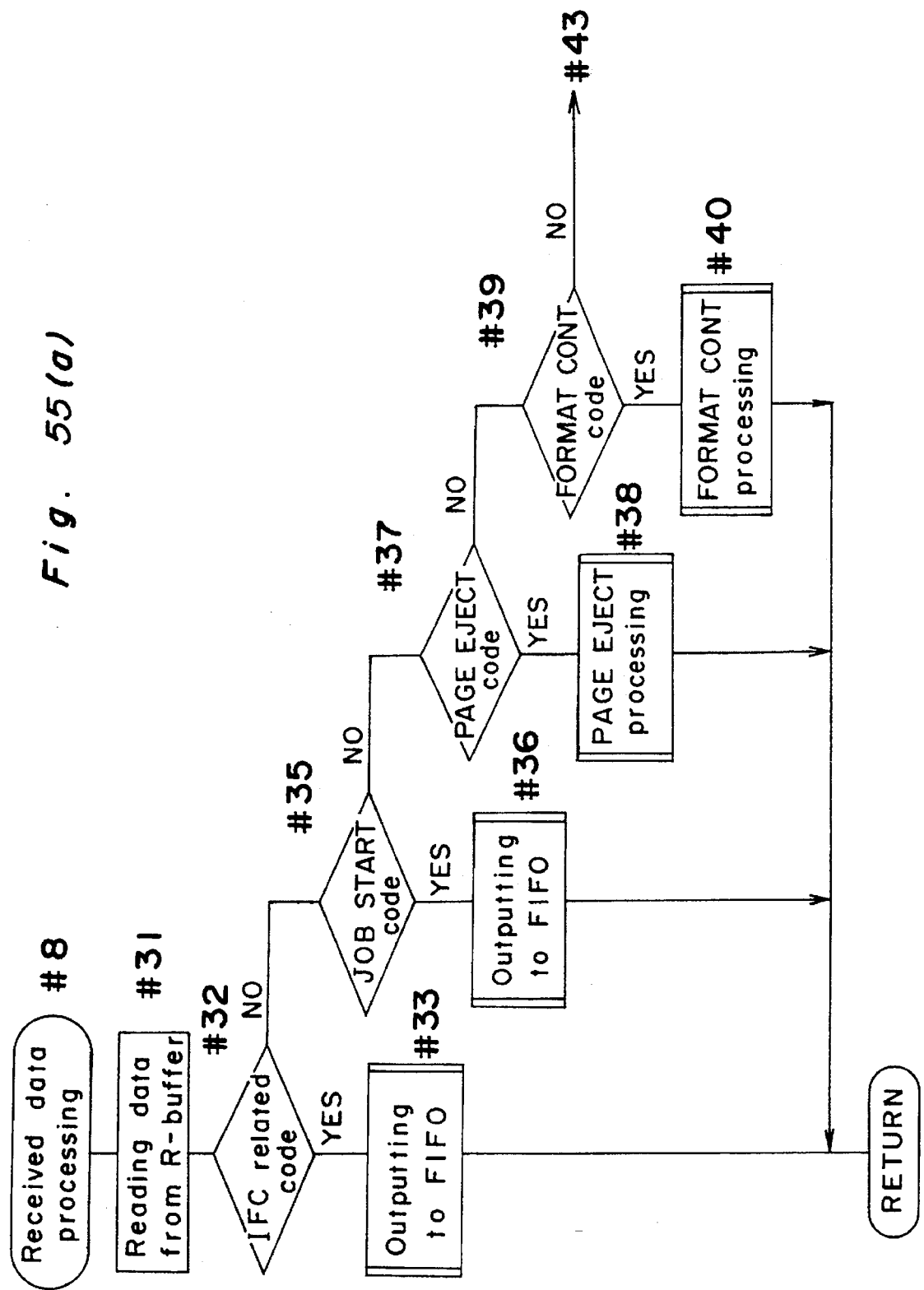
FIGS. 55(a) and 55(b) show a flow chart of received data processing of step #8 of FIG. 54.
Figure 55B:
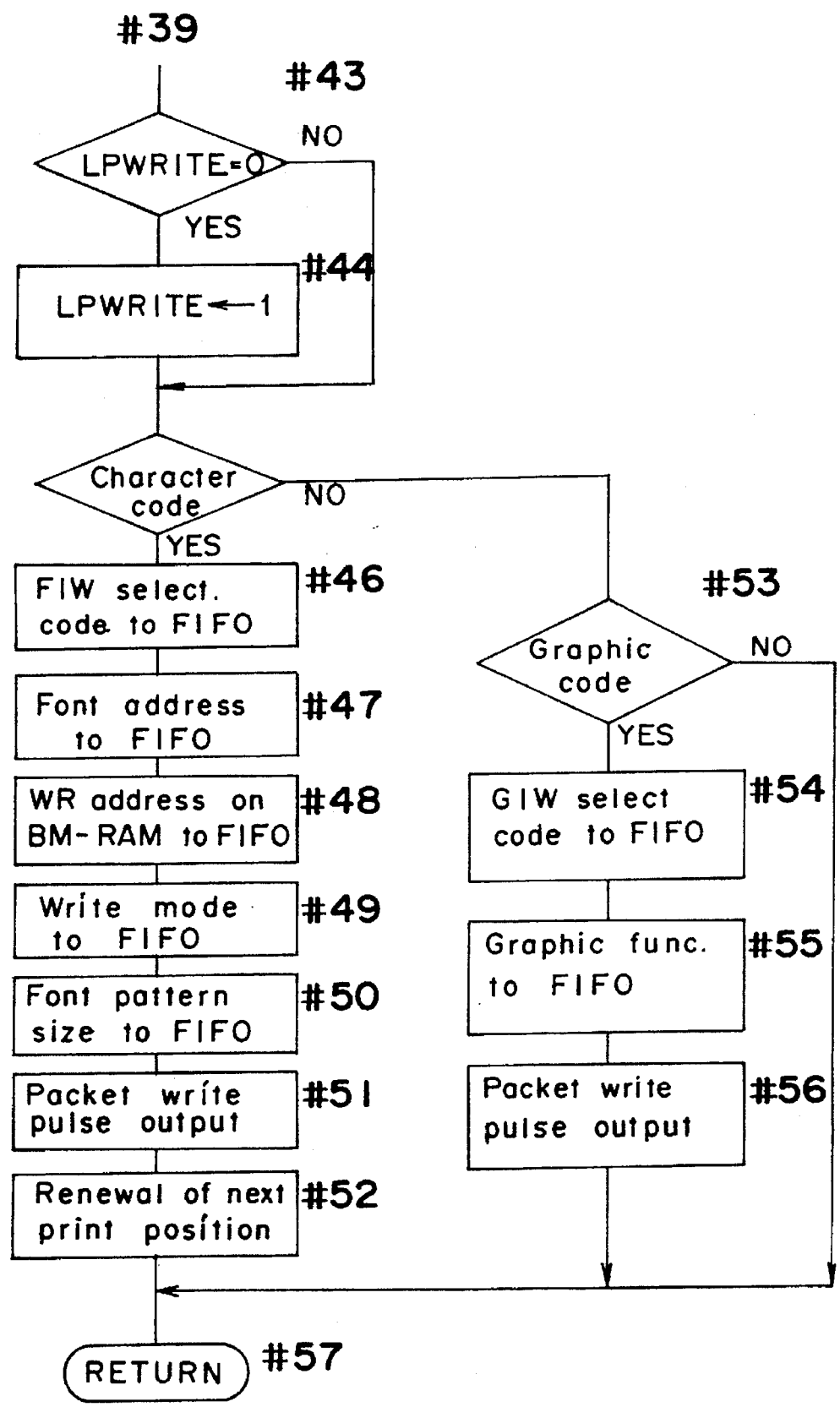

FIGS. 55(a) and 55(b) show a flow chart for the RECEIVED DATA processing.

The received data are classified into four kinds as follows:
IFC related code (print engine related code)
JOB control code (JOB START, PAGE EJECT)
FORMAT control code
Print data (Character code, Graphic code)

At first, each code data stored in the R-buffer 304 is read therefrom and the kind of the code is identified at step #31. If it is print data (all NOs at steps #32, #35, #37 and #39), the LPWRITE flag is set at "1" at step #44 and the print data is transformed into an intermediate code having a corresponding format to output the latter to the FIFO 305. Namely, if it is a character code (YES at step #45), an address of the corresponding font pattern which is calculated at step #47, a write address on the BM-RAM 32 corresponding to a print position on the image area A3 which is calculated at step #48 and a WRITE MODE code (step #49) are outputted to the FIFO 305 since the format of the character code is same to that to the font imagewriter 351. In the case of a character code, the next printing position is renewed at step #52. If it is a graphic code (YES at step #53), a GRAPHIC FUNCTION code is outputted to the FIFO 305 in a format same to that of a command to the graphic image writer 356 at step #55.

In each case of a character code and a graphic code, a code for indicating whether the present packet includes character codes or graphic codes is outputted as the top of packet data at step #46 or #54. Then, a packet write pulse indicating that the writing packet of data has been completed is outputted after outputting four words of intermediate codes.

If the code data is an IFC related code (at step #32) which is to be outputted to the FIFO 305 as an intermediate code of function type being different from a type of print data in order for synchronization with print data at step 33.

As JOB CONTROL codes, there are provided a PAGE EJECT code for indicating an end of every page and a JOB START code for indicating an end of every JOB (every group of pages). If the code data is either one of the JOB CONTROL codes (at step #35 or #37), it is outputted to the FIFO 305 at step #36 or #38 similarly to the IFC related code.

A FORMAT CONTROL code is provided for altering the print format. If the code data is a FORMAT CONTROL code (at step #39), FORMAT CONTROL processing is executed at step #40.

Figure 56:
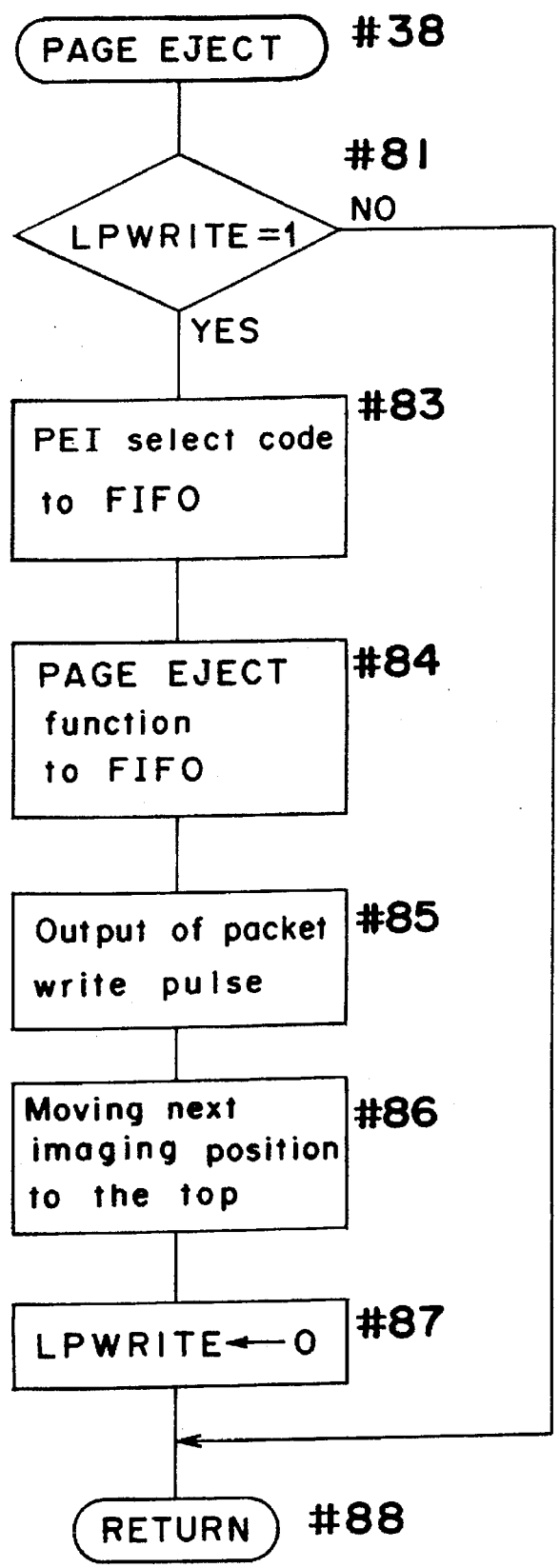
FIG. 56 is a flow chart of a PAGE EJECT routine.

FIG. 56 shows a flow chart for PAGE EJECT processing at step #38 of FIG. 55(a).

This PAGE EJECT processing is a kind of imaginary processing for pre-editing data on the FIFO 305 as intermediate codes and, accordingly, is different form a processing wherein an actual paper discharge action is accompanied. This processing is executed when the LPWRITE flag is set at "1" (at step #81). At first, an intermediate code indicating a PAGE EJECT is outputted to the FIFO 305. in this routine, a code (packet ID) indicating a PRINT ENGINE command is outputted as the top word at step #83, similarly to other intermediate codes and, after outputting four words of intermediate codes at step #84, a PACKET WRITE pulse indicating that the writing of one packet has been completed at step #85. However, an actual paper discharge is done when the print engine interface 357 received the intermediate code from the FIFO 305.

At step #86, the next print position is moved to the top position of the image area in preparation for edition of the next page. Then, the LPWRITE flag is reset at "0" at step #84. If the LPWRITE flag is equal to "0" at step #87, PAGE EJECT processing is not executed to avoid a discharge of an empty page.

Figure 57:
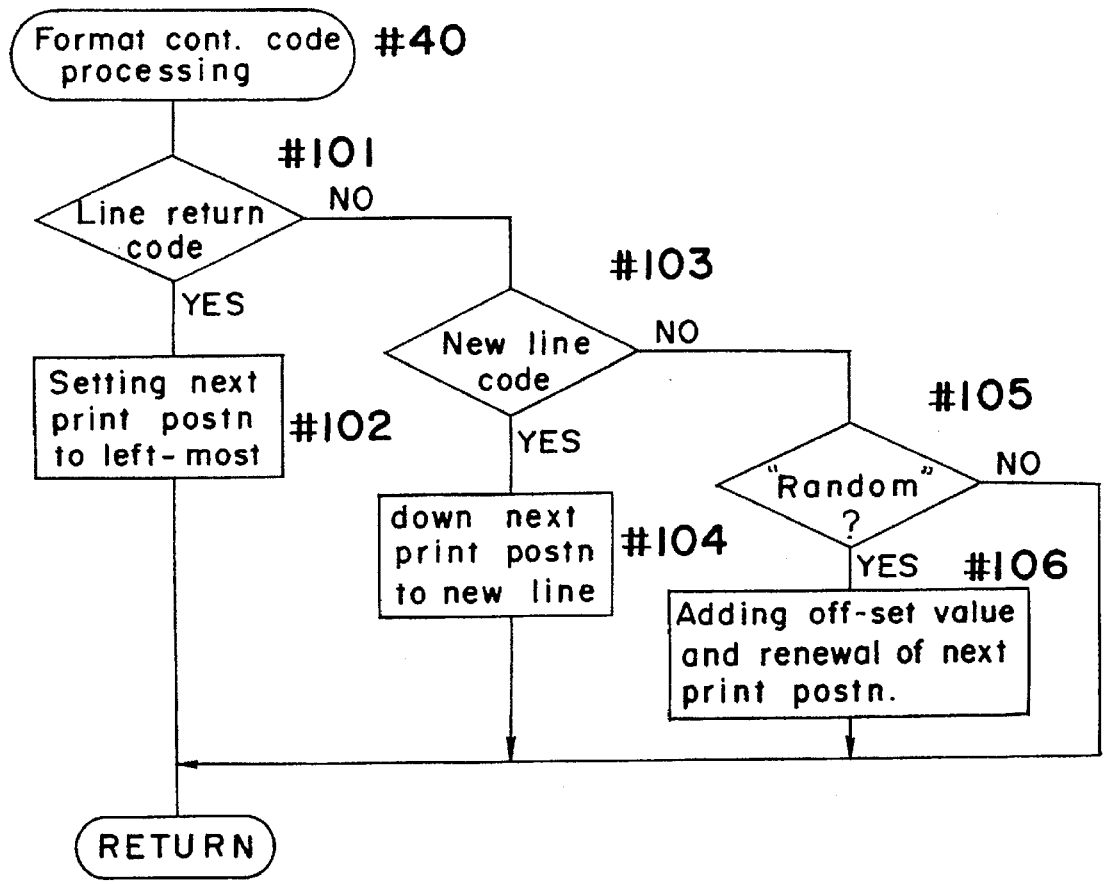
FIG. 57 is a flow chart of FORMAT control code processing.

FIG. 57 shows a flow chart for FORMAT CONTROL CODE processing at step #40 of FIG. 55(a).

If the code data is a RETURN LINE code at step #101, the next print position is moved to the left-most position A13 of the image area A3 at step #102. If the code data is a NEW LINE code at step #103, the next print position is moved down by one line at step #104. If the code data is a RANDOM DESIGNATION code at step #105, the next print position is renewed by adding an off-set value at step #106.

Figure 58:
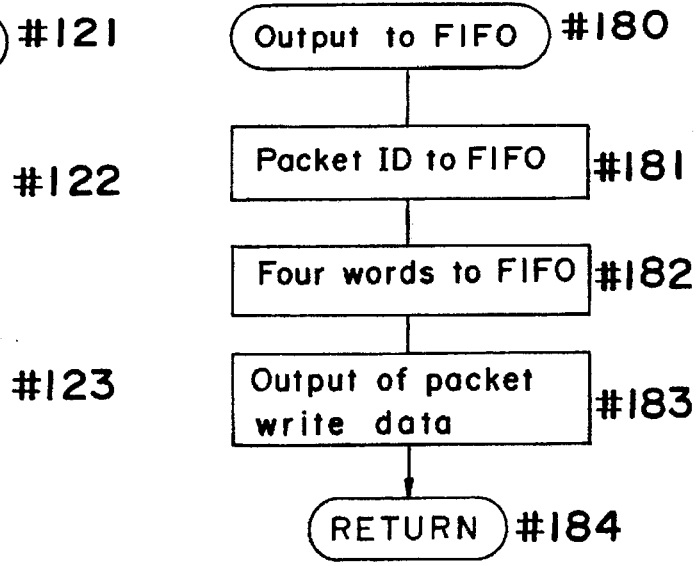
FIG. 58 is a flow chart of a routine for outputting data to the FIFO.

FIG. 58 shows an output routine of packet data toward the FIFO 305. At first, a packet ID indicating a PRINT ENGINE command is outputted as the top word to the FIFO 305 at step #181. When four words have been outputted to the FIFO 305 at step #182, a PACKET WRITE pulse is outputted to FIFO 305 at step #183.

Figure 59:
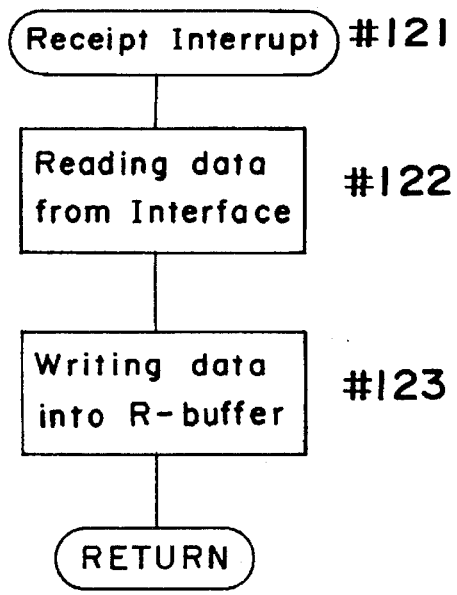
FIG. 59 is a flow chart of an interruption routine upon receiving data.

FIG. 59 shows an interruption routine to be executed upon data receipt.

When an interruption signal is input from the external data processor 1 at step #121, data are read from the data processor interface 308 at step #122 and, then, the data are written into the R-buffer 304 at step #123.

Sixth Preferred Embodiment

Figure 60:
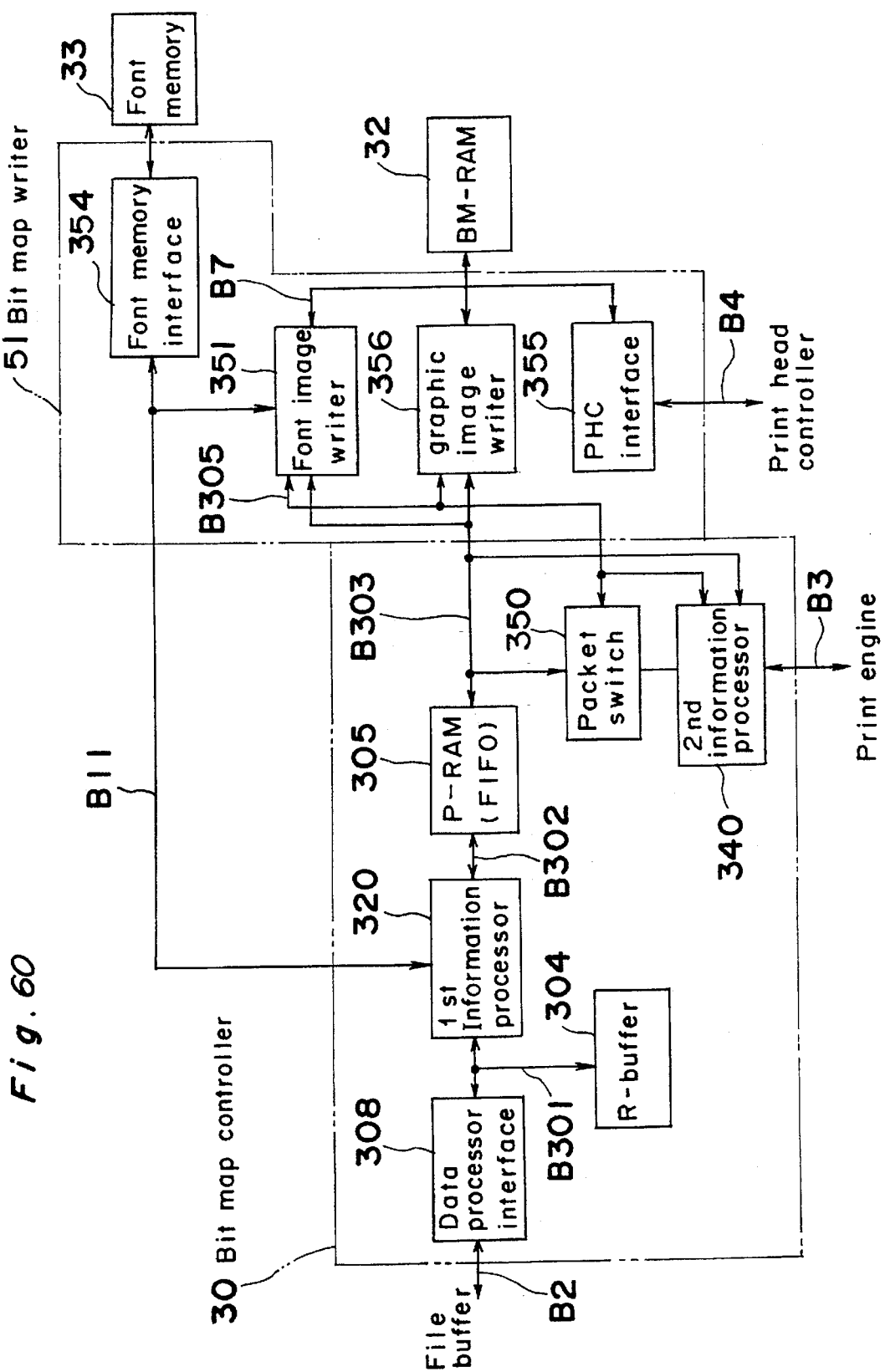
FIG. 60 is a block diagram showing a bit map controller and a bit map writer according to a sixth preferred embodiment of the present invention.

FIG. 60 shows a block diagram of the bit map controller 30 according to the sixth preferred embodiment of the present invention.

As shown in FIG. 60, the bit map controller 30 provides first and second information processors 320 and 340 each of which is comprised of a microprocessor. As is apparent from comparison of FIG. 60 with FIG. 45 of the fifth preferred embodiment, the print engine interface 357 of the latter is replaced by the second information processor 340 for controlling the print engine 4 by outputting control commands in accordance with intermediate codes thereto via the bus B3.

The first information processor 320 is the same as the information processor 320 of FIG. 45.

All of other parts of the bit map controller 30 of FIG. 60 are the same as those of the bit map controller of FIG. 45.

Figure 61:
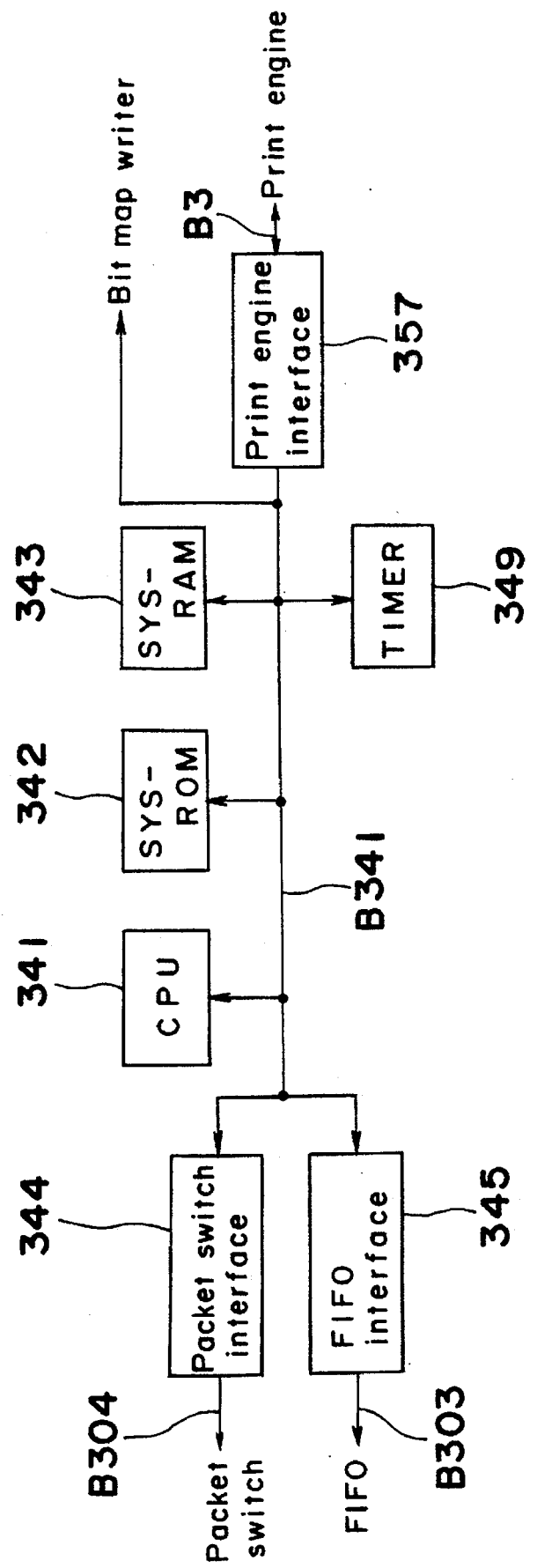
FIG. 61 is a block diagram of the second information processor according to the sixth embodiment of the present invention.

FIG. 61 shows a composition of the second information processor 340. It is comprised of a CPU 341 for processing data, a system ROM 342 for storing programs for the CPU 341 and a system RAM 343 to be used as a working area for the same. A timer 349 is provided for enabling the CPU to control various timings.

The second information processor 340 receives intermediate codes stored in the FIFO 305 through an a FIFO interface 345 and controls the print engine 4 through a print engine interface 357. In addition, it is connected to the packet switch 150 through a packet switch interface 344 and the procedure thereof is synchronized with that of the packet switch 350 by signals such as a ENGINE BUSY signal and a SECOND INFORMATION PROCESSOR SELECT signal.

The composition of the FIFO 305 according to the sixth preferred embodiment is substantially the same as that shown in FIG. 47 except for that the print engine interface 357 is replaced by the second information processor 340.

Figure 62:
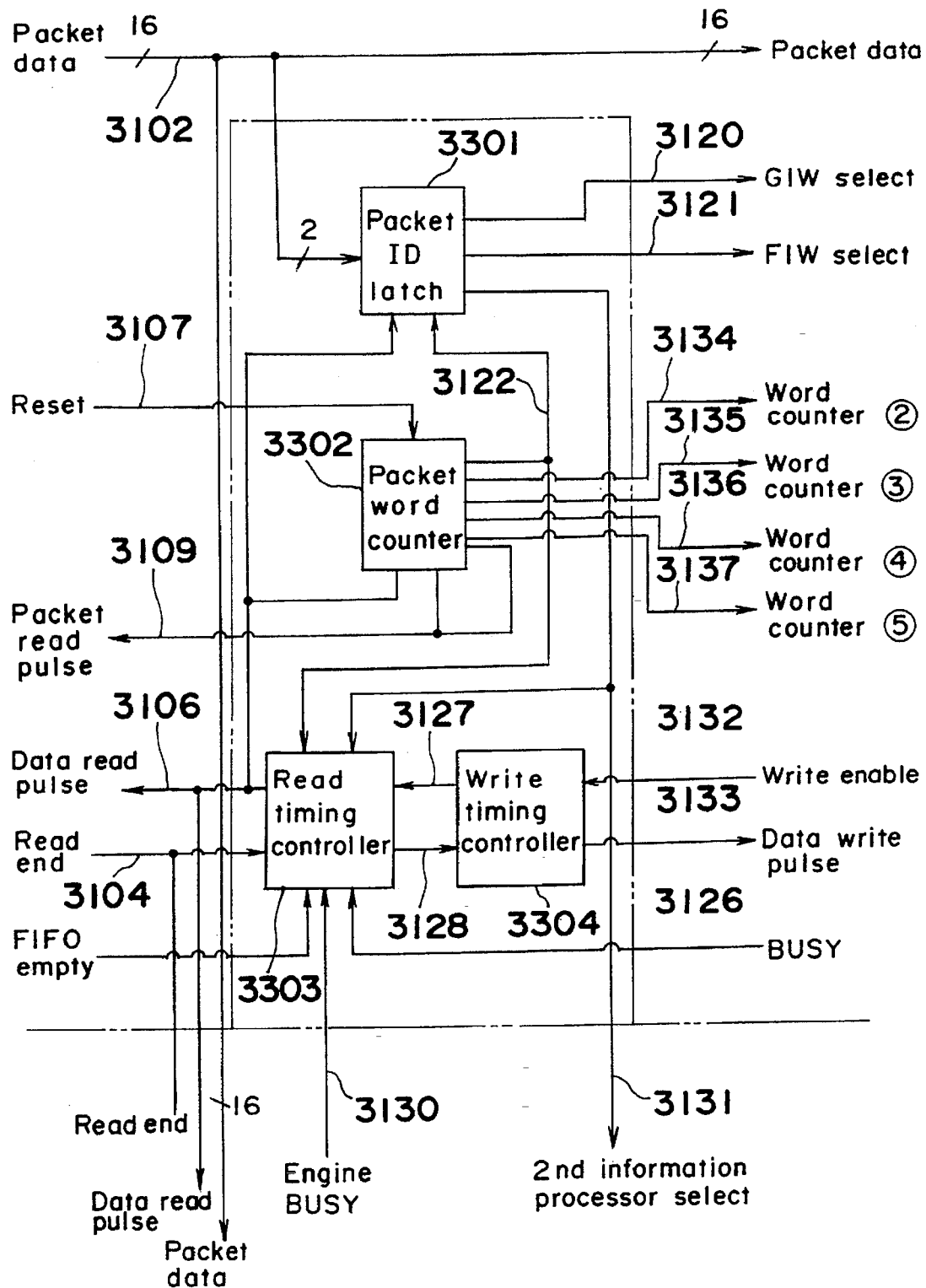
FIG. 62 is a block diagram of the pack switch according to the sixth preferred embodiment of the present invention.

FIG. 62 shows a composition of the packet switch 350 according to the sixth preferred embodiment. As is apparent from comparison of FIG. 62 with FIG. 48, the only difference therebetween is that the signal line 3131 is connected to the second information processor 340 instead of the printing engine interface (PEI) 357.

If the second information processor 340 is designated as an intermediate code processor by the first word of a packet, the packet ID latch 3301 outputs a SECOND INFORMATION PROCESSOR SELECT signal to the second information processor 340 and a signal for stopping an action of the read timing controller 3303 to the same.

When the second information processor 340 receives said select signal through the signal line 3131, it outputs an ENGINE BUSY signal through the signal line 3130 to prohibit the action of the packet switch 350 until the processing has been completed after reading one packet data. Thereafter, it reads out intermediate codes of four words in the FIFO 305 in accordance with each DATA READ pulse and DATA WRITE pulse being outputted by the read timing controller 3303 and the write timing controller 3304, respectively. When the processing of intermediate codes has been completed, it stops the ENGINE BUSY signal.

A timing chart of the packet procedure according to the sixth preferred embodiment is substantially the same as that shown in FIG. 50 except for that the PEI select signal is replaced by the SECOND INFORMATION PROCESSOR SELECT signal and, therefore, has not been illustrated.

Figure 63:
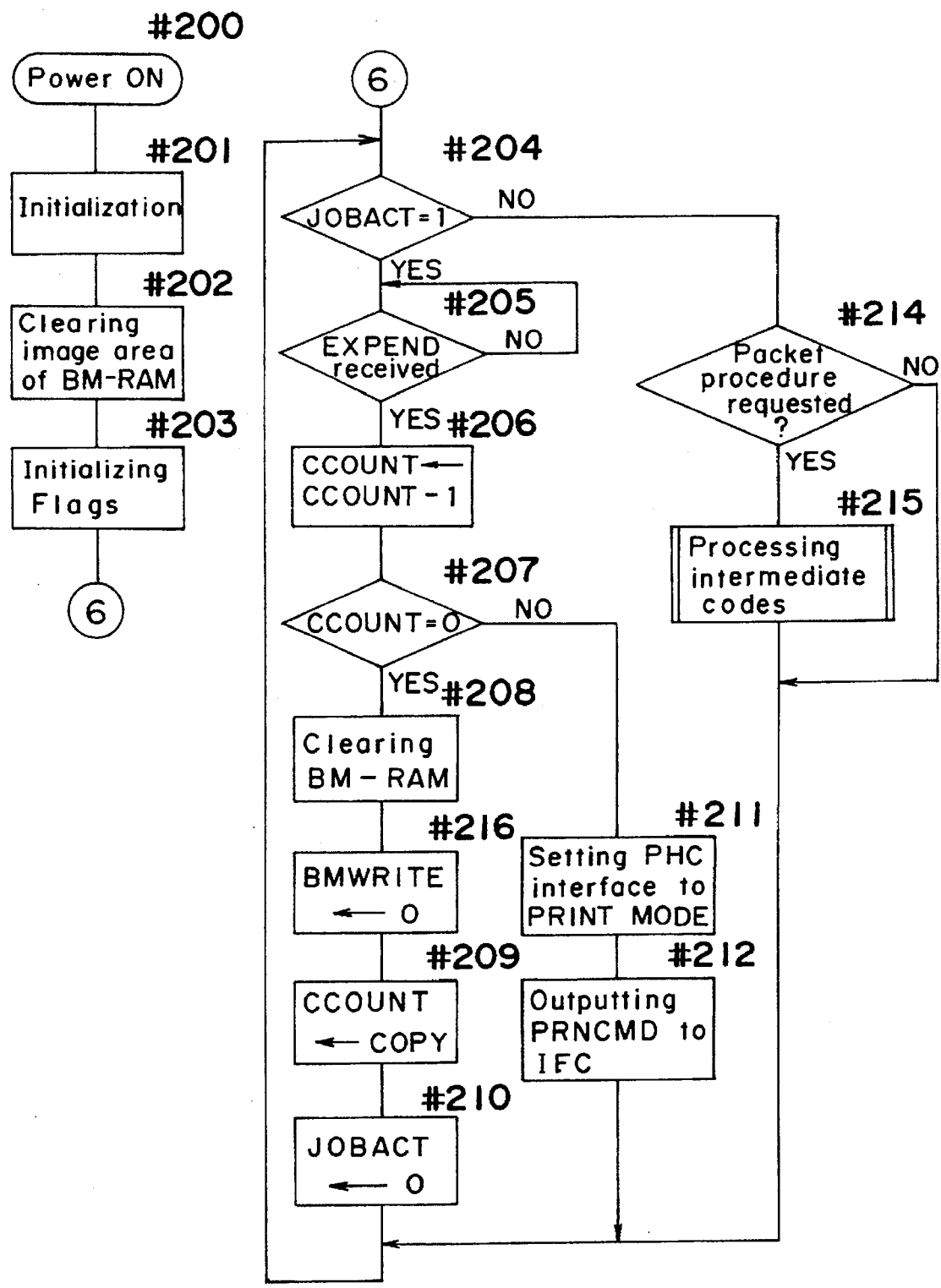
FIG. 63 is a flow chart of the main routine to be executed by the second information processor.
Figure 64:
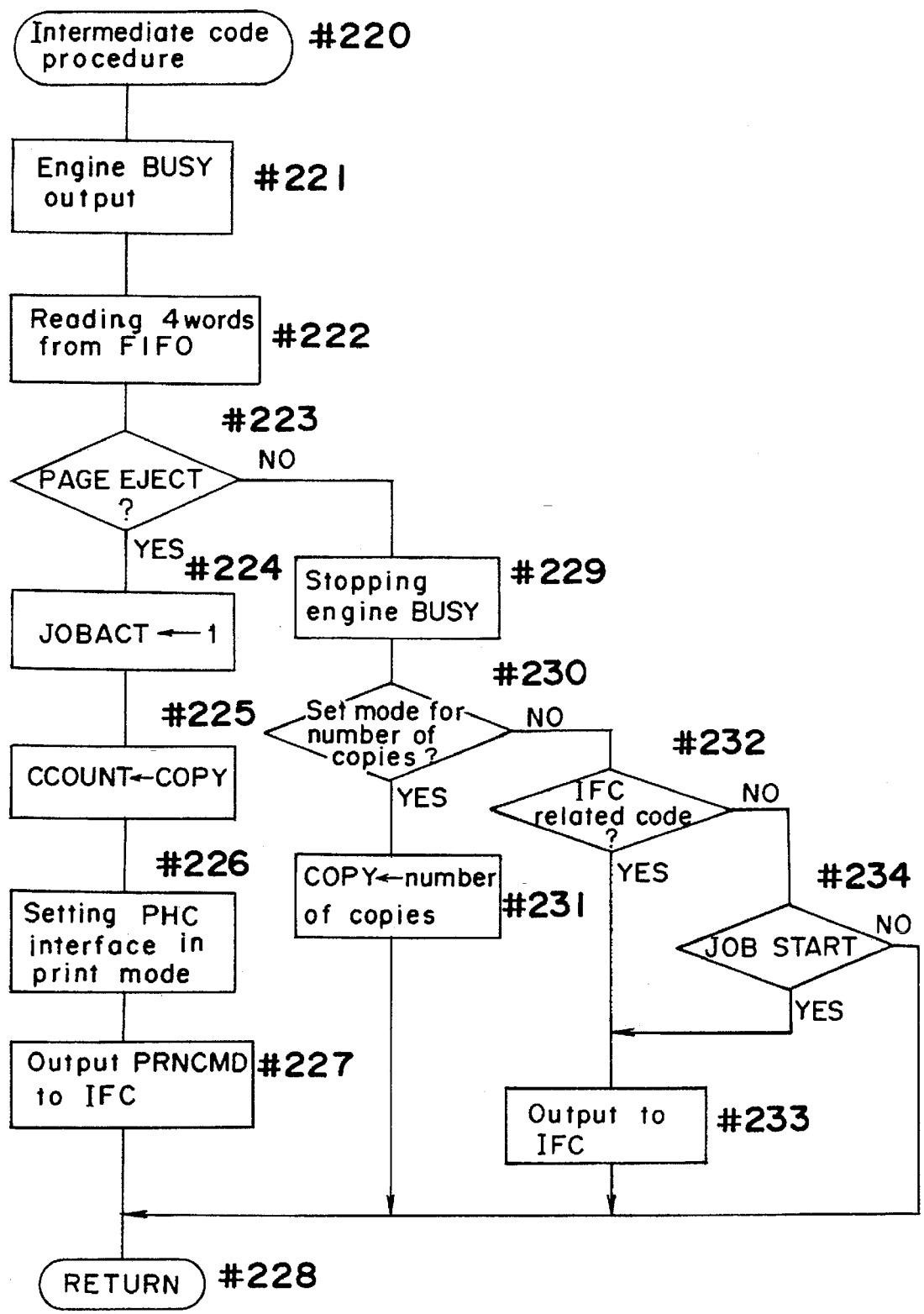
FIG. 64 is a flow chart of intermediate code processing routine to be executed by the second information processor.

FIGS. 63 and 64 show flow charts of routines to be executed by the second information processor 340.

When the power is turned on at step #200, an internal initialization is performed at step #201 at first, the image area of the BM-RAM 32 is cleared at step #202 and, then, control flags are initialized at step #203. More concretely, the JOBACT flag for indicating a print state is cleared, the COPY flag for indicating a number of copies for the same page is set at one and the CCOUNT for counting a number of copies for the same page is set at one.

Thereafter, the process is advanced to a main loop. In the main loop, an analysis of intermediate codes (steps #214 and #215) and a print sequence control (steps from #205 to #212) are performed.

The data flow is as follows. At first, if the JOBACT flag for indicating a discharge condition of paper is set at "1" at step #204, the print sequence control is started. If the JOBACT flag is not set at "1", a packet data procedure is performed at step #215 when it is requested by the packet switch 330 at step #214.

FIG. 64 shows the subroutine for the intermediate code procedure of step #233 of FIG. 63. In this subroutine, the sequence control such as outputting commands to the print engine 4 according to intermediate codes is performed.

If the intermediate code is an IFC related code (at step #232) or the JOB START code (at step #234), it is outputted to the interface controller 40 at step #233. If it is a code for Setting a number of copies, the number of copies is renewed.

The intermediate code procedure is continued sequentially as long as the request from the packet switch 350 exists. If the PAGE EJECT code is detected at step #223, the print operation is started since this code indicates that all data of one page have been transformed into bit images. If the intermediate code is a code other than the PAGE EJECT code (NO at step #223), a PRINT BUSY signal for stopping the action of the packet switch 330 is outputted at step #221 before reading out the code and, then, the code is read out at step #222. When identification of the code is completed, the PRINT BUSY signal is stopped at step #229 to make the packet switch 350 start the intermediate code procedure. However, if the intermediate code is a PAGE EJECT code, the PRINT BUSY signal is kept on in order to stop the packet switch 350 in the print mode. Therefore, the PRINT BUSY signal is switched off after completion of a print operation.

At step #226, a number of multi-print is renewed and the print head controller interface 355 is brought into print mode to output a print command PRNCMD to the interface controller 40 at step #227. Due to this, the print head controller interface 355 outputs data in the BM-RAM 32 to the print head through the bus B4 in synchronization with pulses sent from a control circuit of the print head controller 42.

When the print operation is completed, the process returns to the main routine of FIG. 63. In this stage, the JOBACT flag is kept in a set state at step #204, the process waits an exposure end command EXPEND from the interface controller 40 at step #205.

When the EXPEND command is detected, a copy operation for the same image is performed from step #206 to step #212. At first, the counter CCOUNT for counting a number of copies is decremented at step #206 and it is checked at step #207 if a predetermined number of copies has been completed. If it has been completed, the BM-RAM 32 is cleared to image the next image at step #208 and PRINT BUSY signal is stopped at step #216 in order to start the intermediate code procedure by the packet switch 350. Thereafter, CCOUNT is set at the predetermined copy number at step #209 and the JOBACT flag is reset to release the print mode at step #210.

If the copy operation has not completed at step #207, it is repeated to copy the same image at steps #211 and #212.

Seventh Preferred Embodiment

Figure 65:
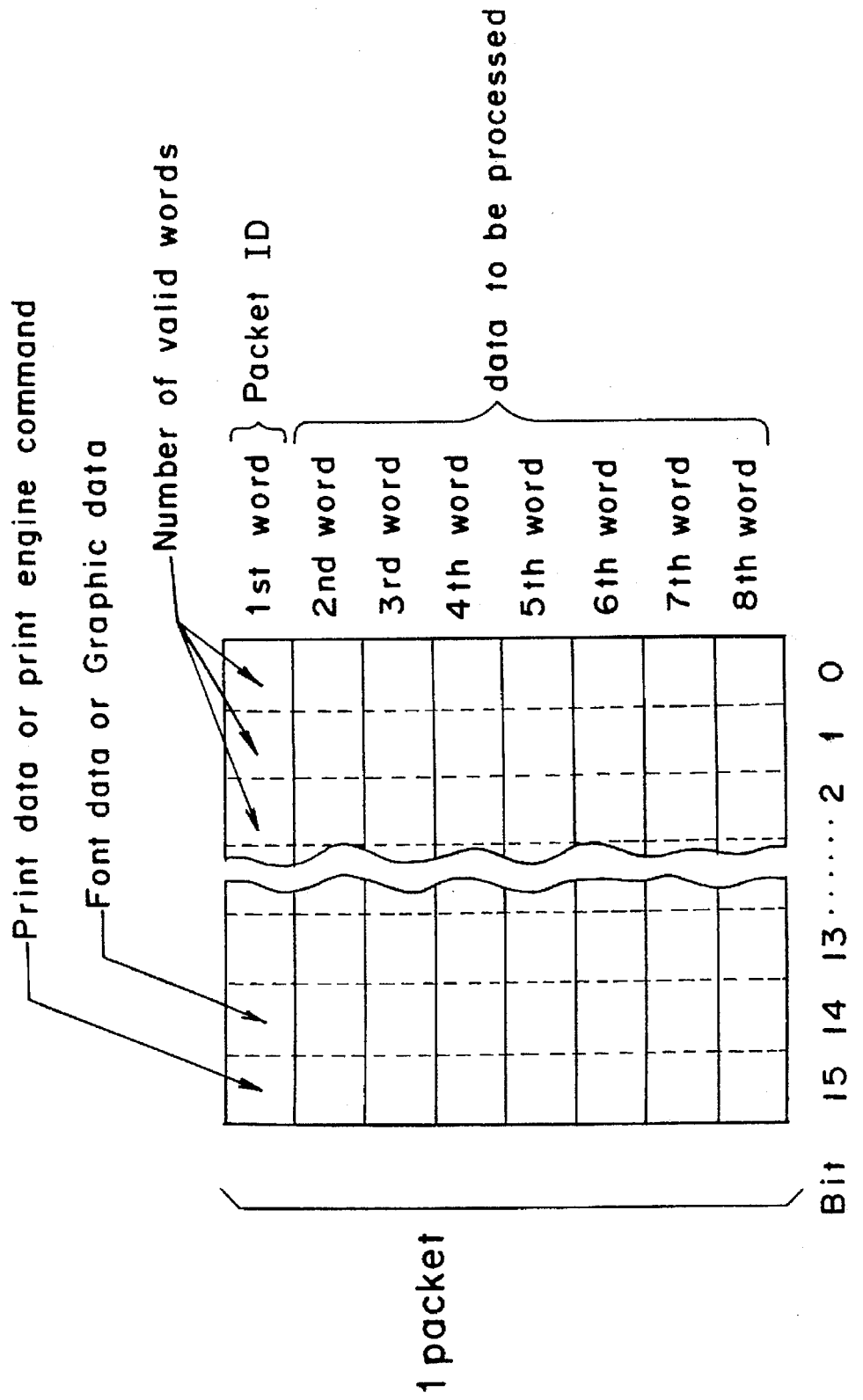
FIG. 65 is an explanative view for showing a data structure of a packet according to the seventh preferred embodiment of the present invention.

In the seventh preferred embodiment of the present invention, one packet is comprised of eight words as shown in FIG. 65.

Although the composition of the FIFO 305 is substantially the same as that shown in FIG. 47, the packet counter 3056 counts one packet in the unit of eight words and the full check counter 3057 outputs an FIFO full signal when it counts 8192 packets.

Furthermore, although the composition of the packet switch 350 is substantially the same as that shown in FIG. 48, the packet word counter 3302 is slightly changed in accordance with the alteration of the number of words to be contained in one packet.

More specifically, the packet word counter 3302 provides three more output terminals for outputting the 6th to 8th words when compared with the packet word counter used in the fifth preferred embodiment.

Figure 66:
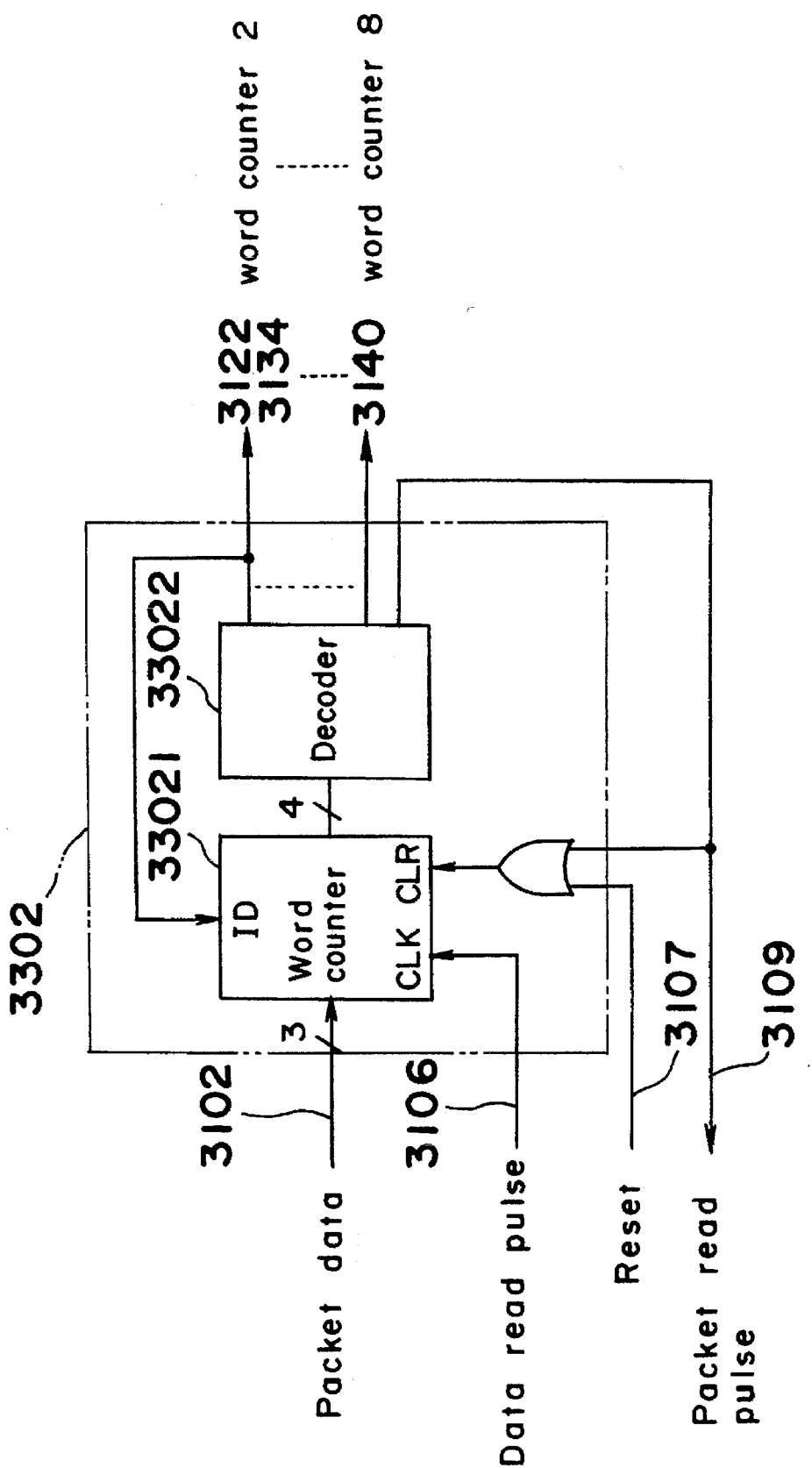
FIG. 66 is a block diagram of a packet word counter according to the seventh preferred embodiment of the present invention.

FIG. 66 shows an example of the composition of the packet word counter 3302.

The packet word counter 3302 is comprised of a word counter 33021 for memorizing and counting a number of valid words contained in one packet and a decoder 33022 for decoding a count value of the word counter 33021. The decoder 33022 outputs a PACKET WORD COUNTER signal through a signal line 3122 after a RESET signal or a PACKET READ pulse is inputted to the word counter 33021 through a signal line 3107 or 3109. During the output of the PACKET WORD COUNTER signal, the number of valid words is loaded to the word counter 33021 according to a PACKET READ pulse. Thereafter, the word counter 33021 is incremented by each DATA READ pulse which is outputted through a signal line 3106 whenever each word data is read from the FIFO 305.

The decoder 33022 decodes a count value of the word counter 33021 and outputs respective word count numbers from two to eight through signal lines from 3134 to 3140. Each word count number indicates an order of the present data in a packet which is calculated relatively on the basis of the number of valid words. Namely, if the number of valid words is five, the EIGHTH WORD COUNTER OUTPUT signal is outputted when the fifth word is processed.

When all of the valid words in a packet have been processed, a PACKET READ pulse is outputted by the decoder 33022 through the signal line 3109. The word counter 33021 is cleared internally when a predetermined time has passed from the input of the PACKET READ pulse.

The time chart of the packet procedure is substantially the same as that shown in FIG. 50 except for the number of valid words in a packet and, if the number of valid words is equal to five, it coincides with that shown in FIG. 50. Therefore, a drawing has not been provided.

Figure 67:
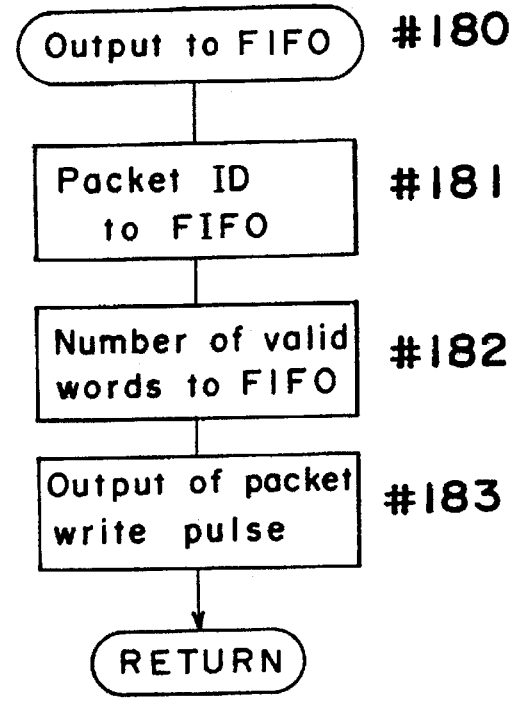
FIG. 67 is a flow chart of a routine for outputting data to FIFO according to the seventh preferred embodiment.

FIG. 67 shows a routine for outputting data to the FIFO 305 by the information processor 320. As is apparent from comparison of FIG. 67 with FIG. 65, the step #182 is changed. Namely, in the seventh preferred embodiment, the information processor 320 outputs a number of valid words in the present packet to the FIFO 305 at step #182.

Figure 68:
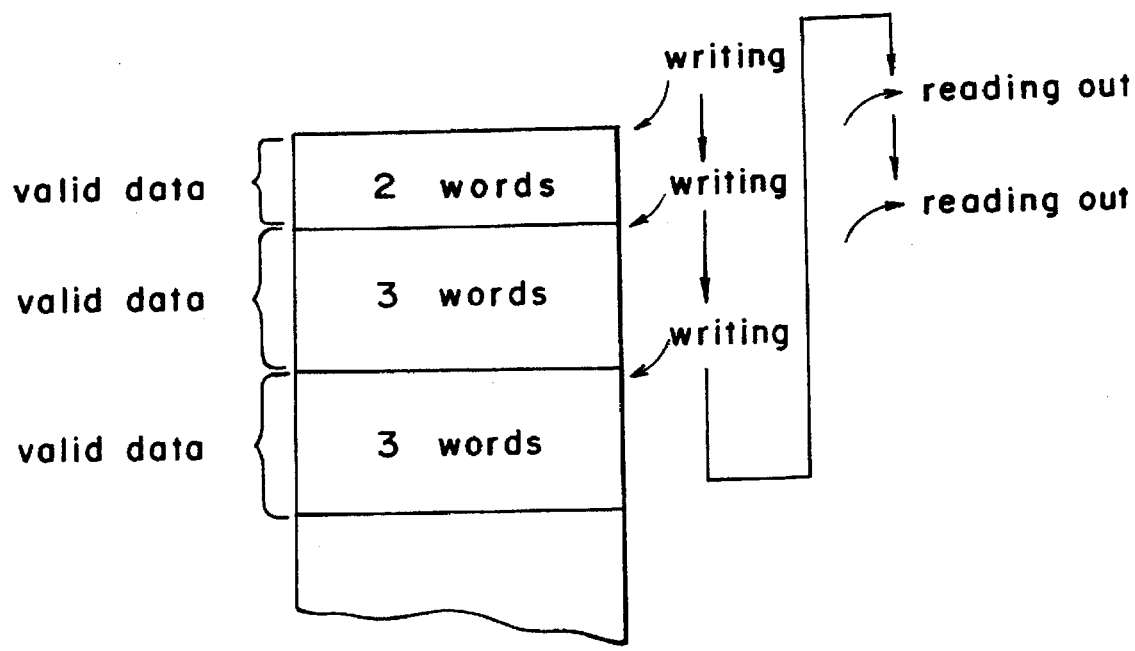
FIG. 68 is an explanative diagram for showing actions of the seventh preferred embodiment of the present invention.

FIG. 68 is a schematic diagram explaining an action of the seventh preferred embodiment.

As mentioned above, in the sixth preferred embodiment, the number of valid words in a packet is introduced in order to write into or read out only valid data in a packet. Accordingly, if respective numbers of valid words are 2, 3 and 3 in successive three packets, two valid words in the first packet are written into at first and, then, a PACKET WRITE pulse is outputted to the packet counter 3056 to count up. Therefore, three valid words in the second packet are written into without writing five invalid words in the first packet. Similarly, three valid words in the third packet are written into without writing four invalid words in the second packet.

Also, on the side of reading out, two valid words are read out at first and, then, the next three valid words are read out. Thus, according to the seventh preferred embodiment, only valid data in each packet is processed. As a result, the processing speed is considerably increased.

Eighth Preferred Embodiment

The eighth preferred embodiment is an improvement of the seventh preferred embodiment.

Figure 69:
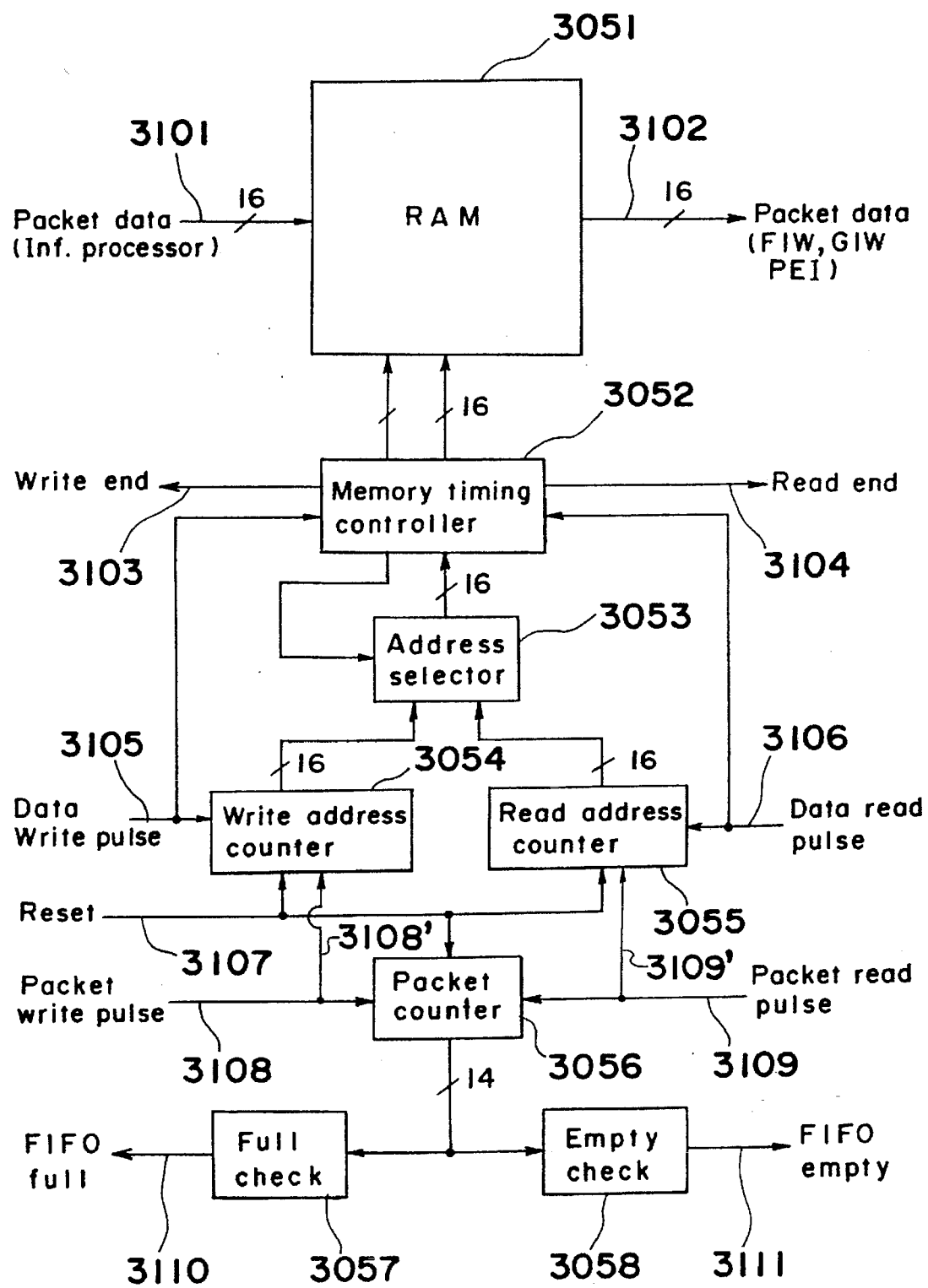
FIG. 69 is a block diagram of FIFO according to the eighth preferred embodiment of the present invention.

In the eighth preferred embodiment, the composition of the FIFO 305 is improved. FIG. 69 shows an example of the composition of the FIFO 305. As is apparent from the comparison of FIG. 69 with FIG. 47, new signal lines 3108' and 3109' for applying a PACKET WRITE pulse and a PACKET READ pulse to the write address counter 3054 and the read address counter 3055, respectively, are added to FIG. 69.

Figure 70:
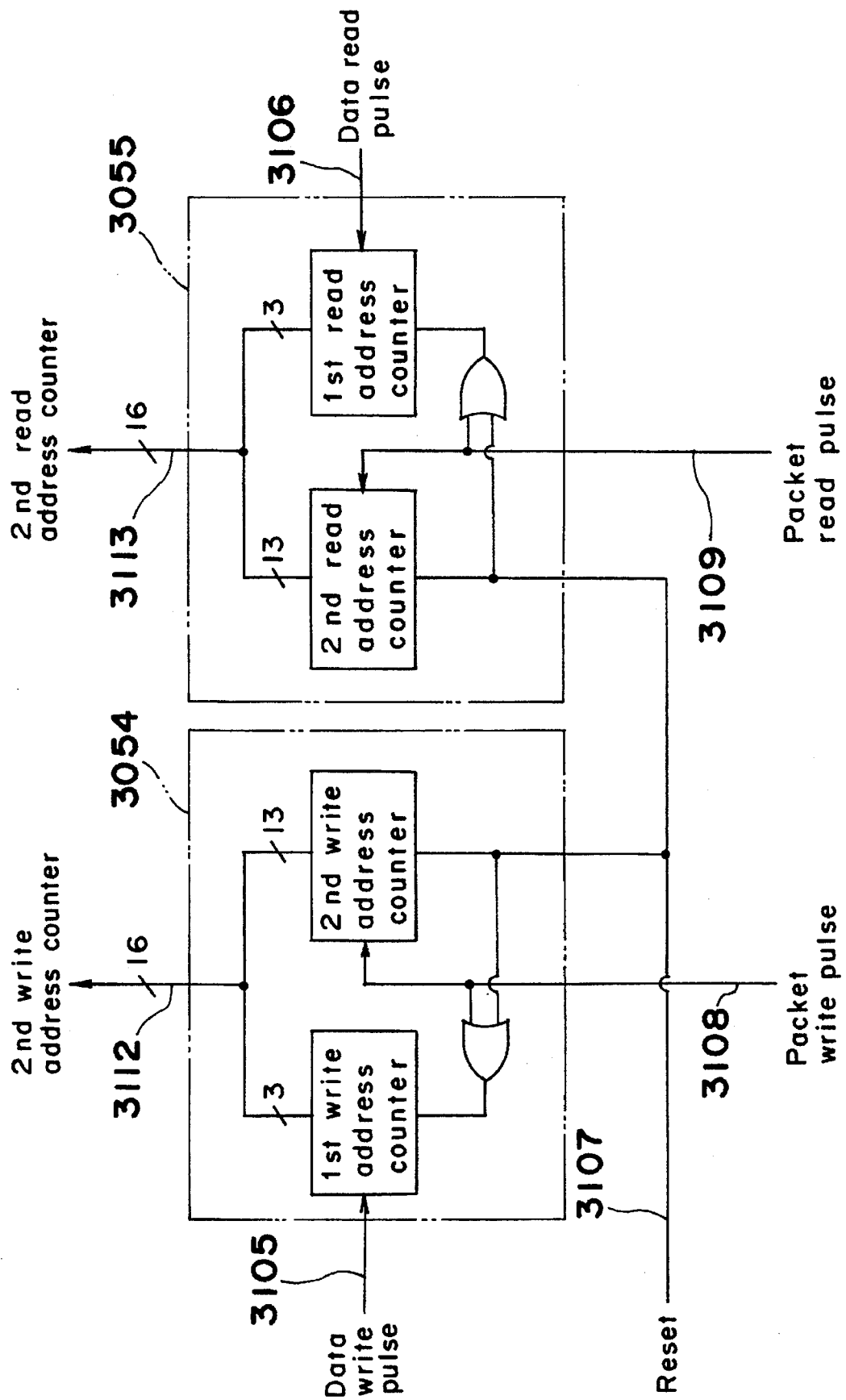
FIG. 70 is a block diagram of a write address counter and a read address counter according to the eighth preferred embodiment of, the present invention.

FIG. 70 shows compositions of the write address counter 3054 and the read address counter 3055. The write address counter 3054 provides first and second write address counters. The first write address counter is provided for indicating an address of each word data in a packet which is identified by the lower three bits of a write address and is counted up by each DATA WRITE pulse which is input through the signal line 3105 when each word has been written into.

The second write address counter is provided for indicating an address in the unit of one packet which is identified by the upper thirteen bits of a write address. It is counted up by each PACKET WRITE pulse which is input through the signal line 3108 after the information processor 320 outputted one packet data to the RAM 3051 through the signal line 3101. Further, the first write address counter is cleared by a packet write pulse which is applied through the signal line 3108 and the write address at that time is set as the top address of the next packet.

Similarly, the read address counter 3055 provides first and second read address counters. The first read address counter is provided for indicating a read address of each word data in a packet which is identified by lower three bits of a read address and is counted up by each DATA WRITE pulse which is input through the signal line 3106 when each word has been read out.

The second read address counter is provided for indicating an address in the unit of one packet which is identified by the upper thirteen bits of a read address. It is counted up by each PACKET READ pulse which is input through the signal line 3109 after one packet data is read out by the packet switch 350 through the signal line 3102. Further, the first read address counter is cleared by a PACKET READ pulse which is applied through the signal line 3109 and the read address at that time is set as the top address of the next packet.

The first write address counter and the read address counter can be formed with use of down counters. However, both counters should be of the same type. Similarly, the second write counter and the second read counter should be of the same type. All of those four counters are forcibly cleared when the power source is turned on.

Figure 71:
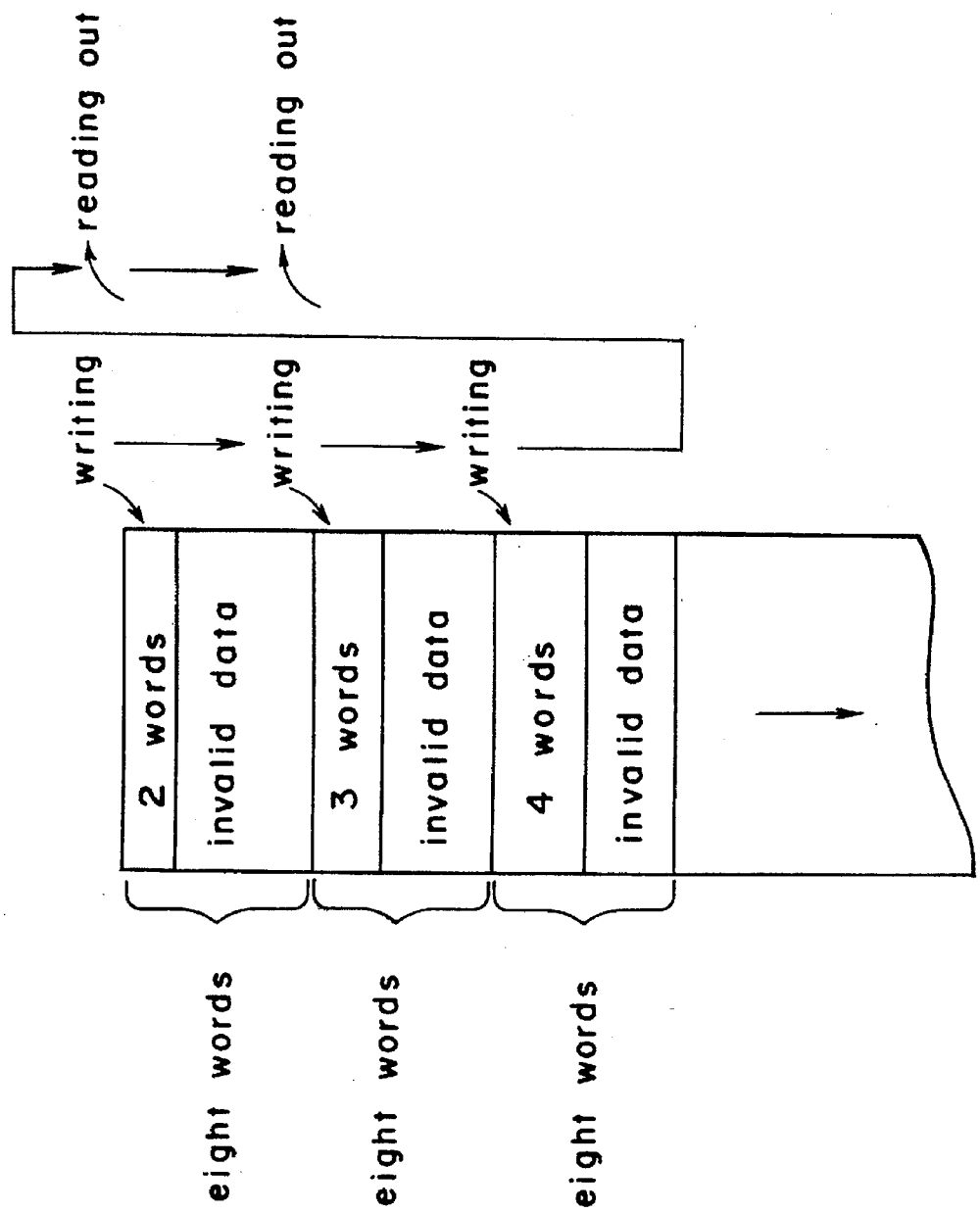
FIG. 71 is an explanative diagram for showing action of the eighth preferred embodiment of the present invention.

FIG. 71 shows a schematic diagram for showing an action according to the eighth preferred embodiment.

Since there is provided the write address counter 3054 on the data writing side, invalid data in a packet is skipped irrespective to the data reading side. Namely, if only two valid words exist in a packet, a PACKET WRITE pulse is outputted after writing two words. Due to this pulse, the packet counter 3056 is counted up to renew the write address to the top address of the next packet. Subsequently, three valid words of the next packet are written into without writing four invalid words and, then, four valid words of the third packet are written into.

Also, since the read address counter 3055 is provided on the reading side, the read address is renewed to the top address of the next packet by a PACKET READ pulse after reading out two valid words. Accordingly, three valid words of the next packet are read out directly without reading out five invalid words of the present packet.

Thus, invalid word data are skipped on each of the writing and reading sides so that the processing speed of the printer is sped up considerably.

The preferred embodiments described herein are illustrative and not restrictive, the scope of the invention being indicated by the appended claims and all variations which come within the meanings of the claims are intended to be embraced herein.

What is claimed is:

1. An image generating apparatus for printing information received from an external device, comprising:

receiving means for receiving information including image data to be printed and control data to control an operation of said image generating apparatus;

first processing means for transforming said image data into intermediate codes;

first memory means for storing said intermediate codes;

second processing means for requesting said intermediate codes from said first memory means and transforming said intermediate codes into dot images, wherein said second processing means operates independently from said first processing means;

second memory means for storing said dot images; and print control means for printing said dot images according to said control data.

2. An image generating apparatus according to claim 1, wherein said intermediate codes include an address for storing said dot images in said second memory means.

3. An image generating apparatus according to claim 1, wherein said first and second processing means are information processors.

4. An image generating apparatus according to claim 1, wherein said first and second processing means can operate simultaneously.

5. An image generating apparatus according to claim 1, wherein said intermediate codes do not include dot images.

6. A method for printing information received from an external device, comprising the steps of:

receiving information including image data to be printed and control data to control an operation of said printing;

transforming said image data into intermediate codes in a first processing means;

storing said intermediate codes in a first memory means;

transferring said intermediate codes from said first memory means to a second processing means;

transforming said intermediate codes into dot images in the second processing means, which second processing means operates independently from said first processing means;

storing said dot images in a second memory means; and printing said dot images according to said control data.

7. A method for printing information received from an external device according to claim 6, wherein said dot images are stored at an address in the second memory means, which address is generated by the first processing means.

8. A method for printing information received from an external device according to claim 6, wherein said first and second processing means can operate simultaneously.

9. A method for printing information received from an external device according to claim 5, wherein said intermediate codes do not include dot images.

10. A printer which receives information including image data to be printed from an external device, transforms said received image data into dot images and prints out said dot images on a paper printing means comprising:

means for receiving said information including image data to be printed and control data to control an operation of said printing means;

first information processing means for analyzing contents of received information and transforming said image data and control data included therein into intermediate codes;

first memory means for storing said intermediate codes transformed by said first information processing means;

second information processing means for transforming said intermediate codes corresponding to said image data into dot images and analyzing said intermediate codes corresponding to said control data, wherein said second information processing means operates asynchronously with said first information processing means;

second memory means for storing dot images transformed by said second information processing means; and a print control means for controlling said printing means according to the results of said analysis by said second information processing means and said dot images.

11. A printer according to claim 10, wherein said first memory means is comprised of a first-in first-out memory.

12. A printer according to claim 10, wherein said second memory means is comprised of a bit map memory.

13. A printer according to claim 10, wherein each of said first and second information processing means includes a micro-processor.

14. A printer according to claim 10, further comprising:

means for entering a signal to said second information processing means indicating data to be processed prior to other data, said means being connected to said second information processing means; and a signal transmission line for transmitting said signal from said second information processing means to said first information processing means.

15. A printer according to claim 14, wherein said signal can be a signal to cancel image data to be printed.

16. A printer according to claim 15, wherein said signal for commanding to cancel image data to be printed includes first cancel signal for canceling image data of one page stored in said second memory means and second cancel signal for cancelling all image data stored in both of said first and second memory means, and said second information processing means cancels image data of one page stored in said second memory means when said first cancel signal is input thereinto and, when said second cancel signal is input thereinto, said second information processing means cancels all image data stored in said second memory means and transmits said second cancel signal, via the signal transmission line, to said first information processing means whereby said first information processing means cancels all data stored in said first memory means.

17. A printer according to claim 10, further comprising a signal transmission line for sending a signal from said first information processing means to said second information processing means, said signal including a cancel command requesting said second information processing means to cancel image data if said cancel command is included in the received information.

18. A printer according to claim 10, further comprising:
a key enter means for entering a command for canceling image data;
first signal transmission line for sending a signal from said first information processing means to said second information processing means directly; and
second signal transmission line for sending a signal from said second information processing means to said first information processing means wherein, if said command for canceling data is included in the information received by said information receiving means, said command is sent directly to said second information processing means via said first transmission line and for cancelling data in the second information processing means, when said command is input by said key enter means, said second information processing means sends said command to said first information processing means via said second signal transmission line to cancel data in said first information processing means.

19. A printer according to claim 10, further comprising a counter means being incremented when said first information processing means has written image data of one page into said first memory means and being decremented when said second information processing means has read image data of one page from said first memory means wherein said print control means controls the paper supply of said printing means according to a counter value of said counter means.

20. A printer according to claim 19, wherein said paper is supplied to said printing means before one page of data images is stored in said second memory means if the present value of said counter means is equal to or larger than 1.

21. A printer according to claim 10, wherein said intermediate codes do not include dot images.

22. A printer which receives information including image data to be printed from an external device, transforms said received image data into dot images and prints out said dot images on a paper by an electro-photographic printing means of transfer type, comprising:
means for receiving said information including image data to be printed;
first information processing means for analyzing contents of received information and transforming said image data included therein into intermediate codes;
first memory means for storing said intermediate codes transformed by said first information processing means;

second information processing means for transforming said intermediate codes into dot images, wherein said second information processing means operates asynchronously with said first information processing means;
second memory means for storing dot images transformed by said second processing means;
a print control means for controlling said printing means according to said dot images stored in said second memory means; and
counter means being incremented when said first information processing means has written image data of one page into said first memory means and being decremented when said second information processing means has read image data of one page from said first memory means, wherein said print control means controls the paper supply of said printing means according to a count value of said counter means.

23. A printer according to claim 22, wherein said paper is supplied to said printing means before one page of data images is stored in said second memory means if the present value of said counter means is equal to or larger than 1.

24. A printer according to claim 22, wherein said intermediate codes do not include dot images.

25. A printer which receives information including image data to be printed from an external device, transforms said received image data into dot images and prints out said dot images on a paper by a printing means, comprising:
means for receiving said information including said image data to be printed;
first information processing means for transforming said received information into intermediate code data according to an analysis of said received information;
memory means for storing said intermediate code data temporarily, said memory means outputting said intermediate code data in the order of receipt;
second information processing means for transforming said intermediate code into dot images;
first counter for updating a write address of each intermediate code in synchronization with a sequence for writing said intermediate codes into said memory means;
second counter for updating a read address of each intermediate code in synchronization with a sequence for reading said intermediate codes from the memory means; and
third counter for counting an amount of data stored in the memory means in units of a predetermined data length which is incremented in synchronization with a sequence for writing data of the predetermined data length and is decremented in synchronization with a sequence for reading data of said predetermined length.

26. A printer according to claim 25, further comprising control means for transmitting control signals to said first and second information processing means in accordance with a count value of said third counter.

27. A printer according to claim 26, wherein said control means outputs a signal for prohibiting the first information processing means from writing said data into said memory means when it is detected by the third counter that said memory means is fully occupied with data.

28. A printer according to claim 26, wherein said control means outputs a signal for prohibiting said second information processing means from reading said data from said memory means when it is detected by the third counter that the memory means is empty.

29. A printer according to claim 25, wherein each of the first and second counters updates an address of each data in units of one word while the third counter counts in units of one packet which includes a predetermined number of words.

30. A printer according to claim 25, wherein said intermediate codes do not include dot images.

31. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, each of said intermediate codes including an irregular number of units wherein the number of units contained in each of said intermediate codes is less than or equal to a predetermined number which is greater than one;

memory means for storing said intermediate codes temporarily, said memory means outputting said intermediate codes in the order of receipt;

memory control means for controlling the writing of said intermediate codes into the memory means and the reading of said intermediate codes therefrom when at least one of the intermediate codes is stored in said memory means, said memory control means including:

first counter for updating a write address of each unit in synchronization with writing said unit into said memory means;

second counter for updating a read address of each unit in synchronization with reading said unit from the memory means;

third counter for counting an amount of units stored in the memory means in units of an intermediate code, which is incremented in synchronization with completion of writing data contained in each of said intermediate codes and is decremented in synchronization with completion of reading data contained in each of said intermediate codes;

read control means for reading stored intermediate codes from the memory means; and data processing means for processing read intermediate codes to transform them into dot images and for transmitting dot images to said printing means.

32. An image generating apparatus according to claim 31, wherein said memory control means transmits control signals to said information processing means and said read control means in accordance with a count value of the third counter.

33. An image generating apparatus according to claim 32, wherein said memory control means outputs a signal for prohibiting write operation of said information processing means when it is detected by the third counter that said memory means is fully occupied with data.

34. An image generating apparatus according to claim 32, wherein said memory control means outputs a signal for prohibiting read operation of said read control means when it is detected by the third counter that the memory means is empty.

35. An image generating apparatus according to claim 31, wherein said intermediate codes do not include dot images.

36. A method for generating an image of information containing image data received from an external apparatus, transforming said image data into dot images to be printed out and printing said dot images on paper, comprising the steps of:

receiving said information from the external apparatus;

transforming said received information into intermediates data according to an analysis of said received information;

storing said intermediate data temporarily in a memory means, which outputs said intermediate data in the order of receipt;

controlling the writing of said intermediate data into the memory means and the reading of said intermediate data therefrom when at least one unit of data is stored in said memory means, comprising the steps of:

updating a write address of each intermediate data in synchronization with writing said intermediate data into said memory means;

updating a read address of each intermediate data in synchronization with reading said intermediate data from the memory means;

counting an amount of data stored in the memory means in a counter in units of a predetermined data length, wherein said predetermined data length is greater than a length of one of the intermediate data, incrementing said counter in synchronization with writing data of an arbitrary length which is less than or equal to said predetermined length and decrementing said counter in synchronization with reading data of an arbitrary length which is less than or equal to said predetermined length;

reading stored intermediate data from the memory means;

processing read intermediate data to transform them into dot images and transmitting said dot images to a printing means; and printing said dot images.

37. A method according to claim 36, wherein said intermediate data does not include dot images.

38. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, wherein each of said intermediate codes includes a varying number of units of intermediate data wherein the number of data units contained in each of said intermediate codes is less than or equal to a predetermined number which is greater than one;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

first counter for updating a write address of each unit of intermediate data in synchronization with writing said intermediate data into said memory means;

second counter for updating a read address of each unit of intermediate data in synchronization with reading said intermediate data from the memory means;

third counter for counting an amount of data stored in the memory means in groups of a predetermined number of units of data, which is incremented in synchronization with a completion of writing data contained in each of said intermediate codes and is decremented in synchronization with a completion of reading data contained in each of said intermediate codes;

read control means for reading stored intermediate codes from the memory means; and data processing means for processing read intermediate codes to transform them into dot images and for transmitting dot images to said printing means;

wherein said memory control means outputs a signal for prohibiting a write operation of said information processing means when it is detected by the third counter that the amount of stored data is a predetermined value different from zero and outputs a signal for prohibiting a read operation of said read control means when it is detected by the third counter that the memory means is empty;

said information processing means outputs a signal to the first counter when intermediate data contained in one of the intermediate codes have been completely outputted to said memory means;

said first counter updates the present write address to the next one for the next unit of the predetermined number of data in response to said signal; and said third counter is incremented in synchronization with said signal.

39. An image generating apparatus according to claim 38, wherein said intermediate codes do not include dot images.

40. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, wherein each of said intermediate codes includes a varying number of units of intermediate data wherein the number of data units contained in each of said intermediate codes is less than or equal to a predetermined number which is greater than one;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

first counter for updating a write address of each unit of intermediate data in synchronization with writing said intermediate data into said memory means;

second counter for updating a read address of each unit of intermediate data in synchronization with reading said intermediate data from the memory means;

third counter for counting an amount of data stored in the memory means in groups of the predetermined number of units of data, which is incremented in synchronization with a completion of writing data contained in each of said intermediate codes and is decremented in synchronization with a completion of reading data contained in each of said intermediate codes;

read control means for reading stored intermediate codes from the memory means; and data processing means for processing read intermediate codes to transform them into dot images and for transmitting dot images to said printing means;

wherein said memory control means outputs a signal for prohibiting a write operation of said information processing means when it is detected by the third counter that the amount of stored data is a predetermined value different from zero and outputs a signal for prohibiting a read operation of said read control means when it is detected by the third counter that the memory means is empty, said read control means outputs a signal to the second counter when intermediate data contained in one of the intermediate codes have been completely read out of said memory means, said second counter updates the present read address to a beginning of the next unit of the predetermined number of data in response to said signal, and said third counter is decremented in synchronization with said signal.

41. An image generating apparatus according to claim 40, wherein said intermediate codes do not include dot images.

42. An image generating apparatus which receives information containing image data input from an external apparatus, transforms said image data into dot images to be printed out and prints said dot images on paper by printing means, comprising:

means for receiving said information from the external apparatus;

information processing means for transforming said received information into intermediate codes according to an analysis of said received information, wherein each of said intermediate codes includes valid data which consists of an irregular number of words wherein the number of words of the valid data contained in each of said intermediate codes is greater than or equal to one and is less than or equal to a predetermined number which is greater than one;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

a first counter for updating a write address of each intermediate code in synchronization with writing said intermediate codes into said memory means in a unit of one word;

a second counter for updating a read address of each intermediate code in synchronization with reading said intermediate codes from the memory means in a unit of one word;

a third counter for counting an amount of data stored in the memory means in units of one packet, said packet including the predetermined number of words, wherein said third counter is incremented in synchronization with writing valid data contained in each of said intermediate codes and is decremented in synchronization with reading valid data contained in each of said intermediate codes;

read control means for reading stored intermediate codes from the memory means; and data processing means for processing read intermediate codes to transform them into dot images and for transmitting dot images to said printing means.

43. An image generating apparatus according to claim 42, wherein said information processing means outputs a signal to said first counter when valid word data contained in an intermediate code has been completely outputted to said memory means and said first counter updates the present write address to the next one for the next packet in accordance with said signal.

44. An image generating apparatus according to claim 43, wherein said read control means outputs a signal to the second counter when valid word data contained in a packet has been completely read out of said memory means and said second counter updates the present read address to the next one for the next packet in accordance with said signal.

45. An image generating apparatus according to claim 42, wherein said intermediate codes do not include dot images.

46. An image generating apparatus which receives information containing image data input from an external apparatus, transforms said image data into dot images to be printed out and prints dot images on paper by printing means, comprising:

means for receiving said information from the external apparatus;

information processing means for transforming said received information into intermediate codes according to an analysis of said received information, wherein each of said intermediate codes includes valid data which consists of an irregular number of words wherein the number of words of the valid data contained in each of said intermediate codes is greater than or equal to one;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

a first counter for updating a write address of each intermediate code in synchronization with writing said intermediate codes into said memory means in a unit of one word;

a second counter for updating a read address of each intermediate code in synchronization with reading said intermediate codes from the memory means in a unit of one word;

a third counter for counting an amount of data stored in the memory means, wherein said third counter is incremented in synchronization with completion of writing valid data contained in each of said intermediate codes and is decremented in synchronization with completion of reading valid data contained in each of said intermediate codes;

read control means for reading stored intermediate code from the memory means; and data processing means for processing read intermediate codes to transform them into dot images and for transmitting dot images to said printing means.

47. An image generating apparatus according to claim 46 wherein said third counter counts the amount of data stored in the memory means in unit of one packet, said packet including a predetermined number of words greater than one, and said information processing means outputs aa signal to said first counter when valid data contained in an intermediate code has been completely outputted to said memory means and said first counter updates the present write address to the next one for the next intermediate code in accordance with said signal.

48. An image generating apparatus according to claim 46, wherein said intermediate codes do not include dot images.

49. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, wherein each of said intermediate codes includes a varying number of units of intermediate data wherein the number of units of intermediate data contained in each of said intermediate codes is less than or equal to a predetermined number which is greater than one;

memory means for storing said intermediate codes temporarily, said memory means outputting said intermediate code in the order of receipt;

memory control means for controlling the writing of said intermediate codes into the memory means and the reading of said intermediate codes therefrom, said memory control means including:

first counter for updating a write address of each unit of intermediate data in synchronization with writing said intermediate data into said memory means;

second counter for updating a read address of each unit of intermediate data in synchronization with reading said intermediate data from the memory means;

third counter for counting an amount of data stored in the memory means in groups of the predetermined number of units of data which is incremented in synchronization with a completion of writing data contained in each of said intermediate codes and is decremented in synchronization with a completion of reading data contained in each of said intermediate codes;

read control means for reading stored intermediate codes from the memory means; and data processing means for processing read intermediate codes to transform them into dot images and for transmitting dot images to said printing means.

50. An image generating apparatus according to claim 49, wherein said intermediate codes do not include dot images.

51. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, wherein each of said intermediate codes includes a varying number of units of intermediate data wherein the number of units of intermediate data contained in each of said intermediate codes is less than or equal to a predetermined number which is greater than one;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

first counter for updating a write address of each unit of intermediate data in synchronization with writing said intermediate data into said memory means;

second counter for updating a read address of each unit of intermediate data in synchronization with reading said intermediate data from the memory means;

third counter for counting an amount of data stored in the memory means in units of an intermediate code which is incremented in synchronization with a completion of writing data contained in each of said intermediate codes and is decremented in synchronization with a completion of reading data contained in each of said intermediate codes;

read control means for reading stored intermediate codes from the memory means; and data processing means for processing read intermediate codes to transform them into dot images and for transmitting dot images to said printing means;

wherein said information processing means outputs a first signal when data contained in one of the intermediate codes have been completely outputted to said memory means, said read control means outputs a second signal when the predetermined number of units of intermediate data have been completely read out of said memory means, and said third counter is incremented in synchronization with said first signal and is decremented in synchronization with said second signal.

52. An image generating apparatus according to claim 51, wherein said memory control means outputs a signal for prohibiting from write operation of said information processing means when it is detected by the third counter that the amount of stored data is a predetermined value different from zero and outputs a signal for prohibiting read operation of said read control means when it is detected by the third counter that the memory means is empty.

53. An image generating apparatus according to claim 52, wherein said memory means stores said intermediate codes in units of said predetermined number of units of data, and said first counter updates the present write address to the next one for the next unit of the predetermined number of units of data in response to said first signal.

54. An image generating apparatus according to claim 53, wherein said second counter updates the present read address to a beginning of the next unit of the predetermined data length in response to said second signal.

55. An image generating apparatus according to claim 51, wherein said intermediate codes do not include dot images.

56. An image generating apparatus which receives information containing image data input from an external apparatus, transforms said image data into dot images to be printed out and prints said dot images on paper by a printing means, comprising:

means for receiving said information from the external apparatus;

information processing means for transforming said received information into intermediate codes according to an analysis of said received information, said intermediate codes having varying data lengths;

memory means for storing said intermediate codes temporarily, said memory means outputting said intermediate codes in the order of receipt;

memory control means for controlling the writing of said intermediate codes into the memory means and the reading of said intermediate codes therefrom, said memory control means including:

counter for counting an amount of data stored in the memory means in units of an intermediate code;

read control means for reading stored intermediate codes from the memory means; and data processing means for processing read intermediate codes to transform them into dot images and for transmitting dot images to said printing means;

wherein said information processing means outputs a first signal when data contained in one of the intermediate codes have been completely outputted to said memory means;

detecting means for detecting a length of data contained in an intermediate code read by said read control means, said read control means outputs a second signal when data of the length detected by said detecting means have been completely read out of said memory means, and said counter is incremented in synchronization with said first signal and is decremented in synchronization with said second signal.

57. An image generating apparatus according to claim 56, wherein said intermediate codes do not include dot images.

58. A data storing device comprising:

memory means for storing data;

writing means for writing said data into said memory means in units of a word;

a first counter for updating a write address of said data in synchronization with a sequence for writing said data into said memory means;

reading means for reading said data from said memory means in units of a word when at least one unit of data is stored in said memory means;

a second counter for updating a read address of said data in synchronization with a sequence for reading said data from said memory means; and a third counter for counting an amount of data stored in said memory means in units of a packet, said packet containing a predetermined plurality of words, which is incremented in synchronization with a sequence for writing said data in units of one packet and is decremented in synchronization with a sequence for reading said data in units of one packet.

59. A data storing device according to claim 58, wherein said predetermined plurality of words is greater than one word.

60. A data storing device comprising:

memory means for storing data;

writing means for writing said data into said memory means in units of a predetermined data length;

a first counter for updating a write address of said data in synchronization with a sequence for writing said data into said memory means in units of said predetermined data length;

reading means for reading said data from said memory means in units of said predetermined data length when at least one unit of data is stored in said memory means;

a second counter for updating a read address of said data in synchronization with a sequence for reading said data from said memory means; and a third counter for counting the amount of data stored in said memory means which is incremented in synchronization with a completion of writing a predetermined plurality of units of said predetermined data length and is decremented in synchronization with a completion of reading said predetermined plurality of units of said predetermined data length.

61. A data storing device comprising:

memory means for storing data;

writing means for writing said data into said memory means in units of a predetermined data length;

a first counter for updating a write address of said data in synchronization with a sequence for writing said data into said memory means in units of said predetermined data length;

reading means for reading said data from said memory means in units of said predetermined data length;

a second counter for updating a read address of said data in synchronization with a sequence for reading said data from said memory means;

a third counter for counting the amount of data stored in said memory means which is incremented in synchronization with a completion of writing a predetermined plurality of units of said predetermined data length and is decremented in synchronization with a completion of reading said predetermined plurality of units of said predetermined data length;

means for inhibiting said writing means from writing data into said memory means when a value counted by said third counter is a predetermined value which is not zero; and means for inhibiting said reading means from reading data from said memory means when a value counted by said third counter is zero.

* * * * *